March 13, 1962 C. B. HATFIELD 3,024,596
PROPULSION SYSTEM WITH AUTOMATIC CONTROL OF FUEL AND AIR
Filed March 16, 1955 49 Sheets-Sheet 1
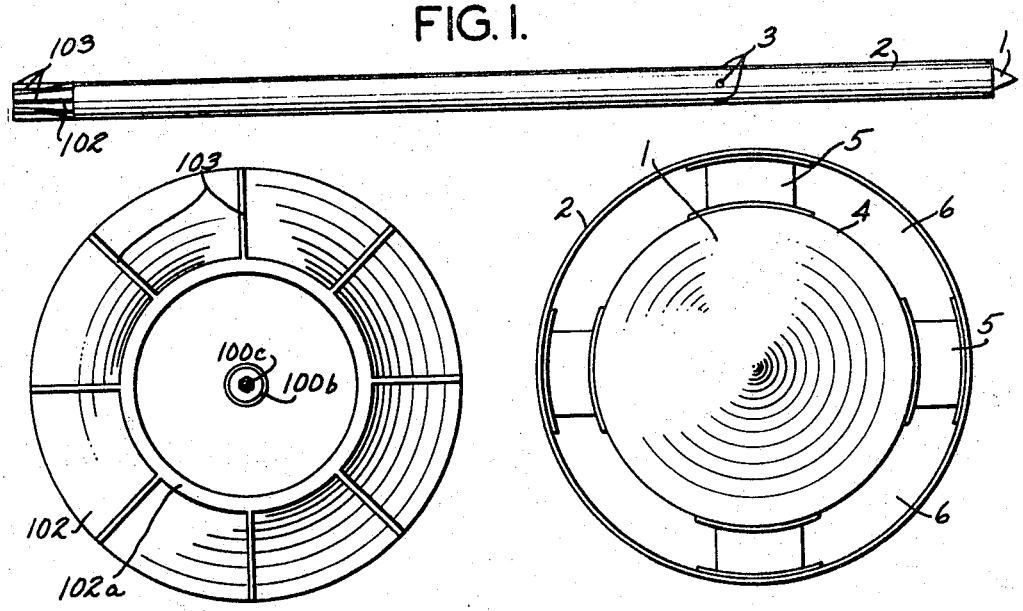
FIG. 1.
FIG. 3. FIG. 2.
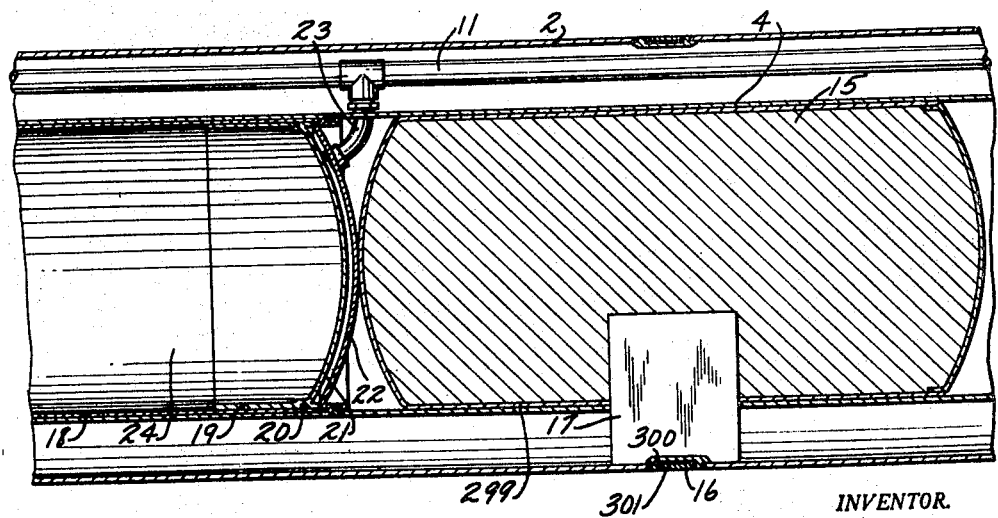
FIG. 4J.
INVENTOR.
CLEBURNE B. HATFIELD
BY Cleburne B. Hatfield
ATTORNEY INVENTOR.
CLEBURNE B. HATFIELD
BY Cleburne B. Hatfield
ATTORNEY March 13, 1962 C. B. HATFIELD 3,024,596
PROPULSION SYSTEM WITH AUTOMATIC CONTROL OF FUEL AND AIR
Filed March 16, 1955 49 Sheets-Sheet 5

INVENTOR.
CLEBURNE B. HATFIELD
BY Cleburne B. Hatfield

ATTORNEY

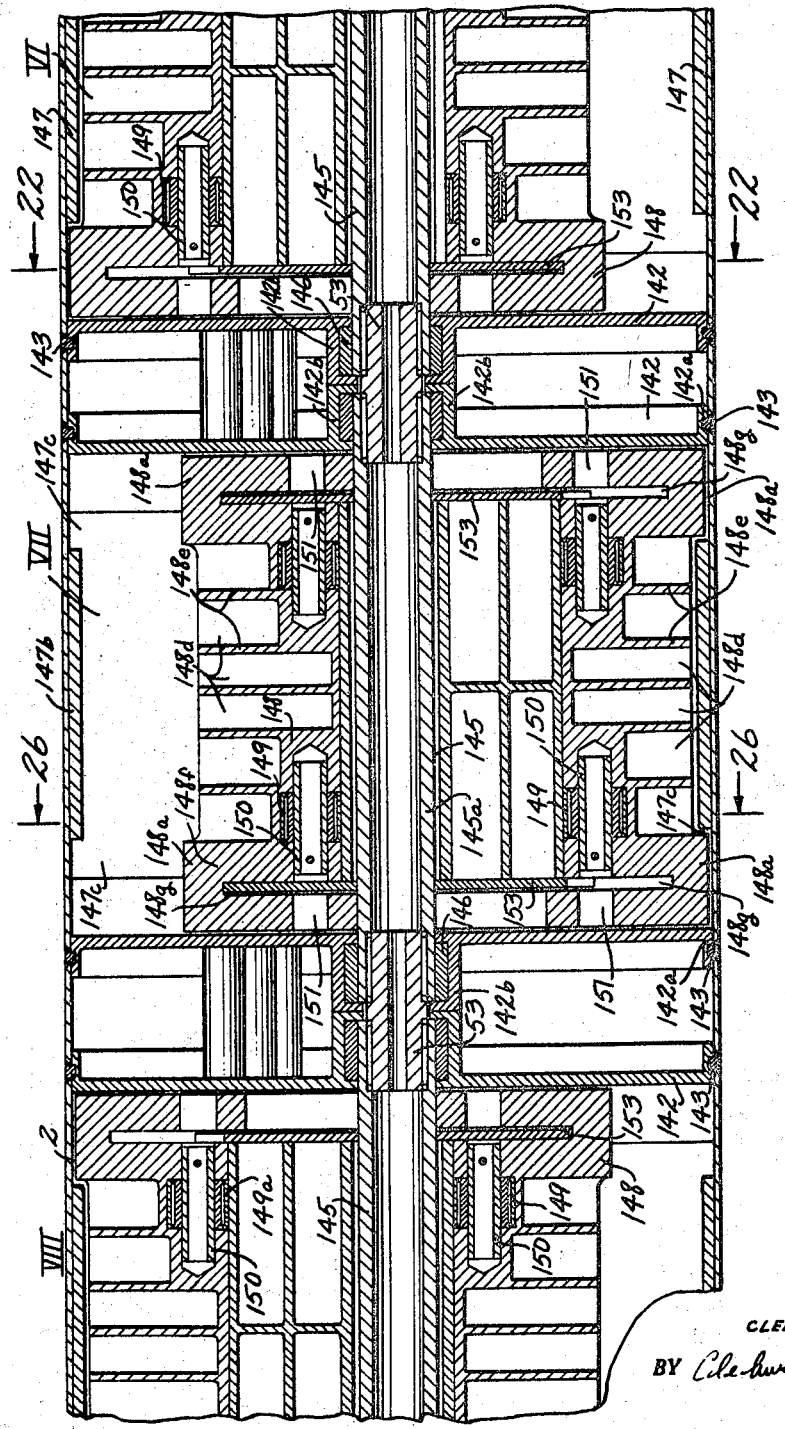

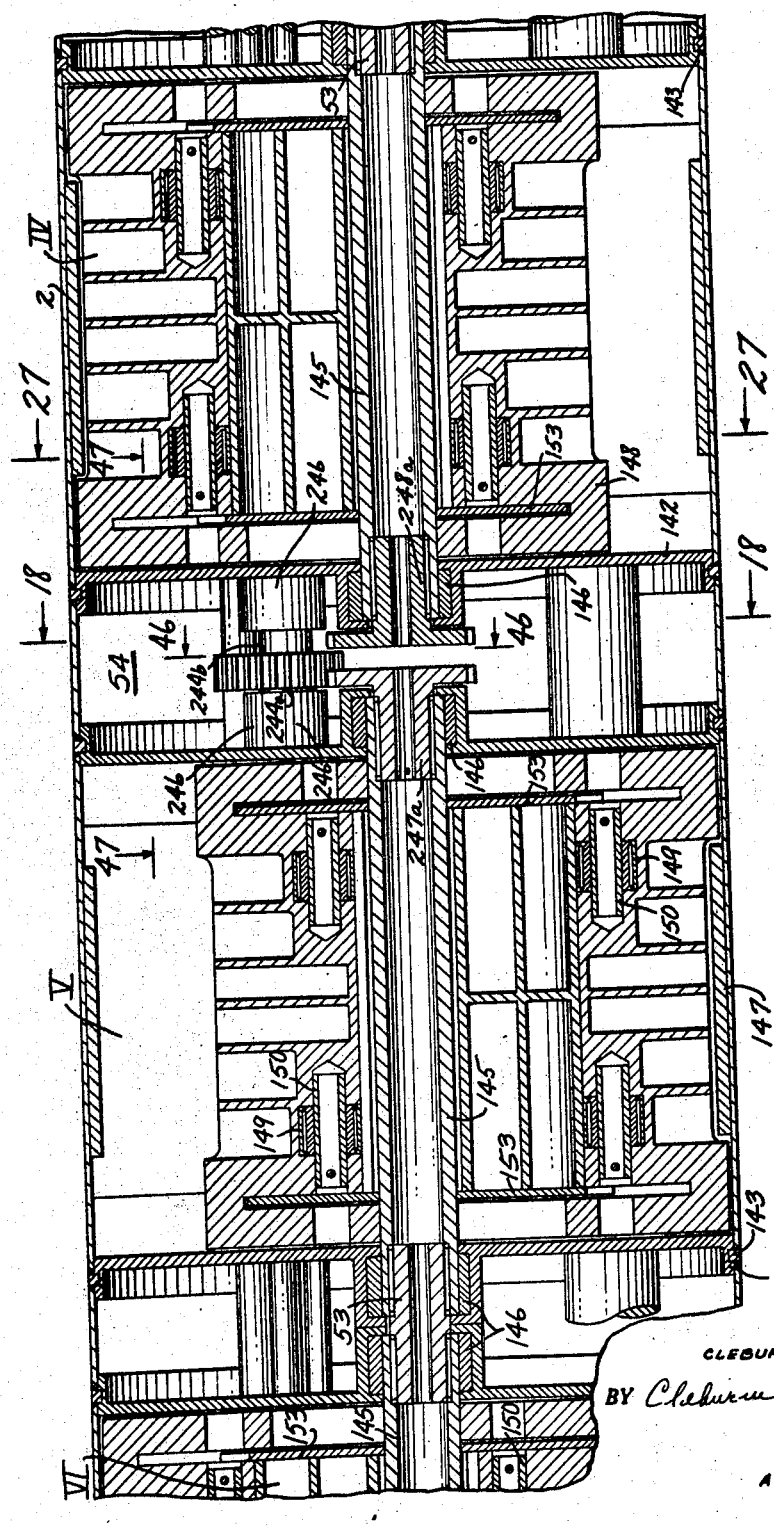

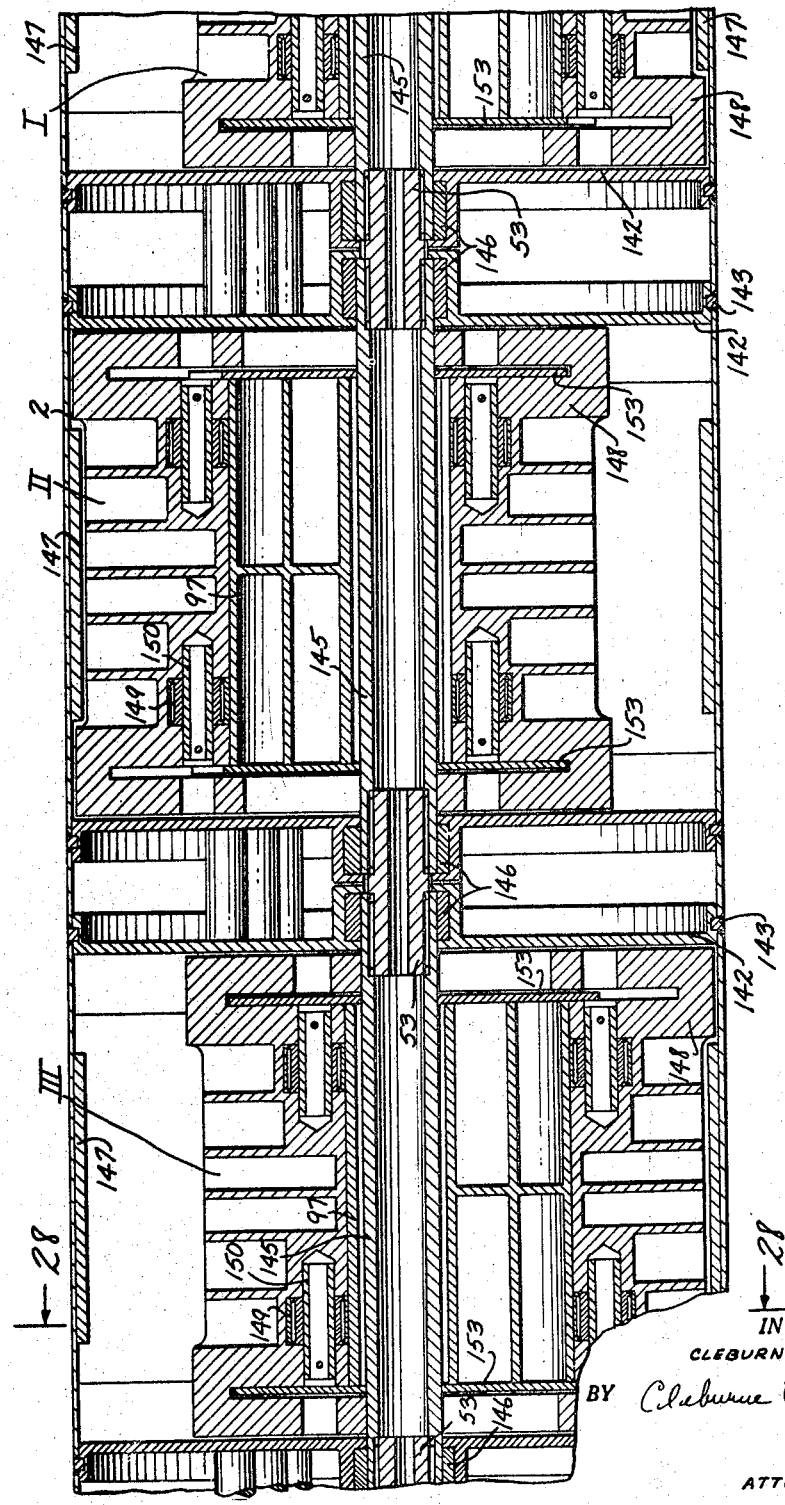

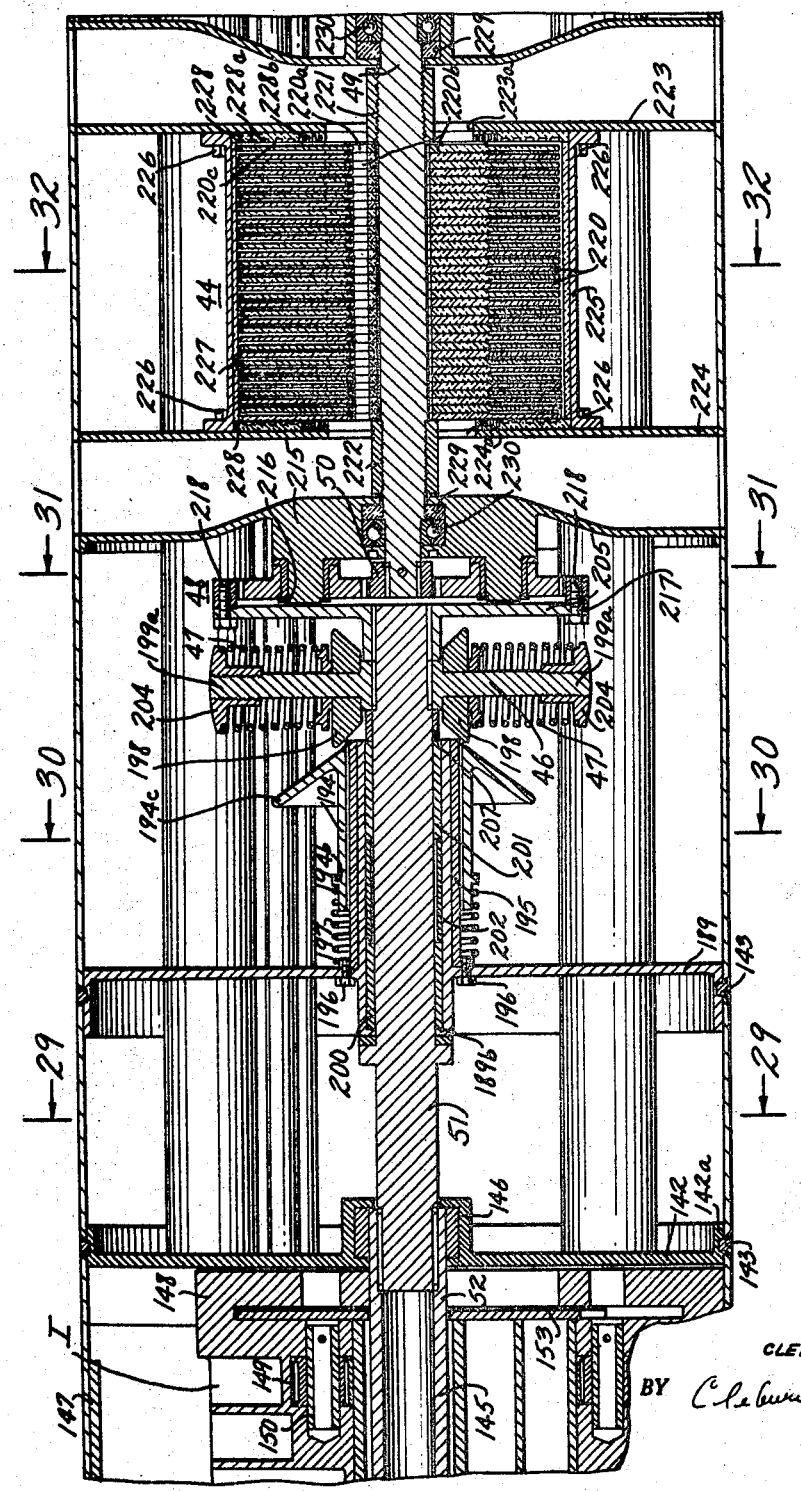

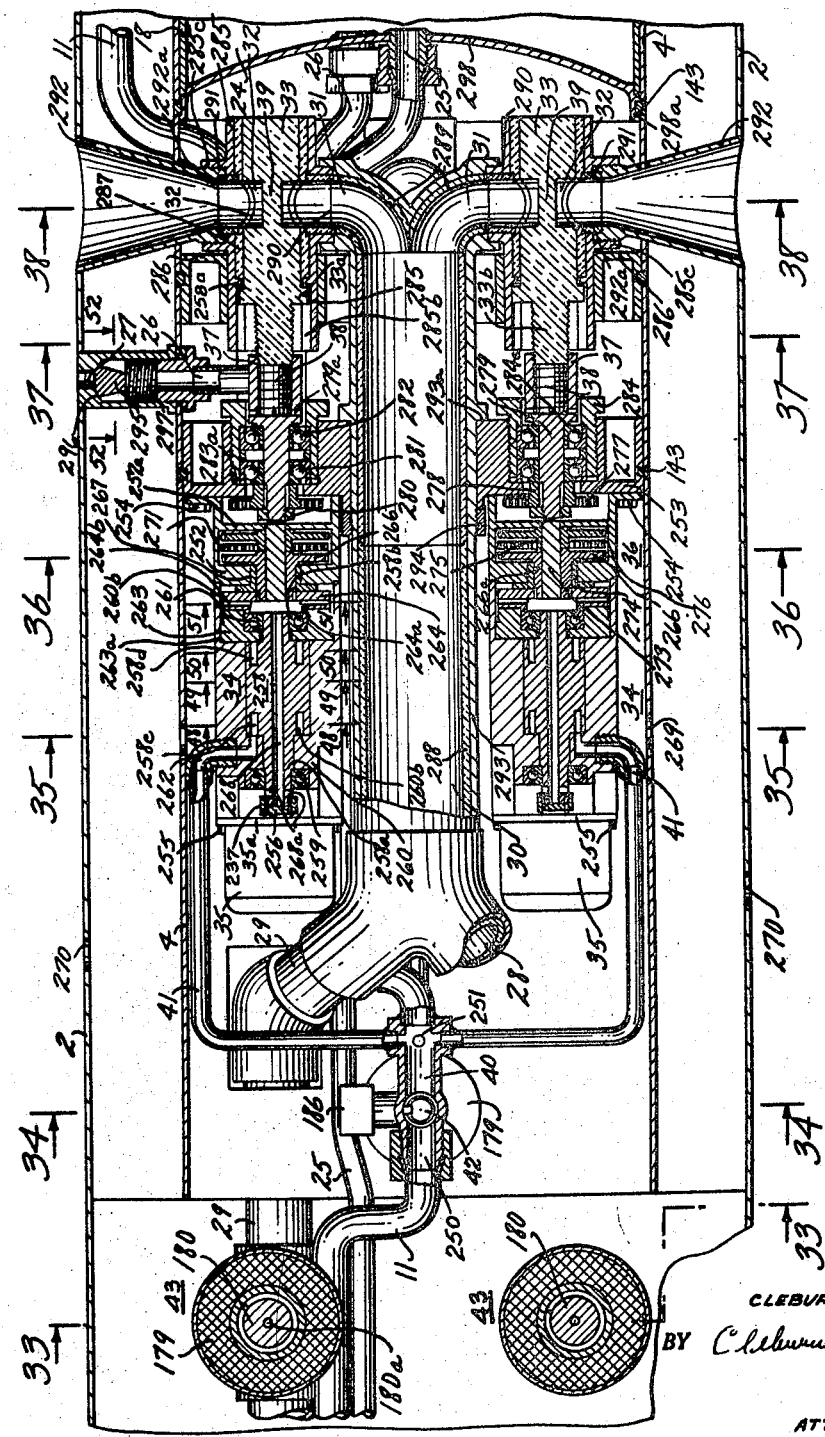

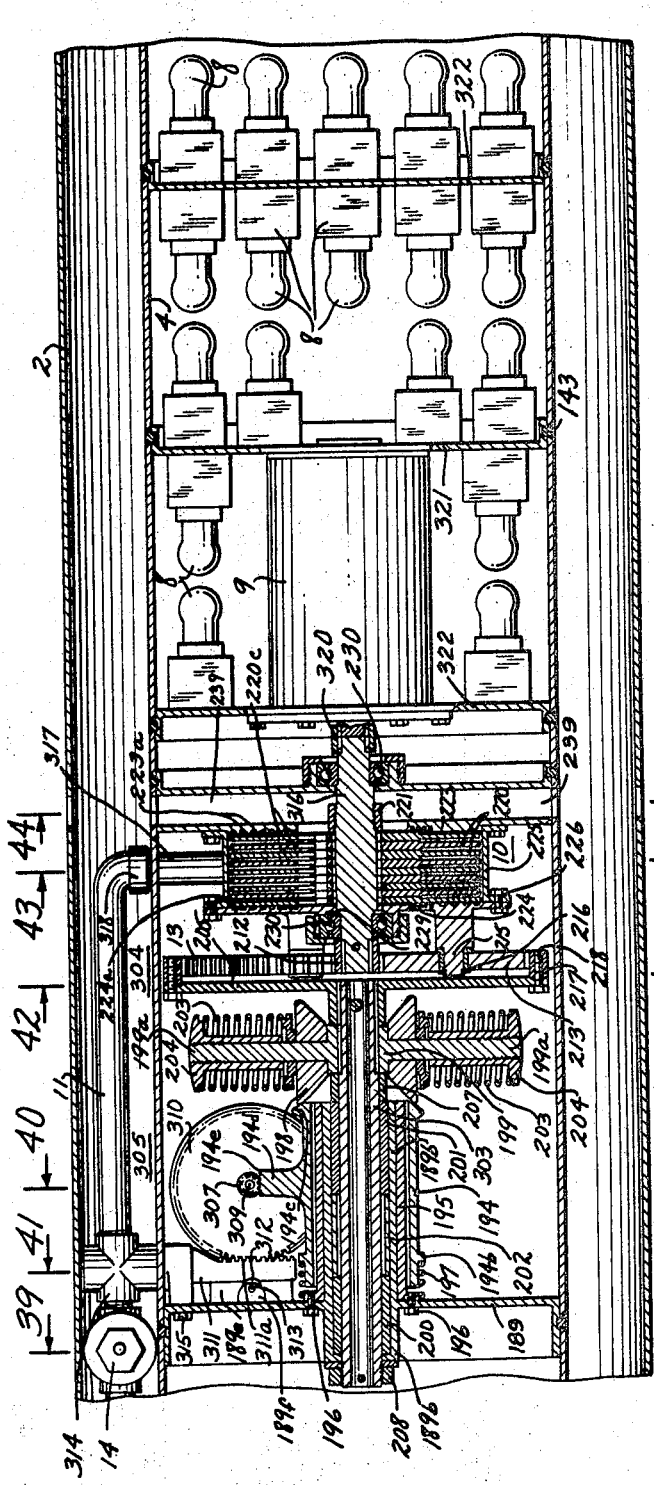

March 13, 1962 C. B. HATFIELD 3,024,596
PROPULSION SYSTEM WITH AUTOMATIC CONTROL OF FUEL AND AIR
Filed March 16, 1955 49 Sheets-Sheet 12

INVENTOR.
CLEBURNE B. HATFIELD
BY Cleburne B. Hatfield

ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 13

INVENTOR.
CLEBURNE B. HATFIELD
BY Cleburne B. Hatfield

ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 14

INVENTOR.
CLEBURNE B. HATFIELD
BY Cleburne B. Hatfield
ATTORNEY

INVENTOR.
CLEBURNE B. HATFIELD
BY Cleburne B. Hatfield

ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 16

INVENTOR.
CLEBURNE B. HATFIELD
BY Cleburne B. Hatfield

ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 18

INVENTOR.
CLEBURNE B. HATFIELD
BY Cleburne B. Hatfield
ATTORNEY

March 13, 1962     C. B. HATFIELD     3,024,596
PROPULSION SYSTEM WITH AUTOMATIC CONTROL OF FUEL AND AIR
Filed March 16, 1955     49 Sheets-Sheet 19

INVENTOR.
CLEBURNE B. HATFIELD
BY Cleburne B. Hatfield
ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 20

INVENTOR.
CLEBURNE B. HATFIELD
BY Cleburne B. Hatfield

ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 22

INVENTOR.
CLEBURNE B. HATFIELD
BY Cleburne B. Hatfield
ATTORNEY

March 13, 1962

C. B. HATFIELD 3,024,596

PROPULSION SYSTEM WITH AUTOMATIC CONTROL OF FUEL AND AIR

Filed March 16, 1955

INVENTOR.
CLEBURNE B. HATFIELD

BY Cleburne B. Hatfield

ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 24

INVENTOR.
CLEBURNE B. HATFIELD

BY Cleburne B. Hatfield

ATTORNEY

March 13, 1962   C. B. HATFIELD   3,024,596
PROPULSION SYSTEM WITH AUTOMATIC CONTROL OF FUEL AND AIR
Filed March 16, 1955   49 Sheets-Sheet 27

INVENTOR.
CLEBURNE B. HATFIELD
BY Cleburne B. Hatfield

ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 28

INVENTOR.
CLEBURNE B. HATFIELD
BY Cleburne B. Hatfield
ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 29

INVENTOR.
CLEBURNE B. HATFIELD
BY *Cleburne B. Hatfield*

ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 30

INVENTOR.
CLEBURNE B. HATFIELD
BY Cleburne B. Hatfield
ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 33

INVENTOR.
CLEBURNE B. HATFIELD
BY *Cleburne B. Hatfield*

ATTORNEY

INVENTOR.
CLEBURNE B. HATFIELD
BY Cleburne B. Hatfield

ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 35

INVENTOR.
CLEBURNE B. HATFIELD
BY Cleburne B. Hatfield
ATTORNEY

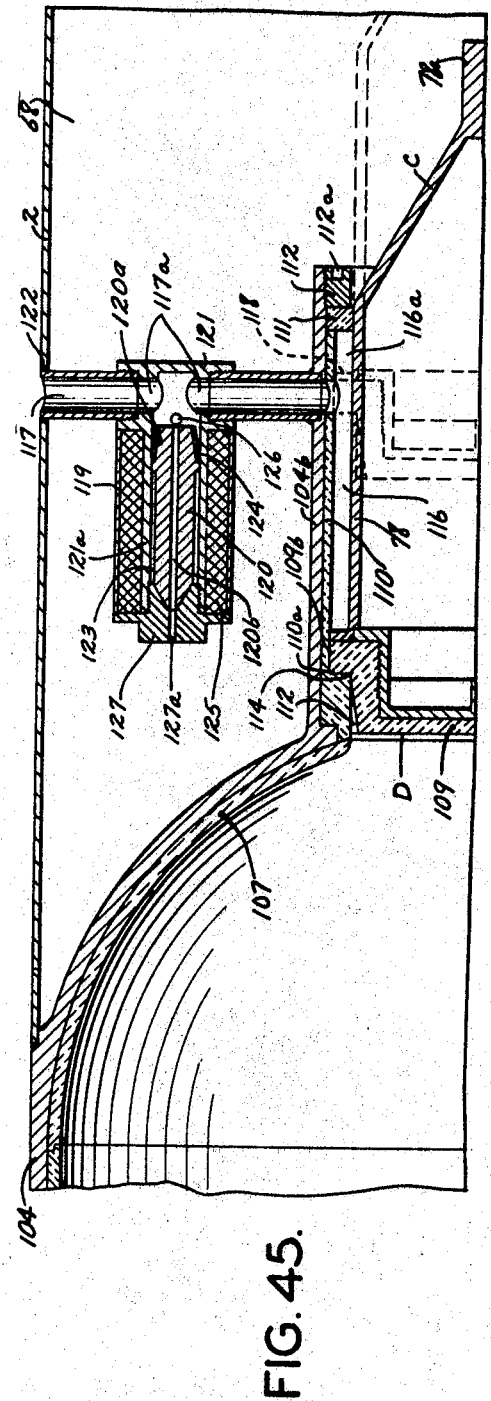
FIG. 45.
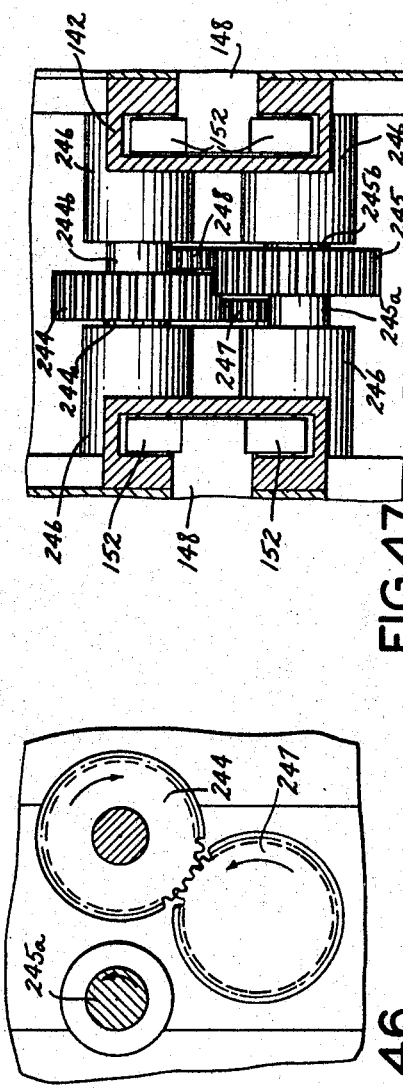
FIG. 47.
FIG. 46.
INVENTOR.
CLEBURNE B. HATFIELD
ATTORNEY March 13, 1962 — C. B. HATFIELD — 3,024,596
PROPULSION SYSTEM WITH AUTOMATIC CONTROL OF FUEL AND AIR
Filed March 16, 1955 — 49 Sheets-Sheet 37
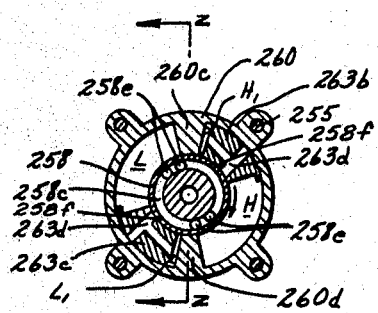
FIG. 48.
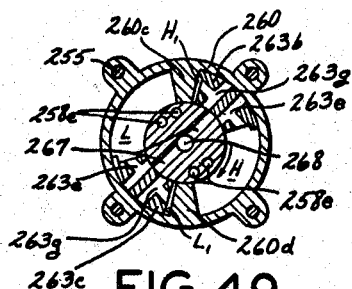
FIG. 49.
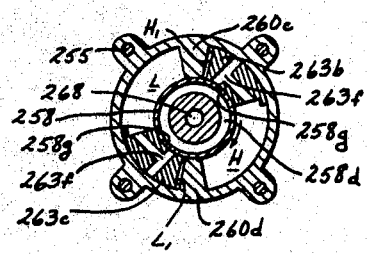
FIG. 50.
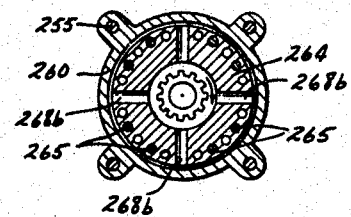
FIG. 51.
FIG. 71.
FIG. 52.
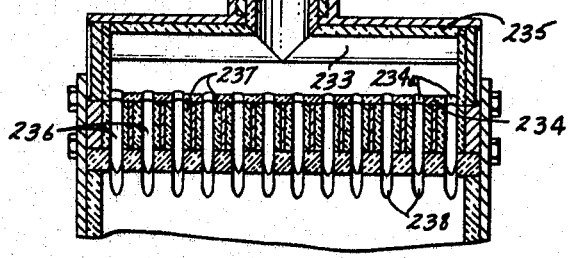
*INVENTOR.*
CLEBURNE B. HATFIELD
BY Cleburne B. Hatfield
ATTORNEY March 13, 1962     C. B. HATFIELD     3,024,596
PROPULSION SYSTEM WITH AUTOMATIC CONTROL OF FUEL AND AIR
Filed March 16, 1955     49 Sheets-Sheet 38

INVENTOR.
CLEBURNE B. HATFIELD
BY Cleburne B. Hatfield
ATTORNEY

March 13, 1962     C. B. HATFIELD     3,024,596
PROPULSION SYSTEM WITH AUTOMATIC CONTROL OF FUEL AND AIR
Filed March 16, 1955            49 Sheets-Sheet 40
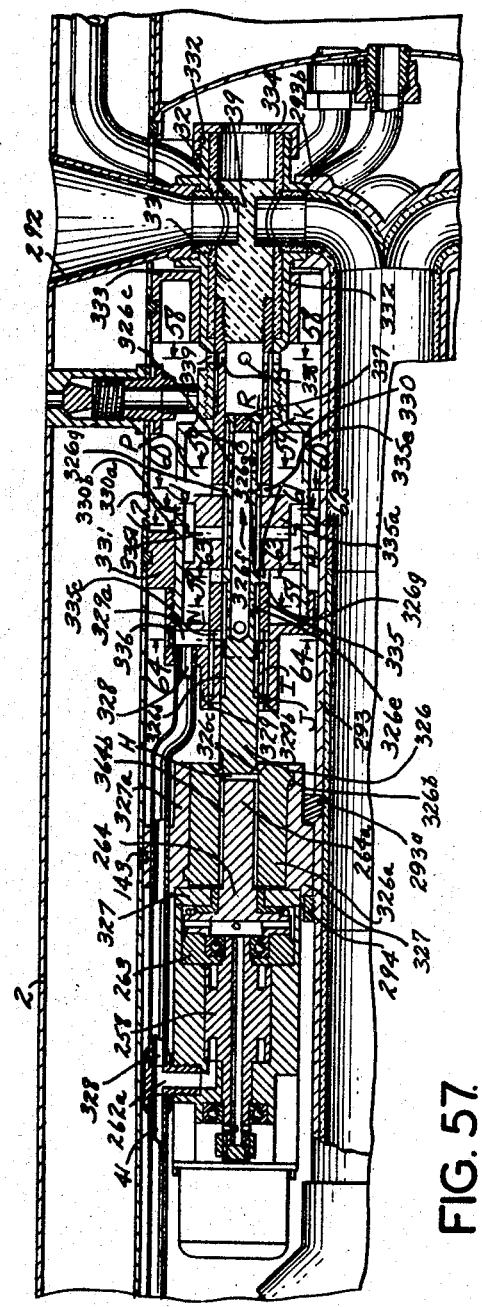
INVENTOR.
CLEBURNE B. HATFIELD
BY Cleburne B. Hatfield
ATTORNEY March 13, 1962     C. B. HATFIELD     3,024,596
PROPULSION SYSTEM WITH AUTOMATIC CONTROL OF FUEL AND AIR
Filed March 16, 1955     49 Sheets-Sheet 45

INVENTOR.
CLEBURNE B. HATFIELD
BY
ATTORNEY

INVENTOR.
CLEBURNE B. HATFIELD
BY Cleburne B. Hatfield
ATTORNEY

March 13, 1962 C. B. HATFIELD 3,024,596
PROPULSION SYSTEM WITH AUTOMATIC CONTROL OF FUEL AND AIR
Filed March 16, 1955 49 Sheets-Sheet 48

INVENTOR.
CLEBURNE B. HATFIELD
BY Cleburne B. Hatfield
ATTORNEY

March 13, 1962  C. B. HATFIELD  3,024,596
PROPULSION SYSTEM WITH AUTOMATIC CONTROL OF FUEL AND AIR
Filed March 16, 1955  49 Sheets-Sheet 49

INVENTOR.
CLEBURNE B. HATFIELD
BY Cleburne B. Hatfield

ATTORNEY

United States Patent Office 3,024,596
Patented Mar. 13, 1962

3,024,596
PROPULSION SYSTEM WITH AUTOMATIC
CONTROL OF FUEL AND AIR
Cleburne B. Hatfield, New York, N.Y., assignor to Strato-Missiles, Inc., New York, N.Y., a corporation of Delaware
Filed Mar. 16, 1955, Ser. No. 494,634
29 Claims. (Cl. 60—35.6)

This invention relates to a propulsion system, more particularly to a system which is novel in design and characteristics and economical in performance.

An object of this invention is to provide a greater thrust or propelling force in proportion to the weight of the propulsion system. This object will have the corollary effect of providing increased acceleration and thus achieving a greater velocity in a short period of time. This will enable this as a missile to be effective not only against enemy planes but against other enemy missiles.

Another object of this invention is to provide a new and novel propulsion system which will utilize very plentiful, inexpensive, safe and universally available fuel such as ordinary kerosene, commercial or residential fuel oil, for supplying the energy of propulsion. It is well known that gasoline, kerosene, or fuel oil contains more energy per pound than gun powder or TNT. As a result of this new and novel propulsion system it is possible to make use of this common and plentiful type of fuel with remarkable effectiveness.

Another object of this invention is to provide a missile with a propulsion system in which there will be the minimum of precaution required for safe storage and the minimum of hazard in stowage.

Another object of this invention is to provide a propellent system in which there will be no maintenance required while in stowage, or work or effort required to maintain readiness of the missile.

Another object of this invention is to provide a new and novel missile which is so constituted that a portion of its propellent hot gases may be conducted from the combustion chamber to a point near the front of the missile and there allowed to escape under controlled conditions, in a radial direction with respect to the missile, when required to provide a lateral thrust for guidance.

A further object of this invention is to provide an electrothermal mechanical arrangement which will allow the escape of radial jets of the hot propellant gases in response to the signals from the guidance and control system of the missile so that the lateral thrust of the radial jet, or the resultant of the forces exerted by more than one jet will alter the course of the missile.

Another object of this invention is to provide a missile with cylindrical shape and with an ogive or pointed nose forming a configuration similar to that of a projectile, having no projecting vanes or fins. This provides a missile which has no aerodynamic problems whatever and will require no aerodynamic research or experimentation in its design or development. No critical center of gravity problems and no difficulties due to center of gravity shifting, as fuel is consumed, are encountered in this missile.

Another object of this invention is to provide a propulsion system so instantaneous in operation, so powerful, and producing such a great thrust in proportion to its weight, that no booster or "jato" unit is required in any missile application, whether in anti-aircraft application, air to air, surface to surface, or to whatever use the propulsion system may be put. As is well known, a large, heavy, space taking and expensive booster is required for both the "Terrier" and the "Nike" anti-aircraft missiles to provide the initial acceleration.

As to size and weight, another object of this invention is to provide a missile which will be lighter in weight than any other missile which has the same thrust or propulsive force and the same range and velocity, thereby having less mass to accelerate in proportion to the force of the thrust and thus has greater acceleration both longitudinally and laterally.

A further object of this invention is to provide a missile which may receive any sort of electrical signal from any sort of a guidance and control system, which signal, when amplified, will open or close orifices of the radial jets of the missile and thus provide the lateral acceleration for steering.

A further and corollary object, subject to the facts recited above, is to provide a new guided missile which will be so accurate and deadly, and at the same time so economical in cost, that the American people may have the unparalleled protection which a missile of such high probability of kill can afford, and at the same time avoid straining or weakening the American economy by the astronomical costs of present and currently developed and proposed missiles. This nation is now spending immense sums in the development of many types of guided missiles. These missiles have thus far achieved only fragmentary, partial and indifferent success. Further, even if the current missiles now proposed and under development in this nation were to achieve a partial and small success the cost per missile is so very great that the cost of fully defending our Country with guided missiles would amount to countless billions of dollars in excess of the cost of a much better defense that can be provided by the new missile described herein.

A further object of this invention is to provide a missile having a propulsion system utilizing non critical, abundant and readily available material, rather than scarce material. Thus in case of international crisis or conflict large mass production of missiles can be achievable without the necessity of using critical materials.

A further object of this invention, broadly described, is to provide a weapon in the form of a missile which has great versatility in use and in tactics of defense and offense.

Another object of this invention is to provide a missile which can be used as a ground to air, air to surface and subsurface or anti-aircraft weapon against all manner of aerial targets, such as piloted aircraft, pilotless aircraft and guided missiles, and against enemy ships and submarines.

A further object of this invention is to provide a missile in which the propulsion system will have that state of readiness built into it that will enable it to instantly propel itself with very high acceleration, without the necessity of using and employing boosters in any instance.

These and other objects will appear more fully upon consideration of the detailed description of the embodiment of the invention which follows. Although only one specific form of the missile is described and illustrated in the following drawings it is to be expressly understood that these drawings are for the purpose of illustration only and are not to be construed as defining the scope of the invention for which latter purpose reference should be had to the appended claims.

Referring now to the drawings, wherein like reference characters indicate like parts throughout the several views. (These views are shown in various scales for convenience of illustration.)

FIG. 1 is a side view of the complete missile.
FIG. 2 is a front end view of the missile.
FIG. 3 is a rear end view of the missile.
FIG. 4A is a partial longitudinal section through the missile.

FIG. 4B is a partial longtiudinal section through the missile.
FIG. 4C is a partial longitudinal section through the missile.
FIG. 4D is a partial longitudinal section through the missile.
FIG. 4E is a partial longitudinal section through the missile.
FIG. 4F is a partial longitudinal section through the missile.
FIG. 4G is a partial longitudinal section through the missile.
FIG. 4H is a partial longitudinal section through the missile.
FIG. 4I is a partial longitudinal section through the missile
FIG. 4J is a partial longitudinal section through the missile.
FIG. 4K is a partial longitudinal section through the missile.
FIG. 4L is a partial longitudinal section through the missile.
The above mentioned partial longitudinal sections together and in total assembly constitute a complete longitudinal section of the missile.
FIG. 5 is a transverse section on line 5—5 of FIG. 4B.
FIG. 6 is a transverse section on line 6—6 of FIG. 4B.
FIG. 7 is a transverse section on line 7—7 of FIG. 4B.
FIG. 8 is a transverse section on line 8—8 of FIG. 4B.
FIG. 9 is a transverse section on line 9—9 of FIG. 4B.
FIG. 10 is a transverse section on line 10—10 of FIG. 4C.
FIG. 11 is a transverse section on line 11—11 of FIG. 4C.
FIG. 12 is a transverse section on line 12—12 of FIG. 4C.
FIG. 13 is a transverse section on line 13—13 of FIG. 4C.
FIG. 14. is a transverse section on line 14—14 of FIG. 4C.
FIG. 15 is a transverse section on line 15—15 of FIG. 4C.
FIG. 16 is a transverse section on line 16—16 of FIG. 4D.
FIG. 17 is a transverse section on line 17—17 of FIG. 4D.
FIG. 18 is a transverse section on line 18—18 of FIG. 4F.
FIG. 19 is a transverse section on line 19—19 of FIG. 4D.
FIG. 20 is a transverse section on line 20—20 of FIG. 4D.
FIG. 21 is a transverse section on line 21—21 of FIG. 4D.
FIG. 22 is a transverse section on line 22—22 of FIGS. 4E and 4D.
FIG. 23 is a transverse section on line 23—23 of FIG. 4D.
FIG. 24 is a transverse section on line 24—24 of FIG. 4D.
FIG. 25 is a transverse section on line 25—25 of FIG. 4D.
FIG. 26 is a transverse section on line 26—26 of FIG. 4E.
FIG. 27 is a transverse section on line 27—27 of FIG. 4F.
FIG. 28 is a transverse section on line 28—28 of FIG. 4G.
FIG. 29 is a transverse section on line 29—29 of FIG. 4H.
FIG. 30 is a transverse section on line 30—30 of FIG. 4H.
FIG. 31 is a transverse section on line 31—31 of FIG. 4H.
FIG. 32 is a transverse section on line 32—32 of FIG. 4H.
FIG. 33 is a transverse section on line 33—33 of FIG. 4I.
FIG. 34 is a transverse section on line 34—34 of FIG. 4I.
FIG. 35 is a transverse section on line 35—35 of FIG. 4I.
FIG. 36 is a transverse section on line 36—36 of FIG. 4I.
FIG. 37 is a transverse section on line 37—37 of FIG. 4I.
FIG. 38 is a transverse section on line 38—38 of FIG. 4I.
FIG. 39 is a transverse section on line 39—39 of FIG. 4K.
FIG. 40 is a transverse section on line 40—40 of FIG. 4K.
FIG. 41 is a transverse section on line 41—41 of FIG. 4K.
FIG. 42 is a transverse section on line 42—42 of FIG. 4K.
FIG. 43 is a transverse section on line 43—43 of FIG. 4K.
FIG. 44 is a transverse section on line 44—44 of FIG. 4K.
FIG. 45 is a fragmentary section on line 45—45 of FIG. 7.
FIG. 46 is a fragmentary transverse section of the compressor reverse gear on line 46—46 of FIG. 4F.
FIG. 47 is a fragmentary transverse section of the compressor reverse gear on line 47—47 of FIG. 4F.
FIG. 48 is a fragmentary section through the pneumatic servo on line 48—48 of FIG. 4I.
FIG. 49 is a fragmentary section through pneumatic servo on line 49—49 of FIG. 4I.
FIG. 50 is a fragmentary section through pneumatic servo on line 50—50 of FIG. 4I.
FIG. 51 is a fragmentary section through pneumatic servo on line 51—51 of FIG. 4I.
FIG. 52 is a fragmentary section through the fuel replenishing valve on line 52—52 of FIG. 4I.
FIG. 53 is a fragmentary section through outlet orifices of air metering motor on line 53—53 of FIG. 9.
FIG. 54 is a fragmentary section through outlet orifices of air metering motor on line 54—54 of FIG. 9.
FIG. 55 is a fragmentary section through spring loaded outlet orifices of rotary compressor unit on line 55—55 of FIG. 25.
FIG. 56 is a fragmentary section through an air compressor unit taken on line 56—56 in FIG. 25.
FIG. 57 is a fragmentary longitudinal section through an alternate servo system for controlling radial jets taken on the same plane surface as FIG. 4I.
FIG. 58 is a fragmentary transverse section through an alternate servo system for controlling radial jets taken on line 58—58 in FIG. 57.
FIG. 59 is a fragmentary transverse section through an alternate servo system for controlling radial jets taken on line 59—59 in FIG. 57.
FIG. 60 is a fragmentary transverse section through an alternate servo system for controlling radial jets taken on line 60—60 in FIG. 57.
FIG. 61 is a fragmentary transverse section through an alternate servo system for controlling radial jets taken on line 61—61 in FIG. 57.
FIG. 62 is a fragmentary transverse section through an alternate servo system for controlling radial jets taken on line 62—62 in FIG. 57.
FIG. 63 is a fragmentary transverse section through an alternate servo system for controlling radial jets taken on line 63—63 in FIG. 57.
FIG. 64 is a fragmentary longitudinal section through an alternate servo system for controlling radial jets taken on line 64—64 of FIG. 57.

FIG. 71 is a fragmentary section through a portion of the turbine showing the multiple orifices through which hot gases pass into the turbine, taken on line 71—71 on FIG. 21.

FIG. 77 is a transverse section through the missile taken on line 77—77 in FIG. 72.

Figure 4A:
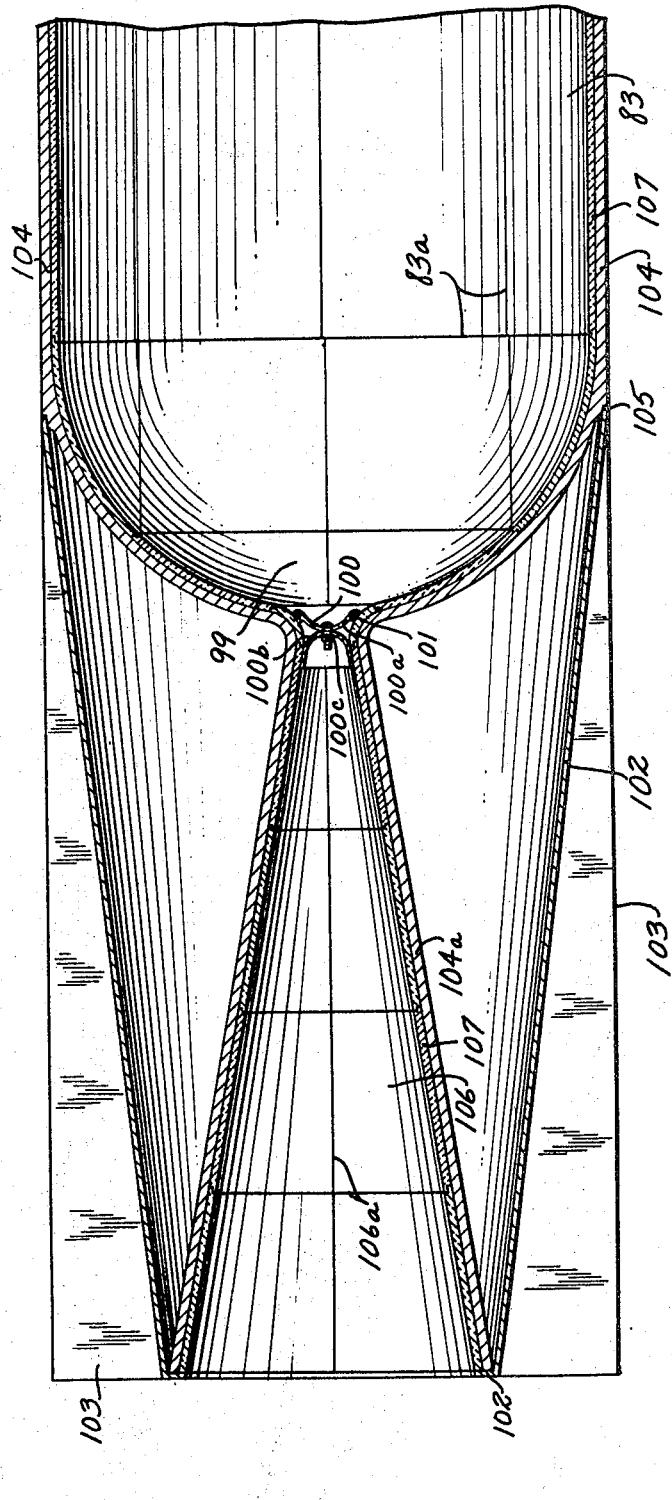

Referring now to the drawings and beginning the description of the construction and functioning of the missile a general description will first be given of the over all functioning of the missile. Then a more detailed description will be given.

In the overall general description all the longitudinal section drawings begining from the front or nose of the missile and proceeding to the rearward will be examined together with those transverse cross section drawings that may be needed in this overall description. This will disclose and permit understanding of the overall relative arrangement of the component parts. For a logical procedure in this overall description the examination and description will first begin with the nose of the missile and proceed rearward. This having been completed the detailed description of the missile will begin, starting from the rear or aft end of the missile and proceeding to the front. In this detailed description each part and component of the missile will be described and disclosed in detail.

In FIG. 1 is shown a sideview of the complete assembly of the guided missile. The sharp pointed nose 1 is shaped in the proper configuration for supersonic speed and is comprised or formed of a suitable radome material which is translucent to both radar waves or impulses and to infra red rays. At 2 in FIG. 1 is shown the exterior cylindrical shell or tube which extends nearly the complete length of the missile and serves a multiciplicity of purposes. It serves as the longitudinal structural part of the entire missile and also as the external skin or covering of the missile. At certain portions of its length it also serves as the outer perimeter of the compressed air chamber for purposes which will subsequently be explained. The rearmost end of this cylindrical outer tube is suitably secured to the combustion chamber of the missile which chamber is formed of a high heat resistant metal. The above mentioned cylindrical tube 2 is formed of a suitable light metal alloy such as an aluminum or magnesium alloy.

The outer cylindrical tube 2 need not be manufactured in one continuous piece but for ease of manufacturing may be formed of more than one cylindrical tube joined end to end by welding or other suitable means as will be subsequently fully described.

This use of an outer cylindrical skin for the dual purpose of both the outer surface or skin of the missile and for the longitudinal structural part provides a very efficient and light weight structural arrangement. The thin walled outer cylindrical skin is reinforced against buckling at short intervals by bulkheads in the form of circularly shaped transverse parts which closely fit and contact the inner surface of the outer cylinder. These circular parts which serve as reinforcing bulkheads also serve as structural parts of interior components of the missile as will subsequently be explained. This arrangement prevents buckling of the outer shell under bending stresses and provides a very strong and light construction.

In FIG. 1 the vents or orifices 3 of the radial jets mentioned in the paragraphs above which give lateral thrust when required are shown. As subsequently explained there are four lateral jets at this position, each located 90 degrees in rotational position from each other.

FIG. 2 shows a full size scale drawing of the front end of the missile including the outer shell 2, the radome 1 and a smaller cylindrical tube 4 which is concentric with the outer tube 2. This smaller tube does not extend the complete distance of the missile but merely a portion of the way as will be subsequently seen by examination of the longitudinal section drawings, FIG. 4L, FIG. 4K, FIG. 4J and FIG. 4I. At the left hand portion of FIG. 4I the inner concentric cylinder terminates.

As shown in FIG. 2 the inner cylinder 4 is separated from the outer cylinder 2 by the four light sheet metal structural parts 5. These structural parts occupy only a minority of the annular space between the outer and inner cylinders and leave the vacant spaces 6 through which air may flow from the front end of the missile during the missile flight to the rotary air compressors, subsequently described which are located at about the mid point in the missile.

The components of the missile contained within the smaller cylinder 4 will now be described, beginning from the front end of the missile and proceeding to the rearward.

Figure 4B:
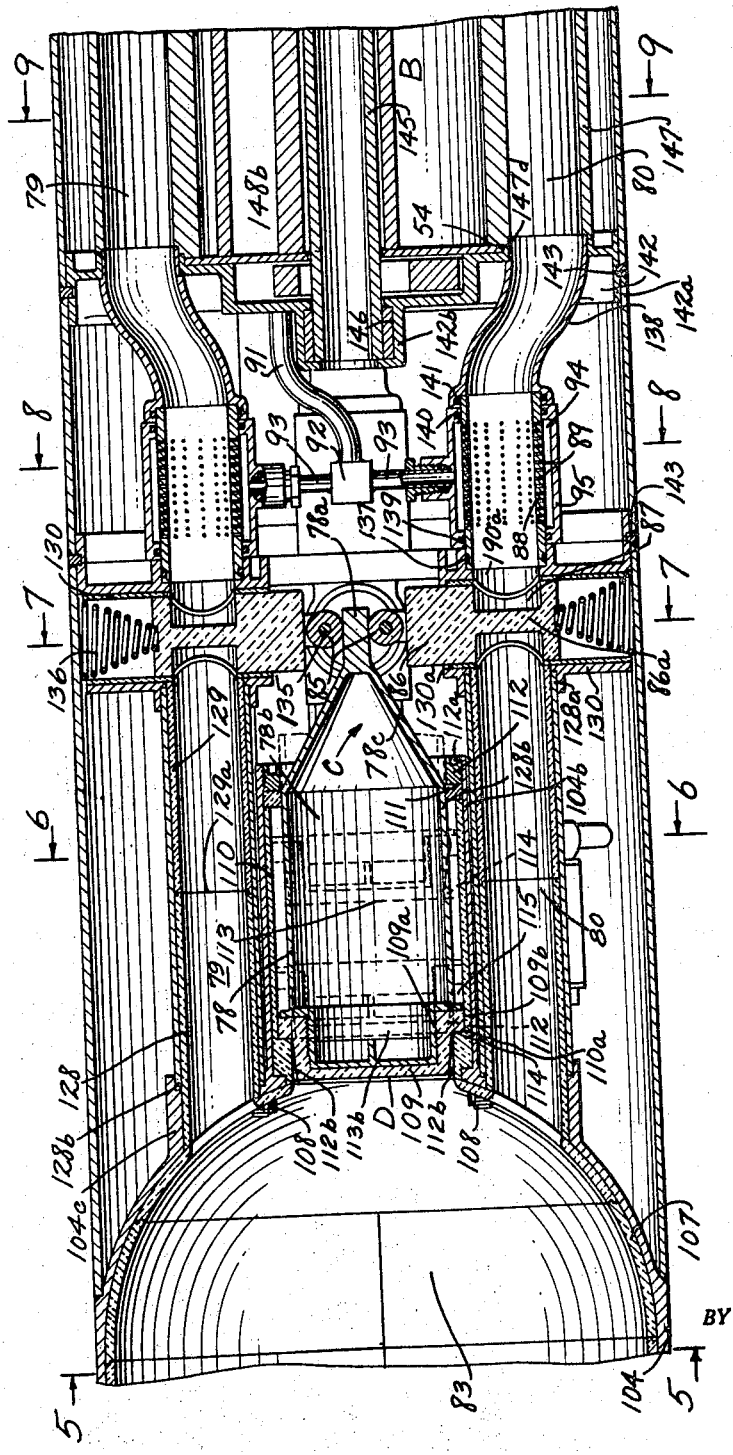
Figure 4C:
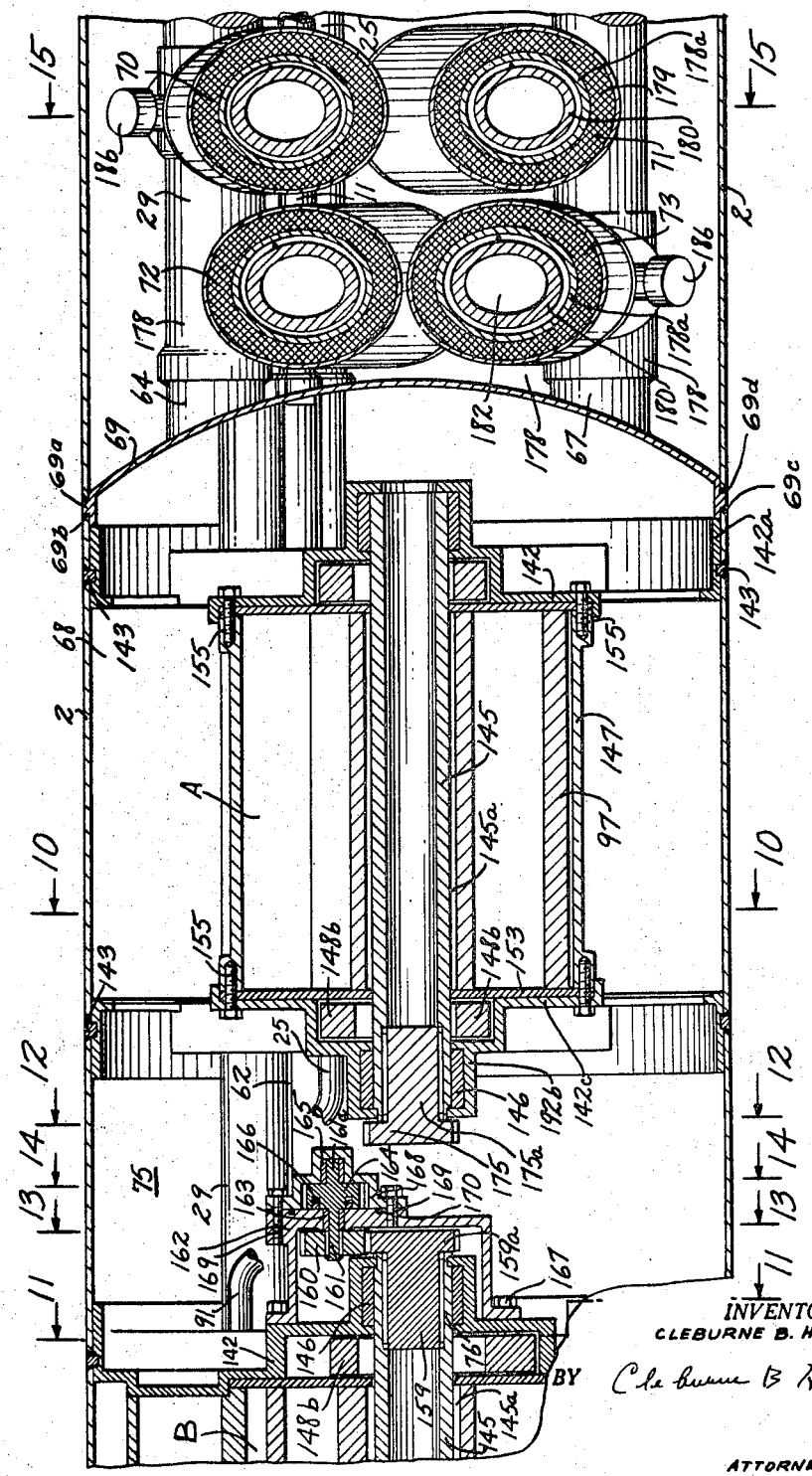
Figure 4D:
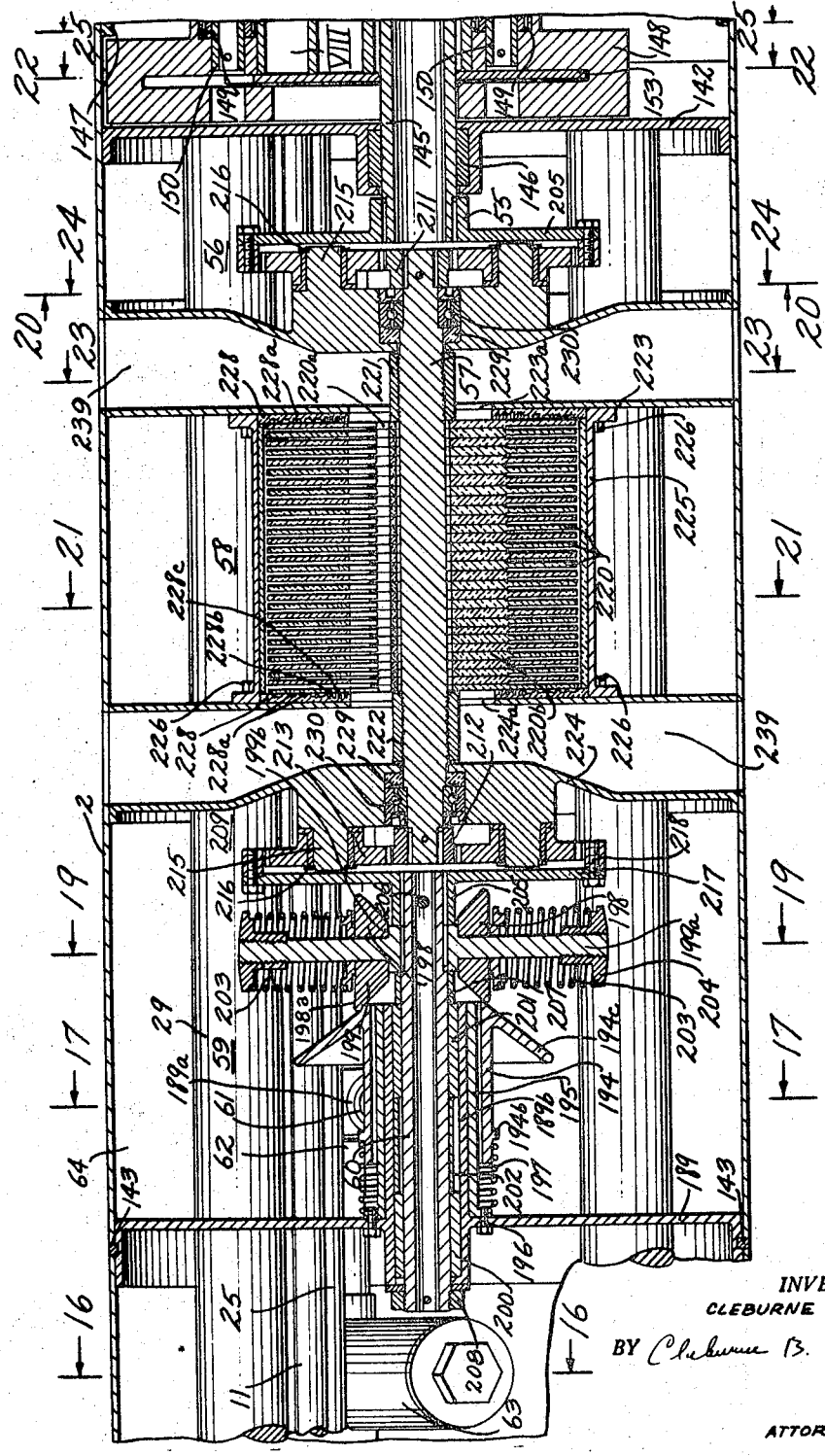
Figure 4L:
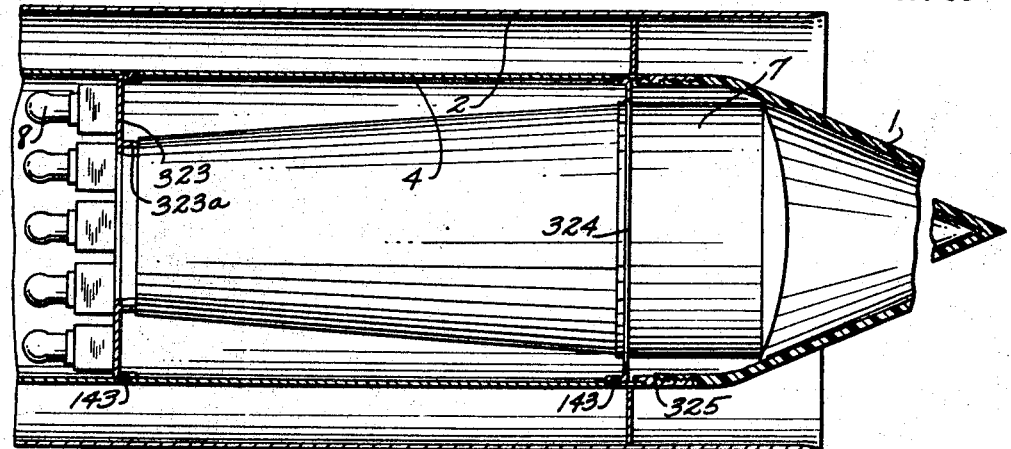

FIG. 4L shows a partial transverse section showing the radome 1 which is suitably secured to the inner cylinder 4. Projecting partially into the radome and partially contained within the front end of the cylinder 4 is an infra red detecting unit or instrument 7. This infra red unit is not shown in detail but its relative position in the missile is merely indicated since the infra red detection unit or instrument is not a part of this invention. The infra red instrument receives infra red light rays which emanate from the target and the instrument 7 is able to detect whether the center line of the missile is pointed directly toward the target.

To the rear of the infra red unit 7 are indicated areas for electronic tubes and circuits as at 8. A rotary power source 9 is shown in FIG. 4K. As previously described, a rotary power source for providing electric current for operation of the guidance system of the missile and for providing current for the continuous sparking of the spark plugs, as subsequently described, is more reliable, trouble free and requires less maintenance and replacement than a battery power source for guided missiles.

To the rear of the rotary power source is located the force or power means for rotating the rotary power source duing the flight of the missile. Compessed air is used for this purpose which is fed into a modification of a turbine 10 which will be subsequently more fully described. This turbine is fed by the high pressure air line 11. The air after passing through the turbine, finally escapes hrough radial orifices to the outer atmosphere as will be subsequently shown and described.

It is very necessary that the rotary power source rotate at a uniform speed within very close limits in order that the voltage and/or frequencies produced may not vary beyond desirable limits. To accomplish this a mechanical governor is provided, subsequently fully described, which when rotating above a certain speed reduces the orifice through which the air flows to prevent the turbine from rotating beyond a designated speed. Also the size of the air flow line and air pressure and power supplied the turbine accelerates the turbine until the critical desired speed is reached.

Since the speed of the turbine is high, such as of the order of 20,000 revolutions per minute, it is not practical mechanically to rotate the governor at this same speed as the compressor. Consequently a reduction gear 13, subsequently more fully described, is provided to reduce the speed of the mechanical governor 12 to a fraction of that of the turbine.

An air valve 14, subsequently more fully described, is provided which is opened by electric solenoid means. This air valve remains closed at all times during the storage of the missile. Then immediately prior to firing the missile the solenoid air valve 14 is opened by electrical power external to the missile and within a matter of one or two seconds the generator or rotary electric power source for the missile is accelerated up to the critical or desired speed. This mechanical governor for the rotary power source has a means built within the mechanical governor which mechanically amplifies the movements of the centrifugal weights of the governor by a large ratio such as a ratio of ten to one. This means, subsequently fully described, provides a very sensitive adjustment means which will maintain the speed of the rotation of the turbine and the generator or rotary power source within very close limits.

FIG. 4J shows next the war head 15 of the missile. This war head may be TNT or any suitable explosive. By lengthening the warhead compartment to a suitable distance atomic war heads may be carried. The antenna and 16, which is electrically insulated from the outer shell 2, provides the proximity type fuze with the radar intelligence which explodes the war head when the missile has reached the desired distance from the target. This radar signal is amplified and operates the detonating mechanism at 17 which is shown in its relative position. Since a conventional proximity type fuze is utilized the fuze does not constitute a part of this invention but is merely shown to locate the relative position of this component within the missile.

The next major component of the missile is the fuel tank or compartment 18, a portion of which is shown in FIG. 4J and the remainder of which is shown on FIG. 4I. This fuel tank, as previously described, contains an ordinary fuel such as kerosene, fuel oil, alcohol or some other similar suitable material.

Means are provided for continually providing a suitable pressure on the liquid fuel so that it will continuously and rapidly feed to the combustion chamber. This is accomplished pneumatically. A slidable diaphragm 19 is provided which is made liquid tight by the O ring 20. The space 21 between the diaphragm and the front end 22 of the fuel tank is filled at all times by compressed air from the high pressure air line 11 through the lead off line or pipe 23. As the fuel 24 is used on the other side of the diaphragm 19 the high pressure air continues to flow into the enlarging space 21 and forces the diaphragm at all times against the fuel.

In FIG. 4I is shown at the rear end of the tank, a feed pipe line 25 leads to the combustion chamber at the rear of the missile. The pipe line 26 leads to the fuel line orifice and valve 27 which is subsequently more fully described.

The partial longitudinal section FIG. 4I also contains considerable additional mechanism which will be referred to at this time and subsequently more fully described. The hot gas lines 28 and 29, leading from the combustion chamber at the rear end of the missile, unite to form the common hot gas pipe 30. From the common pipe 30 branch off four radial pipe lines 31, two of which are seen in FIG. 4I. These four radial jet pipe lines, shown more fully in transverse sections, subsequently more fully described, are each provided with a valve, the orifices of which are opened or closed completely, or to any desired degree of closing, by the longitudinal movement of the valve plunger 33. These plungers are formed of some suitable material which is resistant to a very high heat such as a ceramic material, or "Graphitar," or any other suitable material.

Four pneumatic servo systems, two of which are generally located at 34 in FIG. 4I, and which will be subsequently fully explained, receive rotary signals from the servo motors 35. The rotary signals are amplified by spur gear systems 36 and rotate the sleeves 37 at high speed. By the rotation of the sleeves 37 and the action of the threads 38 the valve plunger is moved longitudinally until the narrow neck 39 of the plunger 33 is coincident with, or partially coincident with the radial passageways 31. By this action a particular radial jet orifice may be either fully open, partially open or fully closed.

The compressed air for the servo system is provided from the main high pressure air line 11, from which the line 40 is led off. The line 40 enters a distributor from whence the four lines 41 lead off to the four servo mechanisms. The solenoid operated valve 42 forms an air tight seal during the storage of the missile. This valve is opened just prior to using the missile by electric power from an outside power source. The solenoid valve as subsequently explained when opened once is held in the open position by a spring loaded detent, so compressed air can flow to the pneumatic servos throughout the flight of the missile.

The hot gas lines 28 and 29, leading from the combustion chamber at the rear, forward to the radial jets, each have a solenoid operated valve 43, subsequently fully described, which form an air and gas tight seal and prevents either compressed air or hot gas from flowing further until the valve is opened. These two valves are also opened by an outside power source external to the missile, an instant before the missile is fired. As mentioned before, and as subsequently fully explained, the solenoid valves, once opned, are caught by a spring loaded detent and remain open throughout the flight of the missile. This provides a source of hot gases for the radial jet action, when the radial jet action is required.

In FIG. 4H is shown located at 44 the forwarl hot gas turbine. The hot gas for the turbine is provided by a pipe line 74 leading from the combustion chamber in the rear and not shown in FIG. 4H, but which may be seen in FIGS. 31 and 32.

In order to permit this turbine from accelerating to too high a rotational speed, a mechanical governor 46 is provided which will actuate a valve, not shown in FIG. 4H, but later fully described, in such a manner that when the turbine 44 begins to rotate above a desriable speed the initial compression of the springs 47 of the governor, and the mechanical action later fully described, occurs which causes the valve to partially close, thus decreasing the passageway through which hot gases flow to the turbine 44. This decreases the flow of hot high pressure gas to the turbine and slows down the turbine.

Since the turbine, in order to be efficient, rotates at high speed, such as 15,000 to 20,000 revolutions per minute, it is obvious that it would not be practical for the mechanical governor to rotate at that speed. Accordingly a reduction gear 48, subsequently more fully shown and described, is provided for stepping down the speed of the governor to a reasonable speed, which may be of the order of 3000 revolutions per minute.

The shaft 49 of the turbine 44 drives the spur gear 50 of the planetary reduction gear 48. The speed governor is secured to the shaft 51 which is directly connected to the shaft 52 of the forward compressor unit. This of course causes the forward compressor units, of which there are four, to rotate the same speed as the governor 46, or approximately 3000 revolutions per minute more or less.

FIG. 4H, FIG. 4G and FIG 4F show transverse sections through the compressors and show the location of the first four or forward group compressor units. The unit I is partially shown by FIG. 4H and the remainder of this compressor unit is shown on FIG. 4G. The compressor unit II is shown in FIG. 4G. The compressor unit III is shown in FIG. 4G and the unit IV is shown in FIG. 4F. Each of these four units are rotationally connected to each other by the short splined shafts 53. This permits longitudinal flexibility and yet compels positive rotation in unison of all four compressor units.

The compressor units I, II, III, and IV are all connected rotationally to the shaft 51 which is in turn connected through the reduction gear to shaft 49 of the turbine 44 through the reduction gear 48. This turbine is seen in FIG. 32, which is a transverse section and, as subsequently more fully explained, rotates in counter clockwise direction as viewed from the front of the missile. This rotation action, through the planetary reduction gear, as shown in cross section in FIG. 31, causes the shaft 51 to rotate in a clockwise direction. This action causes the first four compressor units I, II, III and IV to also rotate in a clockwise direction.

Now in order to counteract the rotational torque of the rotation of the forward turbine 44 and the forward battery of four compressor units it becomes necessary to cause the rear or aft battery of the compressor units, shortly to be designated by number, to rotate in the opposite direction. Not only is it desirable for these aft compressor units to rotate in the opposite direction to the rotation of the forward four compressors, but the rotation should be at the same speed. This means the aft or rearmost battery of four compressors must rotate counter clockwise.

In order to insure this a spur gear arrangement, generally designated 54 and subsequently fully described, is provided. This spur gear arrangement provides a positive interlocking which causes the forward battery of compressors and the aft or rearmost battery of compressors to rotate in opposite directions and at the same speed.

The aft or rearmost battery of rotary compressors are shown in FIGS. 4F, 4E and FIG. 4D. The compressor unit V is shown in FIG. 4F. The compressor unit VI is shown partially in FIG. 4F and the remainder of FIG. 4E. Compressor unit VII is shoswn in FIG. 4E and compressor unit VIII is shown partially in FIG. 4E and the remainder in FIG. 4D. The four aft or rearmost compressor units are also connected each to each by the short splined shafts 53. This allows a certain flexibility in alignment of the various compressor units and yet compels positive rotation in unison.

The shaft 145 of the compressor unit VIII is received by the splined flange socket 55 of the planetary reduction gear 56. This reduction gear on its aft or rearward side is connected to the shaft 57 of the rear or aft turbine 58 which is subsequently fully described. A governor 59 is required to prevent this turbine from running away in rotational speed, just as in the case of the forward turbine. And also as in the case of the forward tubine the high speed of the turbine necessitates a reduction gear arrangement between the turbine shaft 57 and the shaft 60 of the mechanical governor. This permits the governor to rotate at a reasonable speed.

The governor 59 operates a valve 61, subsequently fully described, which is disposed transversely across the hot gas pipe line 62, which supplies high pressure hot gases to the turbine 58. A solenoid valve 63 subsequently fully shown and described, is connected in the pipe line 62. This solenoid valve is air tight and gas tight when in a closed position. This arrangement permits compressed air to fill the combustion chamber, the compressed air chamber, subsequently described, and thence the aft portions of the gas line 62, between the valve 63 and the combustion chamber in the rear. Immediately prior to the firing of the missile electric power from a source outside the missile actuates the solenoid and opens the valve 63. As subsequently fully described, this valve when opened fully is then held open by a spring detent arrangement, subsequently fully explained, and thence remains open throughout the flight of the missile.

The functioning of the rotary compressors is very efficient from the standpoint of the ratio of the weight of the compressor mechanism in relation to the weight of compressed air delivered per second into the compressed air bottle or chamber. From this chamber the compressed air is metered into the combustion chamber. The space between the exterior of the rotary compressor mechanism and the interior of the outer tube 2 of the missile is completely filled with a continually replenished supply of air which is taken from the front of the missile as it moves in forward flight, through the passageways 6 as seen in FIG. 2.

As the missile travels at high speed a ram effect takes place, whereby the pressure of the air entrapped between the battery of rotary compressors and the outer cylindrical shell 2 is at all times greater than atmospheric pressure at sea level. This means that the air when drawn into the forward and aft battery of compressors is initially at a greater pressure than sea level pressure, which makes for increased efficiency in performance of the propulsion mechanism of the missile. This pressure, in excess of sea level pressure, of course varies as a function of the density of the air which the missile is passing through.

Figure 25:
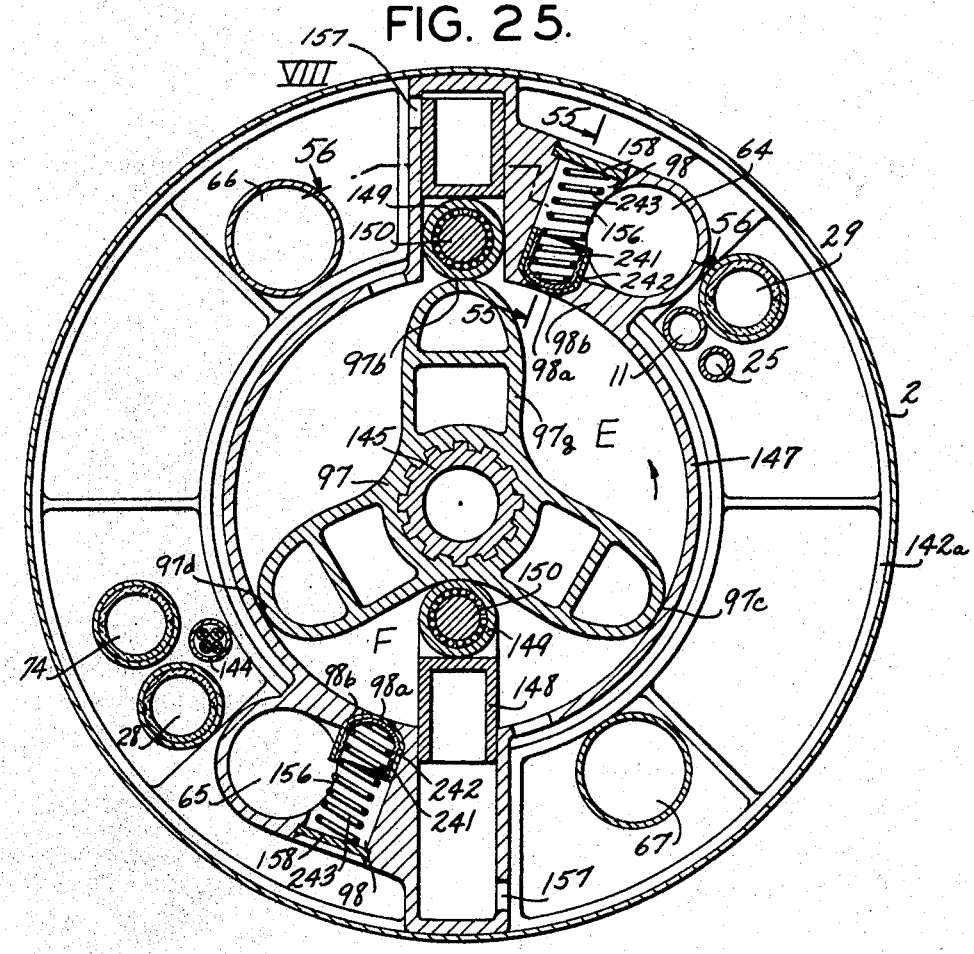

FIG. 4C and FIG. 4B show the air and fuel metering system, the carburetor system and the compressed air chamber. The exhaust compressed air from the forward and aft battery of air compressors units together feed into the four compressed air pipes 64, 65, 66 and 67, as seen in several transverse cross section views, as for instance, in FIG. 25. This FIG. 25 is a transverse section through one of the rotary compressor units of the aft or rearmost battery of compressors. The compressed air pipes 66 and 67, as subsequently more fully described, are common high pressure air lines leading from the two exhaust sides of the front or forward battery of compressors. The compressed air pipes 64 and 65 are common high pressure air lines leading from the exhaust side of the rearmost or aft battery of compressors.

All four high pressure pipe lines lead into the compressed air compartment or chamber 68 which is separated from the space or area occupied by the fore and aft compressors by the bulkhead 69. During the storage of the missile it is necessary that the compressed air bottle or compartment be filled with highly compressed air which must remain confined in this area, fully sealed against escaping, in order to supply a source of energy for initiating the thermo dynamic cycling of the missile.

In order to close the high pressure pipe lines 64, 65, 66 and 67 during the storage period of the missile the four large electric solenoid operated valves 70, 71, 72 and 73 (FIG. 4C) are provided which transversely cut across the four high pressure pipe lines 64, 65, 66 and 67 and when closed provide an air tight and gas tight seal. These four solenoid valves will be subsequently more fully described. The arrangement of these valves may also be seen in FIG. 15 which is a transverse section through the line 15—15 in FIG. 4C.

At the moment of firing the missile, an instant after the solenoid valves which close off the four hot gas lines 28, 29, 62 and 74 are opened by electric solenoid means, as subsequently more fully described, the compressed air, in lines 62 and 74 (see FIG. 15 and FIG. 16) begin to rush through the two turbines, thus driving the air compressors which must rotate with the turbines. The turbines instantly begin to rotate both batteries of air compressors. The air compressors compress air and pile up pressure in the high pressure pipe lines 64, 65, 66 and 67. The timing is such that about the time the air in these four lines has approximately reached the pressure of the air in the compressed air chamber 68 electric current from an external power source of the missile opens the solenoid valves 70, 71, 72 and 73 and the compressed air from the compressors is allowed to flow into the chamber 68, through the four high pressure pipes 64, 65, 66 and 67. Thus the air in chamber 68 is replenished by the compressors as fast as it is metered out into the combustion chamber in a manner subsequently more fully described.

The air in the compressed air chamber 68 surrounds a rotary air metering pump, or device, which is composed of two units which are subsequently more fully described. The forward unit A is seen in longitudinal section in FIG. 4C and a portion of the rearmost or aft unit B is also seen in FIG. 4C. The highly compressed air tends to enter the rotary pump or pneumatic motors A and B and the mechanisms tend to rotate in a manner subsequently described. If the exhaust end of these two rotary motors or metering mechanisms are open, and there is a differential in air pressure between the compressed air in the chamber 68 and the air or gas in the combustion chamber, the air in the compartment 68 surrounding the two motors will enter the motors, flow through them and cause them to rotate in a manner subsequently described. Since the two motors have a constant volume per revolution and since the air in chamber 68 has approximately a constant pressure it is obvious that approximately the same mass, or amount of air by weight, passes through the two mechanisms per revolution at any time.

The two rotary measuring units or motors rotate in opposite directions, in order to equalize the torque produced. Between the two measuring units in the general location 75 is provided a gear pump which on the aft side, as subsequently fully described, is rotationally secured by spur gear means to the shaft 76 of the aft metering motor B and in the forward side by spur gear means to the shaft 145 of the forward metering motor A. The two rotary metering mechanisms together rotate and furnish the power for rotating the gear pump 75. This gear type pump 75 is so designed and proportioned that for every revolution of the air metering motors liquid fuel is forced through the gear type pump, which equals by weight about one twentieth of the weight of the air which is metered. This is approximately an optimum ratio of air to fuel to afford efficient combustion.

The liquid fuel as previously described is delivered through the fuel line 25 from the fuel supply 24 in the fuel tank 18, located near the front end of the missile.

Figure 9:
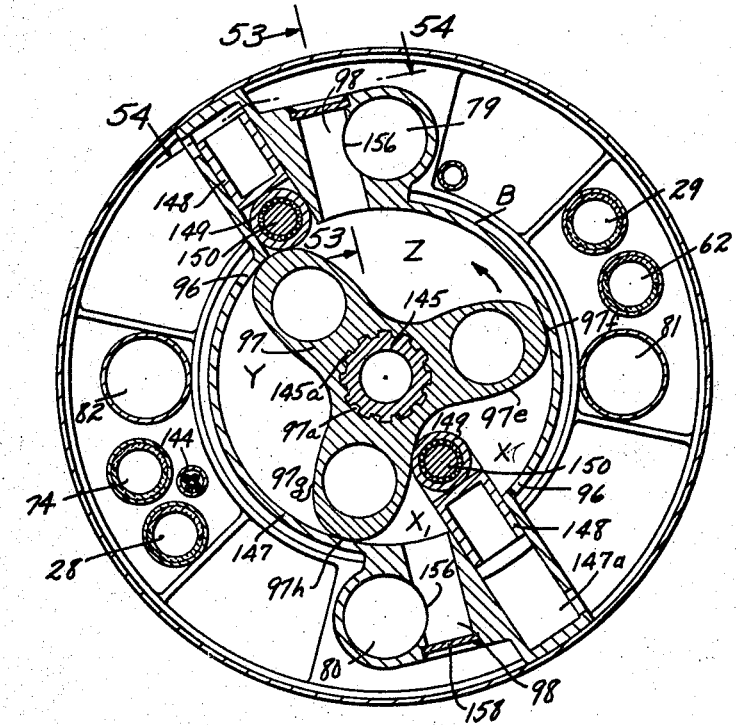

FIG. 4B shows a longitudinal section through the carburetor mechanism and the reciprocating piston 78 which in a manner subsequently described, by cam action, opens or closes the high pressure pipe lines 79, 80, 81 and 82, as seen in FIG. 9, which are the exhaust lines from the two metering motors A and B. When the pressure of the burning gases in the fuel combustion chamber 83 drops below the pressure in the compressed air chamber of compartment 68 the pressure on the end C of the reciprocating cylinder of piston 78 becomes greater than the pressure on the end D of the reciprocating piston. When this unbalanced pressure occurs the piston 78 slides in the cylinder 110 until it is in the position shown in FIG. 4B, at which position the end 78a of the piston becomes small and the rollers 85, which have rolled down the inclined conical surface 78c are in the position shown. This permits the reciprocating plungers 86 of the four valves to be opened by means of the narrow necks 86a of the plungers 86 now being athwart the passageway in the position shown. This allows high pressure air to rush through the passageways 79, 80, 81 and 82 and into the combustion chamber 83.

But in passing through the areas 88 in the passageways 79, 80, 81 and 82 it will be seen that the flow of air passes a multiplicity of fine holes 89 which are formed in the periphery of the annular sleeves 88. Fuel oil is continuously forced through the pipe line 91 from the gear type pump 75, previously described.

Figure 8:
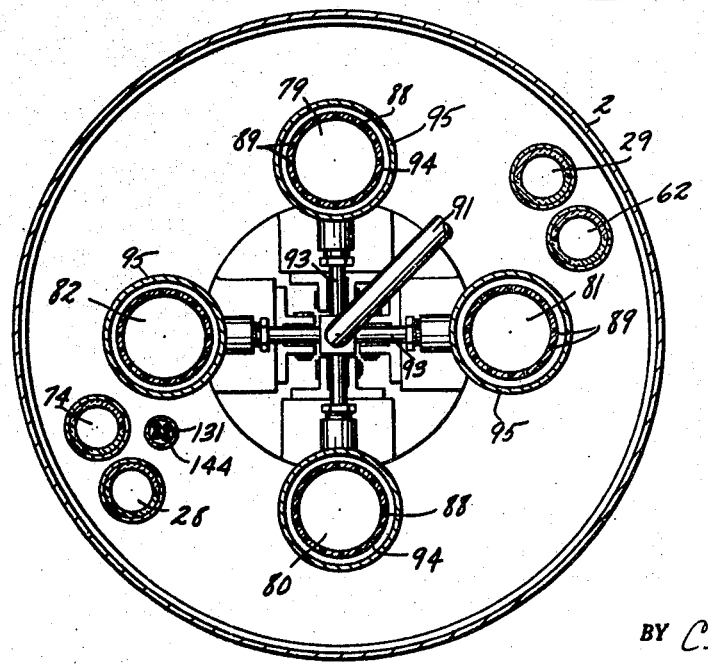

For a further clarification FIG. 8 shows a transverse section through the missile through the carburetor arrangement, as taken on line 8—8 in FIG. 4B. In FIG. 4B and FIG. 8 the fuel oil enters the distributor block 92 from the pipe line 91 and from there flows through the short lines 93 to the annular spaces 94 formed between the sleeves 88 and 95. From this space the liquid fuel is projected inwardly in fine radial streams through the fine holes 89 in the sleeve 88. The air in rushing through these passageways pick up the fuel spray and becomes saturated therewith. This vapor mixture then proceeds to the combustion chamber 83 through the passageways 79, 80, 81 and 82.

When there has been a pressure differential between the combustion chamber 83 and the compressed air chamber space 68, with the combustion chamber the low pressure side, the piston 78, as previously described, is forced to the leftward into the position shown in FIG. 4B. In this position the four passageways 79, 80, 81 and 82 are open. These passageways are exhaust lines leading from the two rotary metering mechanisms or rotary motors A and B. Thereupon the compressed air in the space 68 in the compressed air chamber, which surrounds the metering mechanisms A and B, rushes in the inlet orifices 96 of the rotating metering mechanisms and in a manner subsequently more fully described rotates the rotors 97 of the A and B metering mechanism. The air, then, as a result of this rotation, passes through the motor and out through the passageways 98 of the A and B metering mechanisms and out through the metering exhaust lines 79, 80, 81 and 82 and into the combustion chamber.

When this fresh quantity of saturated vapor enters the combustion chamber increased and vigorous combustion takes place. This quickly raises the pressure of the combustion chamber 83 until the pressure therein becomes greater than that in the compressed air chamber 68. Thereupon the differential pressure between combustion chamber 83 and the compressed air chamber 68 operates in the reverse. The pressure on the end D of the reciprocating piston is greater than the pressure on the end C. Thereupon the piston is forced to the right as seen in FIG. 4B, the rollers 85 ride up the surface of the cone 78c and rest on the cylindrical surface 78b by the time the piston 78 has moved to its extreme rightward position. When this occurs the large portions of the plungers 86 have moved outwardly in a radial direction and have filled the valve passageways 87 thus sealing off the passageways 79, 80, 81 and 82. When these exhaust passageways are closed the rapidly rotating rotors 97 in the air metering motors A and B are pneumatically braked, decelerate and come to a stop. This results because the momentum of the rapidly rotating rotors 97 cause the metering mechanisms to momentarily act as a pump or compressor and by their rotation continue to pump air from the air chamber 68 to the four pipes 79, 80, 81 and 82. But the pipes at this moment are closed off by the plungers 68 as previously explained. As a result the air pressure rapidly builds up in these pipe lines, and its back pressure rapidly overcomes the rotational momentum of the rotors 97 and brings them to a stop by resilient pneumatic pressure means.

In principle, the propulsion system of this missile is based on the differential pressure between the compressed air chamber and the combustion chamber and the oscillation of pressure in the combustion chamber, between the maximum high pressure and a minimum low pressure. However, the minimum pressure is so high and the difference between the maximum and minimum pressure is so small in comparison to the maximum pressure that for all practical purposes it can be considered that the missile has approximately a uniform pressure in the combustion chamber once the missile gets into flight.

In FIG. 4A is shown, at the aft or rearmost end of the combustion chamber, the rear orifice 99 through which the hot gases escape to provide the forward thrust of the missile. In this orifice or passageway is provided a stopper 100 comprised of a forward disk 100a and a rear disk 100b, secured together by the bolt and nut 100c. An O ring 101 is provided and the two parts 100c and 100b and the O ring are so disposed that when the nut 100c is tightened the O ring is pressed tightly against the lining of the combustion chamber and an air and gas tight seal is formed. This plug 100 is required in order to prevent escape of compressed air from the missile during the storage of the missile.

As explained previously the source of energy which is used to initiate the combustion cycle of the missile is compressed air, which is pumped into the compressed air chamber to some suitable pressure, such as for instance 400 pounds per square inch. Now in order to provide a larger storage area for this compressed air it is advisable and efficient to utilize the space in the combustion chamber, and the hot gas pipes as well, up to the point in the hot gas lines at which the flow of air is stopped in these pipes by the air tight, gas tight, solenoid operated operated valves which have been previously mentioned.

This arrangement also provides for instantaneous starting of the thermodynamic cycle since compressed air in lieu of hot gases begins to flow through the turbines which rotate the compressor at once, at the opening of the solenoid valves, which close the ends of these pipe lines. As mentioned above opening the solenoid valves is done by electric power from an outside source. The compressors then immediately begin to rotate. When the air pressure in the pipe lines 64, 65, 66 and 67 is built up to approximately the pressure in the air chamber 68 the solenoid valves 70, 71, 72 and 73 open the passage into the compressed air chamber 68.

As mentioned above the air is flowing through the hot gas pipe lines 62 and 74 and thence through the two turbines and thence escaping to the outer air. This causes a pressure drop in the combustion chamber, and the pipe lines 79, 80, 81 and 82, which are the exhaust lines for the metering motors A and B. This pressure drop in these four exhaust pipe lines cause a lower pressure in the combustion chamber side than in the space 68 in the air compartment which is outside of the metering mechanisms A and B. As a result air rushes into the metering motors A and B through the inlet orifices 96 and the rotors 97 begin to rotate. This allows the air from the higher pressure compartment 68 to flow to the lower pressure area in the exhaust pipe lines and thence into the combustion chamber. But the rotor 97 in rotating turns or operates the gear type pump 75 and fuel oil is forced in fine streams through the fine holes 89 as previously explained. This oil in this manner mixes with the air and forms a saturated vapor. The result is that when the saturated vapor enters the combustion chamber it is ignited by the spark plugs located in the combustion chamber, which are later shown and described, and a surge of higher pressure results due to the combustion. Since neither the rear passage 99 is open at this time nor the radial jets and since the only way the hot gases can escape is through the turbines, the pressure in the chamber 83 increases faster than the gas can escape. This higher pressure ruptures the plug 100 which is made of light sheet metal and blows it out the rear of the missile. As a result the high pressure hot gases surge through the rear orifice 99 and the missile begins to accelerate forward.

Having now described the overall operation and functioning of the missile and its thermodynamic cycle the missile will now be described in detail as to its construction and as to the configuration of and assembly of parts comprising the missile. In this more detailed description the analysis will begin from the rear and proceed step by step to the front of the missile.

FIG. 3 shows a rear end view of the missile looking forward and FIG. 4A shows a partial longitudinal section of the missile taken through the rearmost portion. At 102 is a thin light metal air foil which has vanes 103 provided as an integral part of the air foil. This structure or part is secured by welding or other suitable means to the metal 104 enclosing the combustion chamber. This rear air foil containing the small vanes 103 as an integral part provides better aerodynamic characteristics for the air flow around and off the rear end of the missile and at the same time the small valves provide a small amount of stabilization. It will be seen from FIG. 3 that the vanes 103 do not project beyond the circular or cylindrical configuration of the missile. This provides for ideal transportation, handling and storage arrangement since no projecting surfaces protrude beyond the cylindrical dimensions of the main body of the missile.

The metallic housing 104 of the combustion chamber 83 extends rearward to form the funnel or cone shaped extension 104A through which the hot gases escape. It will be noted that the interior of the combustion chamber 83 is lined by a high heat resistant material 107, which may be formed of a suitable ceramic compound or material, a material such as graphitar, or any other suitable material for resisting high heat. This material may be formed of small sections and assembled together. The lines 106A shown in FIG. 4A indicate the joining lines in the area 106. In FIG. 4A and in FIG. 5 which is a transverse section through the combustion chamber looking forward (taken on line 5—5 on FIG. 4B) is shown the lines 83A indicating the joining of the parts or refractory lining material. It will be seen that the joints 83A are not butt joints but are lap joints. This allows for a fairly large tolerance in the forming of the parts 107 and still completely protect the inner surface of the outer metal container 104 from the heat.

The pressure of the hot gases in the cone shaped tail 106 as they escape may be resolved into two components. One is a component acting forward, parallel to the axis or center line of the missile. This component of the gas pressure gives the missile its forward thrust. The other component of gas pressure is radial. This forward component tends to force the lining pieces 107 forward and against the outer cone or funnel shaped housing extension 104A, and there is no problem or force required to hold the lining pieces 107 in position when the missile is in flight. In order to prevent these tail lining parts 107 from dropping out in transport, handling or stowage of the missile, the rear air foil skirt or apron 102 has provided as an integral part a flange 102A which will hold the lining parts 107 in place.

The construction and operation of the stopper 100 has been described. It provides an air tight seal for the initial compressed air charge of the missile, which compressed air fills the combustion chamber and the hot gas lines leading to the radial jets and turbines as well as the compressed air chamber. The stopper 100 also serves as a hot gas seal for brief instant when the thermodynamic cycles begins. Then when the hot gas pressure in the combustion chamber 83 rises beyond a certain level the stopper 100 collapses and fails, is blown out the rear, the hot gases escape to the rear at high velocity, the forward thrust on the missile begins and the missile begins to accelerate forward and begin its flight.

As the missile accelerates in its forward flight the fins 103 give it a small amount of stabilization. However, the missile is not dependent on stabilization by fins due to the fact that the radial jets previously mentioned have such a quick response when the nose of the missile is slightly off target that a lateral thrust is provided almost instantly, which pushes the nose laterally and thus again the nose is pointed toward the target. The response time of the radial jets is so fast and the lateral force or thrust exerted by the jets is so great that the missile can fly a pursuit course against any plane and destroy it from any starting angle. It will not therefore be necessary to have fire control computations and compute future position of enemy airplane targets nor will it be necessary to fly a proportional course of any kind. This greatly simplifies the fire control problem with this missile.

Figure 5:
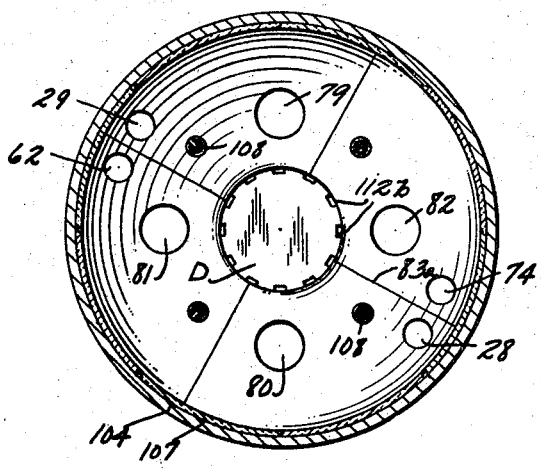

FIG. 4B shows a partial longitudinal section through some of the vital components of the missile. FIG. 5 shows the foremost end of the combustion chamber. The high pressure air feed pipe lines, later to be further described, which feed the mixture of air and fuel into the combustion chamber are shown at 79, 80, 81 and 82. The hot gas lines 29, 62, 74 and 28 are also shown entering the combustion chamber. As will be seen the hot gas line 29 feeds the radial jets, which jets are located near the front end of the missile. The hot gas line 62 provides hot compressed gas for the rearmost turbine. The hot gas line 74 provides hot compressed gas power to drive the forward turbine and the hot gas lines 28 and 29 feed the radial gas jets near the front of the missile. Four spark plugs 108 provide constant sparks for the continuous ignition of the combustion chamber and the electric power for the sparking of the spark plugs is provided during the flight of the missile by the rotary power source 9, FIG. 4K, which has been heretofore mentioned.

The rearmost end D of the reciprocating piston 78 is seen in FIG. 5. The construction and operations of this piston will now be more fully described. The thin metal configuration of the piston 78 may be seen in FIG. 4B. This metal may be a ferrous-nickel alloy or any other suitable metallic alloy to withstand the high heat and still maintain strength. The rearmost end of piston 78 is protected by the ceramic or refractory metal cover 109 which is threadedly secured to the piston 78 at 109a. The front end of the pision 78 is slidably supported in its reciprocating motion by the flanges 109b which slide on the interior cylindrical surface of another ceramic or refractory part 110. The cylindrical refractory part is contained within the cylindrical extension 104b of the combustion chamber housing 104 and is provided from rearward movement by butting against the combustion chamber refractory lining 107. At the forward end of the cylindrical lining 110 bears against the ring 111 which is secured by the ring nut 112 which is threadedly secured in the extension 104b of the combustion chamber as shown. The nut 112 is secured and tightened into place by a spanner wrench which is inserted in the holes 112a formed in the nut 112. The rear portion of the reciprocating cylinder 78 slidably bears on the ring 111 which ring is formed of a suitable refractory material to provide self contained lubrication to the outer metallic cylindrical surface of the cylinder 78.

When the gas pressure in the combustion chamber becomes lower than the pressure of the compressed air in the chamber 68, the piston 78 is caused to slide violently to the rearward to assume the position shown in FIG. 4B. It comes to rest in the position shown in FIG. 4B. In order to prevent sudden impact in the stopping of the rearmost motion of the piston 78 a unique method is employed which utilizes the entrapment of a quantity of hot gases from the combustion chamber, which gases are further compressed and cause the piston 78, after it has reached a given point, to decelerate and thus comes to a stop without a sharp impact. Observing FIG. 5 there will be seen the end view of a series of tapered grooves 112a which are shown in section in FIG. 4B.

Suppose the piston is at its forward position at which the rear end of the piston 78 is at the position shown by the dotted line 113. Suppose now that the piston starts moving to the rearward due to the gas pressure dropping in the combustion chamber. As soon as the piston 78 has moved to the rearward to the position shown by the dotted line 113b the corner 114 of the piston has become adjacent to the corner on the shoulder 110a of the cylindrical lining 110. At this position a quantity of hot gas is trapped in the area 115. The cylinder 78 due to differential pressure continues to move to the rearward. The gas in area 115 is compressed and can only escape through the tapered grooves 112. As the cylinder 78 continues to move to the rearward of the missile, or to the left as viewed in FIG. 4B, the total cross sectional area of the grooves 112 becomes smaller and smaller finally approaching zero just before an impact takes place. This arrangement by soft pneumatic action slows down or decelerates the rearward movement of the piston 78 so that it comes to a dead stop with no impact taking place.

When the surge in the combustion chamber 83 due to fresh combustion becomes greater than the pressure in the compressed air chamber 68, the piston is violently forced to the frontward of the missile or the right as viewed in FIG. 4B. Provision is made to prevent impact or stoppage when the piston moves in this direction. There is also means to cope with the problem of the resistance of the air trapped in the annular space or volume to be considered. This air will tend to be compressed as the piston moves forward (or to the right as seen in FIGS. 4B and 45) and a partial vacuum will be created when the piston moves to the left or rearward when the piston reciprocates. This action will tend to slow up the rciprocation of the piston. This is exactly what is not desired since the most efficient performance of the missile is based on the prompt and quick reciprocation of the piston 78 as a result of any pressure differential.

This problem is solved by the provisions of two passageways 117 which connect the annular space 116 to the exterior atmosphere. This permits the air to flow freely into the space 116 from the outside, as the piston 78 reciprocates to the left, and pass from the space 116 to the outside when the piston is reciprocating to the right. This arrangement also permits a pneumatic slowing down or deceleration as will be seen. To illustrate, when the piston 78 is moving to the right the air is pushed out of the space 116 through the pipe lines 117 and forced to outside atmosphere until the piston travels to the position shown in the dotted line 118 in FIG. 45. When the piston has reached this position the two outlet passageways 117 are completely cut off by the flange 109b and the air remaining in the annular space 116a is completely cut off and entrapped.

As the piston 78 moves still further to the right and the entrapped air in the space 116A becomes compressed gradually to a smaller volume the pressure of the entrapped air thereupon rapidly slows down or decelerates the movement of the piston 78, stopping it completely before an impact occurs against the ring or collar 111. The length of the small end 78a of the piston is sufficiently great that the point of stoppage of the piston 78 in its forward movement or rightward travel is not critical.

It must be remembered however, that the compressed air chamber 68 is charged with compressed air before the missile is put in storage in readiness for use and that there are long periods of storage of the missile before use, during which time none of the compressed air in the compartment must escape. Since the tolerance fit between the piston 78 and its enclosing cylinder lining 110 is not and cannot be air tight against the leakage of highly compressed air, some other means must be provided to insure an air tight seal of the air in the compressed air chamber 68. To insure an air tight seal, solenoid operated cut off valves 119 are provided in the two air lines 117. In FIG. 45 a plunger 120 with a truncated cone shaped end 120a cuts transversely across the pipe line passage 117a in the fitting or casting 121. The entire end of the pipe lines 117 are weldedly secured at 122 to the outer cylindrical housing 2 in such manner that the juncture is completely air tight. The lower end of the pipe 117 as seen in FIG. 45 is threadedly secured to the casting or fitting 121 thus making an air tight joint. The truncated cone shaped end 120a of the plunger 120 is covered with a soft resilient material 124 such as rubber. The plunger 120 is shown in open position in FIG. 45. But when the plunger is in a fully closed position an air tight seal is formed. The spring 123 exerts the proper force on the plunger 120 to the extent that it at all times closes and holds the truncated end 120a of the plunger into its seat and forms an air tight seal.

As stated when the missile is in storage the compressed air fills the chamber 68 and the plungers 120 are pressed to the right by the springs 123 and an air tight seal is provided. But just before the missile is fired electric current is passed around the solenoids 125 which, when energized, pull back the plungers 120 from their sealed position to their fully open position as shown in FIG. 45, fully compressing the spring 123. When the plunger 120 is completely pulled out to the position shown in FIG. 45 a spring loaded catch, the end of which is seen at 126 in FIG. 45, springs radially inward preventing the plunger from moving to the right or closing during the flight of the missile. The typical construction of this spring loaded plunger is shown by section drawings through other solenoid operated valves also and will be subsequently described. When the detent or catch has locked the valve plunger 120 in open position, the current from the external source which is holding the plunger 120 open against the spring 123 can be cut off and the valve will remain locked by the detent in an open position. During the short flight of the missile the leakage between the piston 78 and the enclosing lining 110 to the outside air is negligible. In the construction of the solenoid valve assembly the nut 127 is threadedly secured in the extending cylindrical portion 121a of the casting 121. A hole 127a in the nut and 120b of the plunger 120 prevents entrapment of air when the plunger 120 reciprocates and enables it to readily reciprocate.

Figure 6:
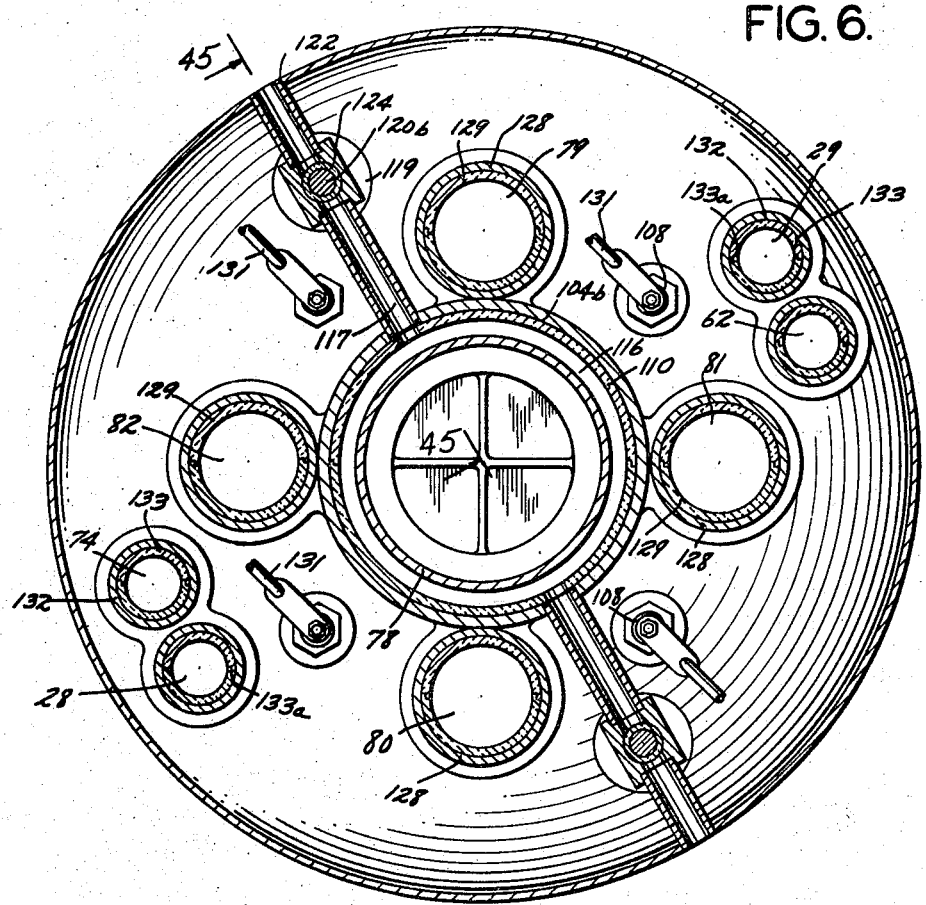

In FIG. 6 a cross section view of the high pressure compressed air lines 79, 80, 81 and 82 leading from the carburetor into the combustion chamber will be seen. The pipes 128 which resist the pressure of the compressed air mixture are all lined with a refractory lining 129 from the combustion chamber 83 to the valves 87. This arrangement partially insulates the metal of the short pipe lines 128 from the very high heat of the combustion surges in the combustion chamber. It is not necessary that the pipe lines 128 be threadedly secured at the two ends. For ease of assembly the rear or left end 128b is inserted during assembly into the socket as shown in the extensions 104c of the combustion chamber housing 104. The forward or right end 128b is inserted into a receiving socket valve assembly casting 130. FIG. 6 shows the refractory lining 129 of the pipe 128 assembled from semicircular parts with lap joints on the longitudinal edges. FIG. 4B shows these parts of the refractory lining are composed of pieces comparatively short in length as indicated by the joining line 129a. As also seen in FIG. 4B lap joints are used for joining at the ends of the lining parts also. In FIG. 6 are seen the four spark plugs 108 and the electric wires 131 leading from these spark plugs, forward to the rotary power source to carry the necessary power to cause a spark jump across the points in the plug.

In FIG. 6, which is a cross section looking toward the rear of the missile, is also seen a cross section of the construction of the high pressure hot gas lines which carry the hot gases to the turbine and radial jets which are forward in the missile. Pipe 62 supplies gas to the rear turbine which drives the aft or rear battery of air compressors. Pipe 74 supplies hot gas to the forward turbine which drives the front or forward battery of air compressors. Pipe lines 28 and 29 provide hot gases to the radial jets at the forward end of the missile. The pipes 132 which provide the exterior pressure resisting materials of the passageways are threadedly secured into projecting bosses, not shown, which are formed integrally with the metal housing 104 of the combustion chamber. Lining 133 of a refractory material is provided to line the four hot gas pipes as shown. These lining units are semicircular in cross section as shown and are joined with lap joints along the longitudinal edges as shown at 133a. The lining units are short, to provide ease of forming and manufacture and are joined end to end also by lap joints (not shown) similar to the manner shown in 192a. The lining thus provided saves the inner surface of the pipes 132 from the terrific thermal shock and heat of the very hot gases and thus enable very high pressures and high temperatures to be used in the thermodynamic cycle of the missile. This makes for great thermal efficiency.

Figure 7:
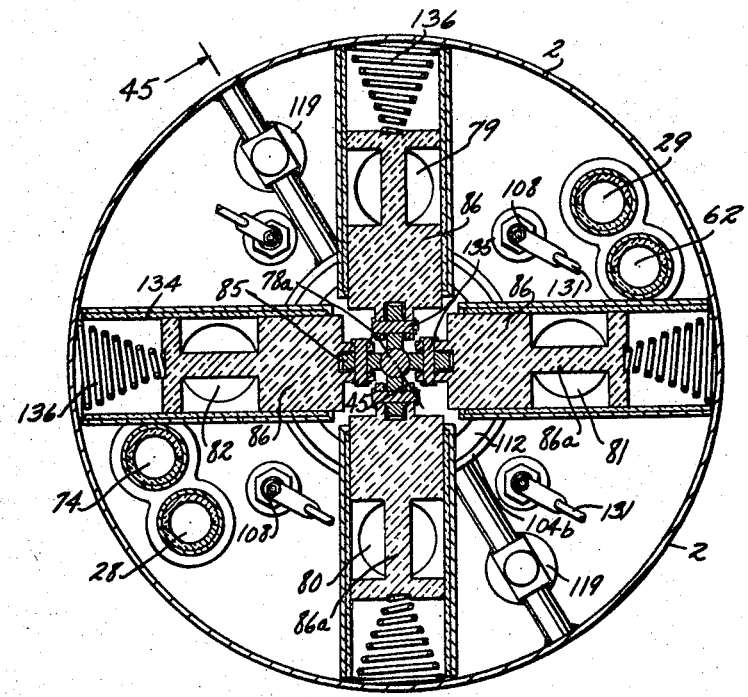

In FIG. 7 a transverse section through the valve assembly casting is shown and in FIG. 4B a section longitudinal of the missile is shown. Annular cylindrical holes are formed in the casing to receive the refractory linings 134 which are self lubricating. The flanges 130a are provided at the inner end of the cylindrical hole to prevent the lining 134 from sliding inwardly. The outer cylindrical housing 2 of the missile prevents the sleeve from sliding outwardly. Rollers 85 rotate about pins 135 which are in turn supported by projecting dependages from the inner end of the valve plungers 86 as shown. The four rollers 85 as presently shown bear against the small cylindrical forward end 78a of the reciprocating piston 78. The piston 78 is shown at this instant in its rearward or leftmost position. The springs 136 at all times press radially inwardly against the plungers 86. Now when the pressure differential causes the piston 78 to move to the right, the rollers 85 roll up the inclined surface of the cone C and when the piston 78 has traveled to its maximum forward distance, the rollers 85 are resting on the cylindrical surface 78B on the piston. When this occurs the springs 136 are compressed and the cylindrical portion 86 of the plungers completely fill and stop the passageways 79, 80, 81 and 82. In this condition the hot gases in the combustion chamber are experiencing a surge of burning and the gaseous pressure therein is much higher than the compressed air pressure in the chamber 68. At this time the hot gases from the combustion chamber may travel up the pipe lines as far as the plunger 86 but no farther and thus cannot escape into the pipes leading into the air metering pump. Since the plungers 86 are formed of a suitable refractory material, the linings 134 of a refractory material, and the linings 129 of the short pipes 128 are formed of a refractory material, the hot gases do no harm. When the pressure surge of the hot gas expends itself and the pressure drops below that of the compressed air in the chamber 68 then as before stated the piston 78 is forced to the rearward and stops in the position now shown and the plungers 86 assume their positions as shown in FIG. 4B. At this instant since the pressure is greater in the compressed air chamber 68 than in the combustion chamber the flow of air and fuel vapor is taking place from the pipe lines 79, 80, 81 and 82 into the combustion chamber. The four springs 136 are a spiral helical form in order to take up the minimum space when compressed. When the springs 136 are fully compressed the spring forms a spiral and takes up a minimum of space.

In FIG. 8 a transverse section through the carburetor or feed mixing system is shown. The construction of the fuel mixing system is further shown by the partial longitudinal section through the missile as seen in FIG. 4B. The short pipe lines 88 are inserted in the sockets provided in the casting 130 as shown and leakage is prevented by the O ring 137. The front end of the short pipe 88 is inserted into the flange formed in the rear end of the curved pipe 138 which connects the air passageways through the carburetor to the exhaust lines leading from the air metering pumps. Outer housings 95 are provided which surround the short pipes 88 and form annular spaces 94. The ends of the cylindrical parts 95 are provided with flanges which contain the O rings 139 and 140 thus forming a seal and closing off the ends of the annular spaces 94. The forward ends of the short pipes 88, at the point where they enter the curved pipes 138, are sealed by the O rings 141.

As previously described the oil line 91 leads from the outlet side of the gear type fuel pump 75, FIG. 4C, previously referred to and subsequently more fully described, to the distributer block 92 and from thence the fuel flows under the pressure exerted by the gear type fuel pump 75 through the short pipe lines 93 into the annular spaces 94 which are bound on the outside by the sleeve 95 and on the inside by the sleeves 88. As before stated, the fuel is forced through a multiplicity of fine holes 89 in the inner sleeve 88 which provide a large multiplicity of very fine streams of fuel which are forced radially inward at high velocity. The air flowing also at high velocity toward the combustion chamber 83, picks up and absorbs the fine spray of oil or other liquid fuel and the mass becomes a saturated vapor.

Before describing the next component attention is called to the manner of securing the interior components of the missile to the outer skin or cylindrical shell 2, which method is shown in FIG. 4B and in several other figures showing fragmentary longitudinal sections. The end housings of the air metering motors, the compressor units, the turbines and the like are formed with a circular periphery to which a rim is integrally formed. An example is shown in the rim 142a of the aft end housing part 142 of the aft or rearmost air metering motor B (FIG. 4B). Pins 143 are provided which are inserted in holes drilled through the outer shell 2 and part way through the flange 142a as shown. In the boring process the outer edge of the holes through the shell 2 are chamfered. The pins 143 are then forced into position and weldedly secured as shown. This firmly secures the end part 142 of the housing and also by the welding provides an air tight joint. Other subassemblies throughout the missile, such as the annular valve casting on housing 130, are secured in the same manner. The flange 130a is secured by the pins 143 weldedly secured in place as previously described.

In FIG. 7 and FIG. 8 is shown that the electric wires leading to the spark plugs and solenoids are carried in the conduit piping 144 which pipe leads all the way through the missile, as will be subsequently seen in other transverse sections, to the rotary power source at the front of the missile.

Figure 22:
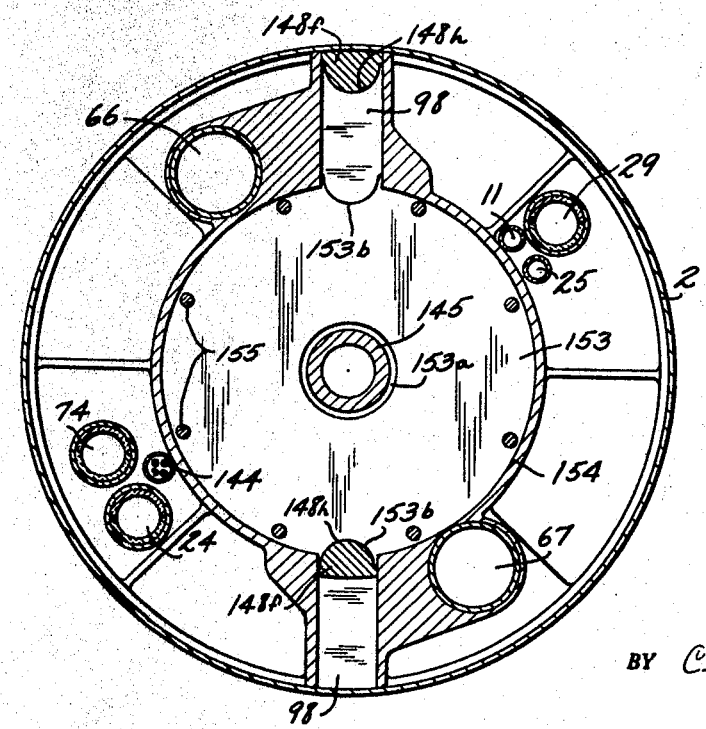
Figure 26:
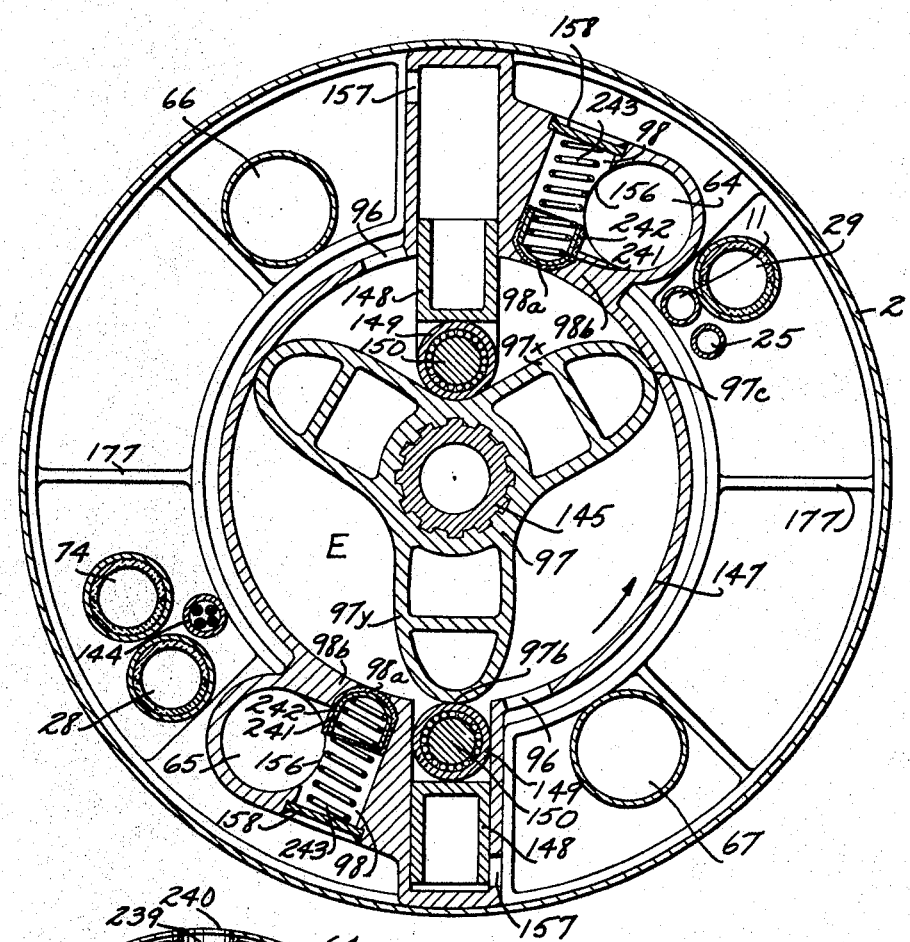

The construction and functioning of the air metering motors are shown in FIG. 9 and FIG. 10, FIG. 4B, FIG. 4C, FIGS. 11 and 12 and FIGS. 53 and 54; also in FIG. 4E, FIG. 22 and FIG. 26. These latter views are of an air compressor unit and are cited because the construction and functioning of the air compressor units are virtually the same as the construction of the air metering motors.

The combination and configuration of parts comprising the air metering motors and the air compressor units are identical with the exception that in the case of the air compressor units silicone rubber covered valves held in place by springs close the exhaust orifice to prevent back flow of the compressed gases as will be subsequently explained. In the air motors no such check valve is inserted. All other parts of this assembly and the cooperation and functioning of the parts is the same. As a result the structure, principles of operation and description of the air metering units and the air compressor units will be described simultaneously and a like common number will be assigned to corresponding parts. A shaft 145 is provided for each unit which is supported at each end by the sleeve bearing 146. The bearings 146 are supported by the projecting portion 142b of the end housing 142. The shaft 145 has the splines 145a formed as an integral part of the shaft during a major portion of its length which fit into the internal splines 97A of the rotors 97. This compels the rotor 97 to rotate in unison with the shaft 145. Annular housings 147, substantially cylindrical in over all shape enclose the outer perimeter of the air motors and compressor units. These cylindrical housings have protruding portions in the cylindrical perimeter of the parts as seen in the various cross section views which contain the slots 147a to receive the radially reciprocating gates 148. These slots or rectangular spaces are enclosed at the top by the portion 147a of the metal which is integrally cast or otherwise formed with the cylindrical part 147. The top portions 147b which enclose the slots 147a does not extend the full length of the cylindrical housing 147. As seen for instance in FIG. 4E the metal top portion 147b terminates in a short distance on each end leaving a rectangular shaped opening 147c into which the end portions 148a of the radially reciprocating gates may protrude when the reciprocating gates are at their uppermost or lowermost positions. As seen in FIG. 4E, with respect to the compressor unit VII, the reciprocating gate 148 is at the present instant at its lowermost position in which the lower end projections 148a are within the rectangular shaped opening 147c. This is a compressor unit but it will be remembered that the construction of the air metering motors are virtually identical.

The construction of the radially reciprocating gates is shown in FIGS. 9 and 10, FIG. 22, FIGS. 25 and 26, FIG. 11 and FIG. 4E. The gates are provided with needle bearings 149 one near each end of the gate casting on each side or a total of four rollers in all for each radially reciprocating gate casting as seen in FIG. 4E. The bearing pins 150 are inserted through the needle bearing as shown. The holes 151 are formed through the ends of the reciprocating gate part or casting to permit the insertion of the bearing pin 150 and the assembly of the bearings in place. As seen in FIGS. 9, 10, 25 and 26 the four needle bearing rollers 149 roll on the surfaces of the rotors 97. The rotors 97 all are formed of three lobes located at one third of a circle or 120 degrees each from each. The surfaces of the rotors and the three lobes thereof are formed with a curve of such design, or a curve developed in such a way, that as the cylindrical surface of the upper and lower needle bearing rollers 149 (FIGS. 9, 10, 25 and 26) roll upon the surface of the rotors the upper rollers and the lower rollers will at all times contact or bear upon the surface of the three lobed rotors. In FIG. 25 the rotor 97 is in such a rotational position that the upper roller 149 is touching the outer tip of one of the three lobes of the rotor while the lower roller bearing 149 is contacting one of the valleys or lowermost portions between the three lobes. In FIG. 26 is shown that when the rotor has rotated one half a revolution or 180 degrees, the lowermost roller bearing is now touching the outermost tip of one of the lobes. The upper roller bearing is now touching the lowest or the radially most inward point on the rotor between the lobes.

As the rotor 97 rotated during the 180 degrees the rollers rolled on the surface and as before stated the curve of the surface is such that all four rollers make contact at all times. Assuming that the compressor unit VII rotates counter clockwise, which is the case, the tip 97b of FIG. 26 is at the lowermost position. The same tip 97b in FIG. 25 is seen in the uppermost position as shown, having rotated through 180 degrees.

As this rotation takes place the upper rollers in FIG. 26 roll up the slope 97x of the lobe 97c and simultaneously the lower rollers roll down the slope 97y of the lobe 97b, all rollers maintaining contact at all times. When this happens the reciprocating gate assembly will move upward from the position of the gate assembly as seen in FIG. 26. The upper and lower reciprocating gate 148, as seen in cross section in FIGS. 25 and 26, are secured at the two ends, as will be subsequently described, by two connecting bars, both of which, along with the two gates are cast into a single unit and form a single part.

Figure 11:
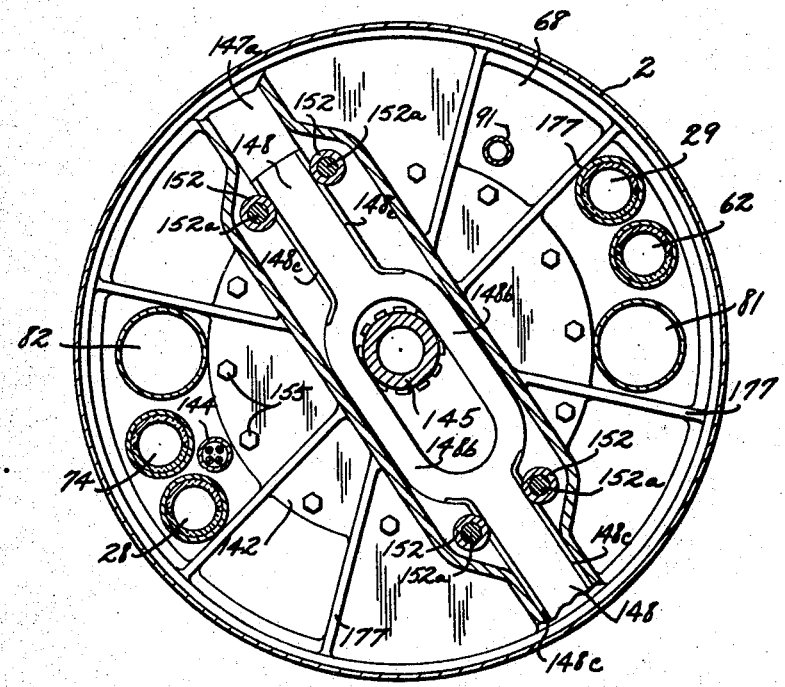
Figure 54:
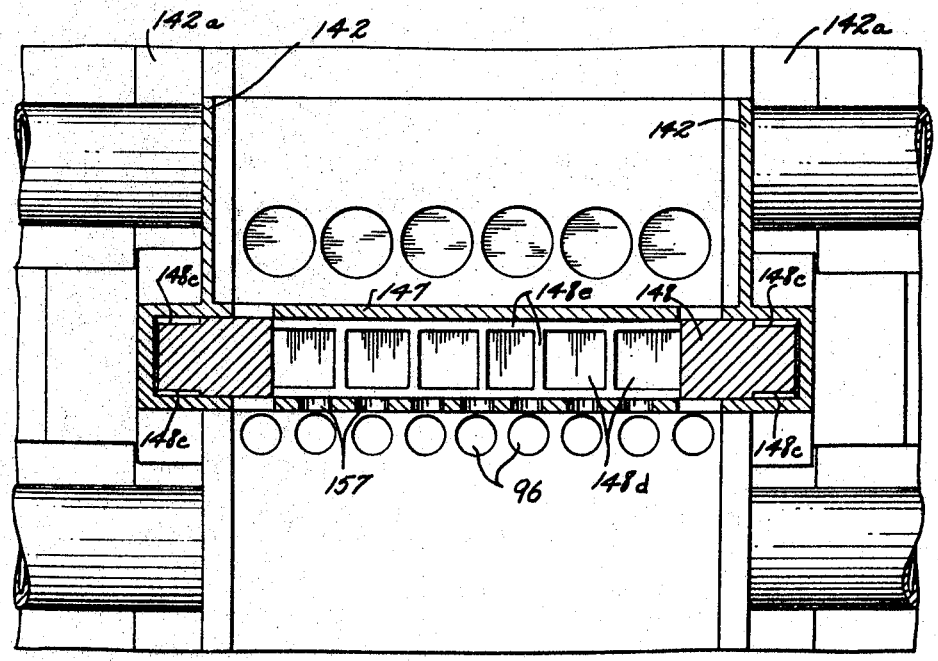

Now in the position shown in FIG. 26 the reciprocating gates are in their lowermost position. In the position shown in FIG. 25 the gates are in their uppermost position. The gates and their integrally formed connecting rods must move or reciprocate in a linear direction and must be held in such manner that this reciprocation can take place and no other movement. FIG. 11 which is a transverse section looking aft taken on the line 11—11 as seen in FIG. 4C, shows a side view of the reciprocating gate assembly. FIG. 54 shows an end view of a reciprocating gate assembly taken on line 54—54 on FIG. 9. FIG. 11 shows the two connecting bars 148 which at each end connect the two gates 148b together. The two bars 148b are required at each end in order that the shaft 145 may be straddled. In FIGS. 4B and 4C fragmentary longitudinal section through the missile are shown which section cut obliquely through the connecting rod bars 148b of the reciprocating gates for the A and B air metering motors and the connecting bars 148 are indicated in FIG. 4C as shown.

The four sleeve rollers 152 are supported in the bearing shafts 152a and roll in the grooves 148c formed on the reciprocating gate castings, as shown in FIGS. 11 and 54. Each side of the reciprocating gate casting is supported by four rollers 152 as shown in FIG. 11. As a result the reciprocating gate casting can move in a linear direction only. Thus when the rotor 97 rotates the end gates move from the lowermost position seen in FIG. 26 to the highest position seen in FIG. 25 and back again as the rotor continues to rotate. A motion which constitutes a reciprocation in a straight line results.

Since the rotor must rotate at a high maximum speed, such as of the order of 3000 revolutions per minute, it is necessary to provide with minimum shock and pressure of the motion of the reciprocation of the gates. To accomplish this the surfaces of the three lobed rotors are generated or formed with a curve of such shape and form that the entire gate casting is reciprocated with simple harmonic motion. This insures that there will be a gradual increase or acceleration in speed of linear movement to the mid point of travel and a gradual decrease in speed of linear movement during the latter part of the linear travel while the rotor is rotating with uniform speed.

The shape or configruation of the reciprocating gate casting which comprises the two gates 148 and the four connecting bars 148b are shown in FIG. 11, FIG. 26, FIG. 4E, FIG. 22 and FIG. 54 and FIG. 56. To provide the maximum strength in relation to weight the gates themselves are not formed of a solid mass of metal but are of a hollow rib type of construction. In FIG. 54 may be seen one end view of the casting looking down into the open or void spaces 148d and again the open areas may be seen in FIG. 4F and FIG. 56. The ribs and thin walls 148e about the open spaces may be seen in FIGS. 54, 56 and 4E. In FIG. 4E, and FIGS. 9, 10 and 25 and 26 are shown the position of the needle bearing rollers 149 in relation to the reciprocating gate castings. The rectangular shape of the outer cylinder of the needle bearing in the side or longitudinal view and the circular form of the same outer cylinder in the cross section views is such that the space into which the needle bearing is inserted in assembly is filled to a fine degree of tolerance. This largely prevents the escape of air from one side of the reciprocating gate to another during the rotation of the reciprocating gate and the reciprocation of the gates. The outer cylindrical sleeves of the bearing 149 of course rotate at high speed during the reciprocation of the gate casting, since the rollers roll with high speed over the surface of the three lobes of the rotor. The cylindrical surface of the needle bearing 149 projects a very small distance inwardly (radially) beyond the inner tips of the gates. This distance may be of the order of two to three thousandths of an inch and is sufficient to provide a fine clearance between the inner tips of the gate and the surface of the three lobes of the rotor. This arrangement prevents sliding friction between the inner ends of the gates and the surface of the rotor and insures that the only contact made with the rotor surface shall be the rolling contact of the sleeves of the rollers 149. Though there is no sliding friction the clearance between the inner ends of the gates and the surface of the rotors is so small that air leakage through this clearance is negligible.

In FIG. 22 and FIG. 4E the narrow neck 148f is seen which connects the upper and lower gates 148 to the bifurcated side connecting parts, and which are each formed of two bars 148b, forming a wide slot in between the two bars in order to straddle the shaft 145 (FIG. 11). This arrangement forms a slot 148g as seen in FIG. 4E between the outer connecting bars and the gate 148 and this makes possible the travel of the gates to their extreme upward or lowermost position without interference with the housing and disks 153. The housing and discs 153 are provided as seen in FIGS. 4B, 4E and FIG. 22 in order to form a virtually air tight plate to cover up the slots between the connecting bars 148b (FIG. 11) and to fill a portion of the slots 98 (FIG. 22) as seen.

The plates 153 are assembled in a recess in the end housing 142 as seen in FIGS. 4B and 4E and other figures. The inner surface of the rims 154 of the same recess encompasses a circular projecting boss 147d of the cylindrical housing 147 and thus securely holds the cylindrical housing from expanding as a result of the slots 147 which are formed in its perimeter. Machine screws 155 (FIGS. 13 and 22) pass through the outer end housings 142, through the plate 153 and thread into the ends of the cylindrical castings 147 to secure the outer assembly of the compressor units or air metering pumps together.

The holes 153a through the plates 153 through which the shaft 145 pass are covered by the ends of the rotors 97 and the ends of the rotors are in such close tolerance with the flat surface of the plates 153 that virtually no air can escape through the holes 153a. The geometry or configuration of the neck 148f and its inner semicircular edge 148h and the semicircular formations 153b are such that the ends of the radially reciprocating gates always completely fill the spaces 98 regardless of the position of the reciprocation of the gates and thus prevent air leakage in this direction. In FIGS. 9, 10, 25 and 26 air is trapped in between the cylindrical outer housing 147 and the lobes of the rotors 97 and cannot escape except inward through the inlet orifices 96 and the outlet orifices 98.

Having substantially shown the general construction of the metering pumps and compressor units the operation of the air metering units will now be described. FIG. 9 represents a cross section through the aft metering motor.

When the hot gases in the combustion chamber 83 have escaped through the rear orifice to provide forward propulsion and through the turbines which rotate the compressors and through the radial jets, as required, to such an amount that the pressure in the combustion chamber is less than the pressure in the compressed air chamber 68, a differential pressure is created. It is remembered that the entire space 68 completely surrounding the air metering motors and the other components within the compressed air chamber, is completely filled with the compressed air, which is being replenished while the missile is in flight by the compressor units. Consider first what happens in the aft air metering motor B as shown in FIG. 9. The compressed air (at the instant when it is of higher pressure than the gas pressure in the combustion chamber) enters through the inlet orifices 96 into the spaces X and Y. Since gas under pressure exerts force in all directions pressure is exerted in the space X against the side of the reciprocating gate, the inner cylindrical surface of the housing 147 and the adjacent surface 97e of the lobe 97f. Since the compressed air cannot get beyond the top of the lobe 97f nor under the inner end of the lower gate 148 except by very slow and negligible leakage and since the gate 148 cannot be moved by air pressure or by other means except the rotation of the rotor 97, the pressure of the air on the surface 97e of the rotor causes an unbalanced force which is not positively resisted and this causes the rotor to rotate. Simultaneously with this action it will be seen that air may also enter through the upper orifice 96 and into the space Y. Thus until the rotor rotates far enough for the tip to close or pass the upper inlet 96 the air in space Y exerts a pressure on the side 97g of the lobe 97h. This likewise tends to cause the rotor 97 to rotate.

Figure 53:
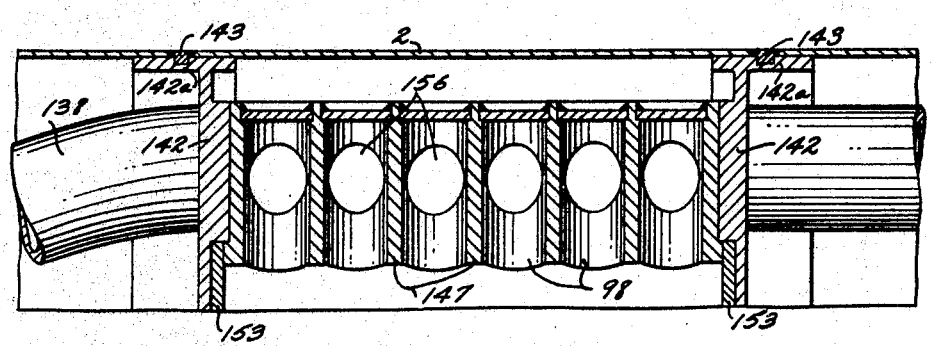

Now it will be seen that the space Z is in such a position that it has no connection at the moment to an inlet orifice. But compressed air is trapped in the space Z. When the rotor 97 continues to rotates in a counterclockwise direction, as shown by the arrow, the air in space Z must find an outlet. Thus the air passes into the outlet 98 and thence as seen in FIGS. 9 and 53 through the ports 156 and into the pipe line 79. From this line 79 the air goes through the carburetor mechanism, through the valve 87, which at this moment due to the lower pressure in the combustion chamber is open, and into the combustion chamber through the pipe 79. Meanwhile the air in the space X, which is on the other side of the lower gate 148, is being forced into the lower exhaust orifice 98 as shown in FIG. 9. From thence the air goes through the ports 156 to the pipe line 80 from where the air passes through the lower carburetor mechanism as shown in FIG. 4B and into the combustion chamber.

Figure 10:
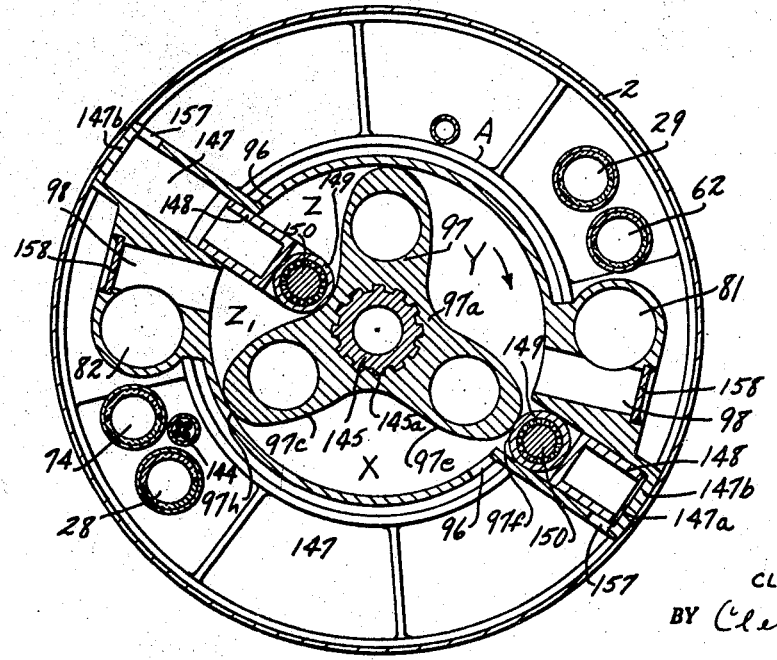

There are two reasons for providing three lobes for the rotor 97. One is that with three lobes and two reciprocating gates there is never a position in which the air motor will be on dead center and fail to rotate as a motor under the influence of the compressed air. If there were two or four lobes on the rotor there would be positions in which the motor would be on dead center and the rotor would not rotate. It can be seen from an analysis of the forces and geometry of the parts in FIG. 9 that there will always be either one space or two spaces containing air in compression which by unbalanced forces causes the rotation of the rotor. In FIG. 9 air pressure in space Y and also in space X at the immediate instant is causing rotation. Observing 10 we see the rotor 97 in a slightly different relationship with respect to the reciprocating gates. In FIG. 10 is shown that the inlets 96 and exhaust outlets 98 are so arranged that the rotor in FIG. 10 rotates in a clockwise direction. And in FIG. 10 the lobe 97f is centered with respect to the lower gate 148. In this case the space X is filled with air under pressure but the equal areas 97e and 97i of the lobes 97f and 97h respectively which are exposed to the air, cancel each other out pressurewise so that the air pressure coming through the lower inlets 96 does not at the immediate instant tend to rotate the rotor 97. The air in the space Z does tend to rotate the rotor. At the present instant, as the rotor is rotating, air in the space Z1 is being forced out through the upper exhaust orifice 98 and likewise the air in the space Y is being forced out through the exhaust orifice 98.

In FIG. 54 are shown a multiplicity of inlets orifices 96 for each air motor and likewise for each compressor. Also in FIGS. 9 and 54 there are a multiplicity of inlets and outlets in the side wall of the large slots 147a into which the radial gates reciprocate inwardly and outwardly. This is necessary to avoid the compressing of air between the end of the gates and the upper portion of the slot and thus causing loss of power or energy.

As shown in FIGS. 9 and 10 the rotors in the motor A and in the motor B rotate in reverse directions. This as before stated is to balance out the torques tending to rotate the missile while in flight. The valley between the lobes is nearly at the downward position with respect to the lower gate 148 in FIG. 9 while the valley or equidistant point between the lobes is adjacent to the upper gate 148 in FIG. 10 which shows the forward air metering motor. Since the two rotors rotate in unison though in the opposite directions while the gate casting 148 in FIG. 9 is traveling or reciprocating downward the gate casting 148 in the FIG. 10 is traveling or reciprocating upward and vice versa. As a result the opposite motions of these two gate castings tend to concel out each other's vibrations with respect to the missile structure.

In FIG. 53 is shown a multiplicity of orifices 98 which lead into the pipe line beyond, through the ports 156. The caps are inserted into seats which are machined into the outer ends of the holes 98 as shown in FIG. 53 and weldedly secured in place.

The gear type fuel feed pump will now be described. In FIG. 4C, FIG. 12 and FIGS. 13 and 14, the gear type feed pump generally located at 75 in FIG. 4C serves a double purpose. It serves to meter out fuel, which is measured in reasonably exact proportions as to weight with respect to the air which is simultaneously metered, and also to cause the forward metering pump and the rear metering pump to rotate positively, in unison and in opposite directions. The forward end 76 of the shaft 145 is secured by splining to a short shaft 159 which has a spur gear 159a, formed integrally with the shaft. This spur gear rotates in unison with the shaft 145 and with the rotors 97. The spur gear meshes with the spur gear 160 which is keyed or splined on the short shaft 161, which passes through the aft wall or plate 162, and the sleeve bearing 163 in which the shaft rotates. The spur gear 164 is integrally formed with the shaft 161 and the forward end 161a of the shaft 161 enters the sleeve bearing 165 in which it rotates. A packing 166 rotates with the spur gear 164 and prevents oil leakage through the shaft 163. The rear shaft housing plate 162 of the gear pumps is secured to the end plate 142 of the air metering motor housing by the machine screws 167 (FIGS. 4C and 13). The forward housing 168 is secured to the rear housing 162 by the bolts 169 and leakage is prevented by the gasket 170.

Figure 14:
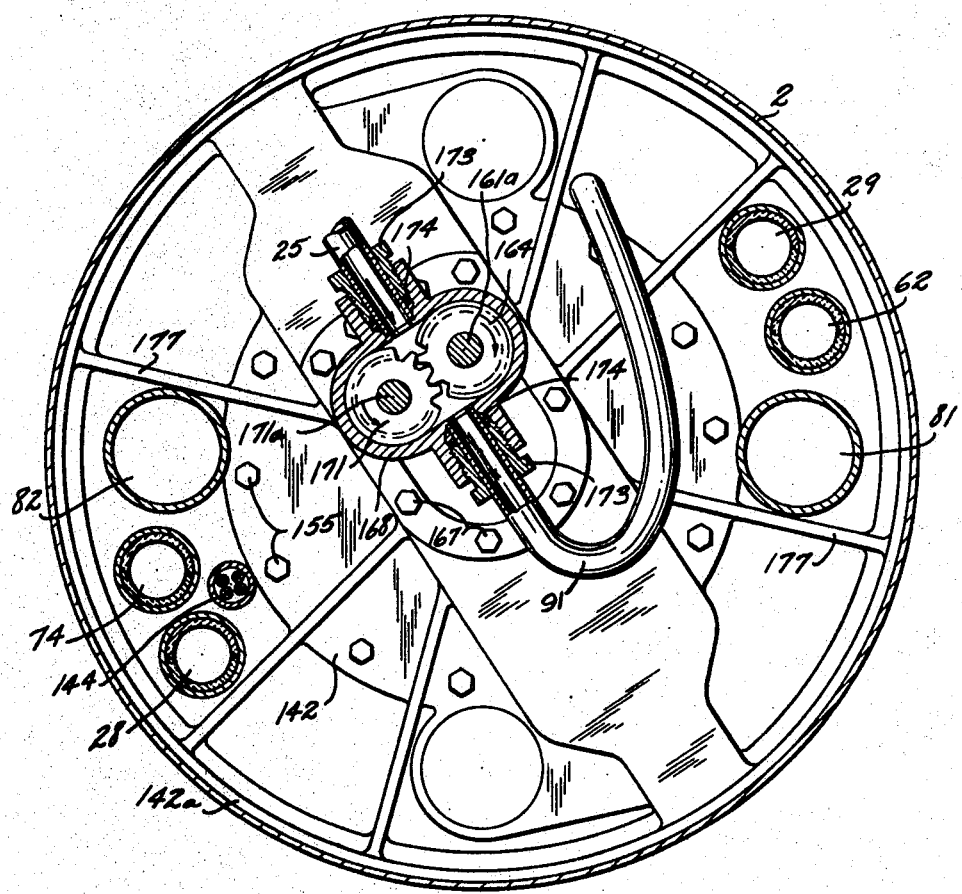

In FIG. 14 a section through the interior of the gear type fuel pump is shown. The spur gear 164 is an integral part of shaft 161a and meshes with the spur gear 171 which is an integral part of shaft 171a. The two spur gears comprising the interior of the pump are encompassed by the housing 168 as shown in FIG. 14. It will be seen by analyzing the rotation of the various spur gears that since the rotation of the rotor of the aft air metering motor is counterclockwise the rotation of the spur gear 159 is counterclockwise, the rotation of the pump gear 164 is clockwise, the rotation of the pump gear 171 is counterclockwise and the flow of liquid through the fuel gear pump is in the direction of the arrows shown in FIG. 14. The oil line 25 leads from the fuel tank near the front of the missile which is a distance of several feet. The pipe 91 leads from the fuel pump to the distributer block 92, from whence the fuel is fed through the short pipes 93 to the four carburetors. The pipe lines 91 and 25 are made leak proof by the nuts 173 and the gaskets 174.

Figure 12:
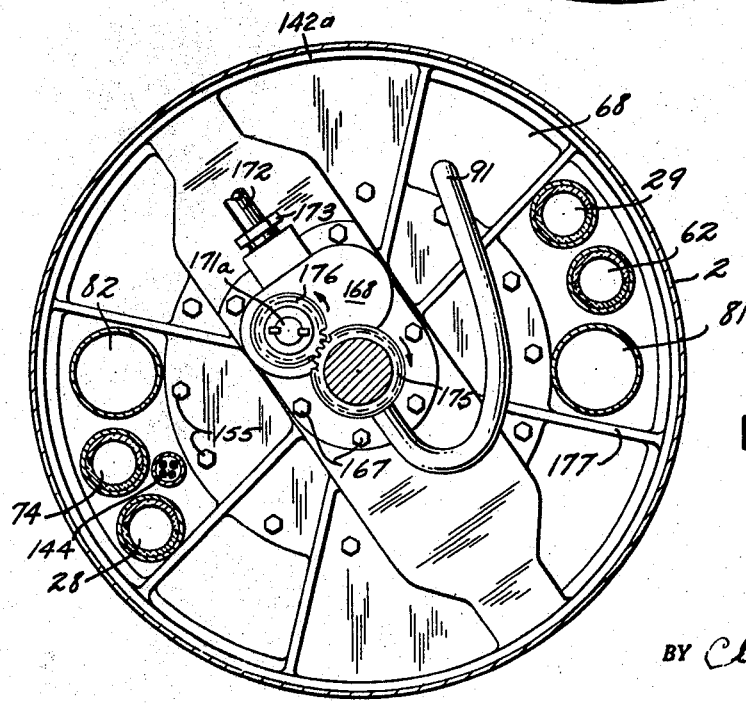
Figure 13:
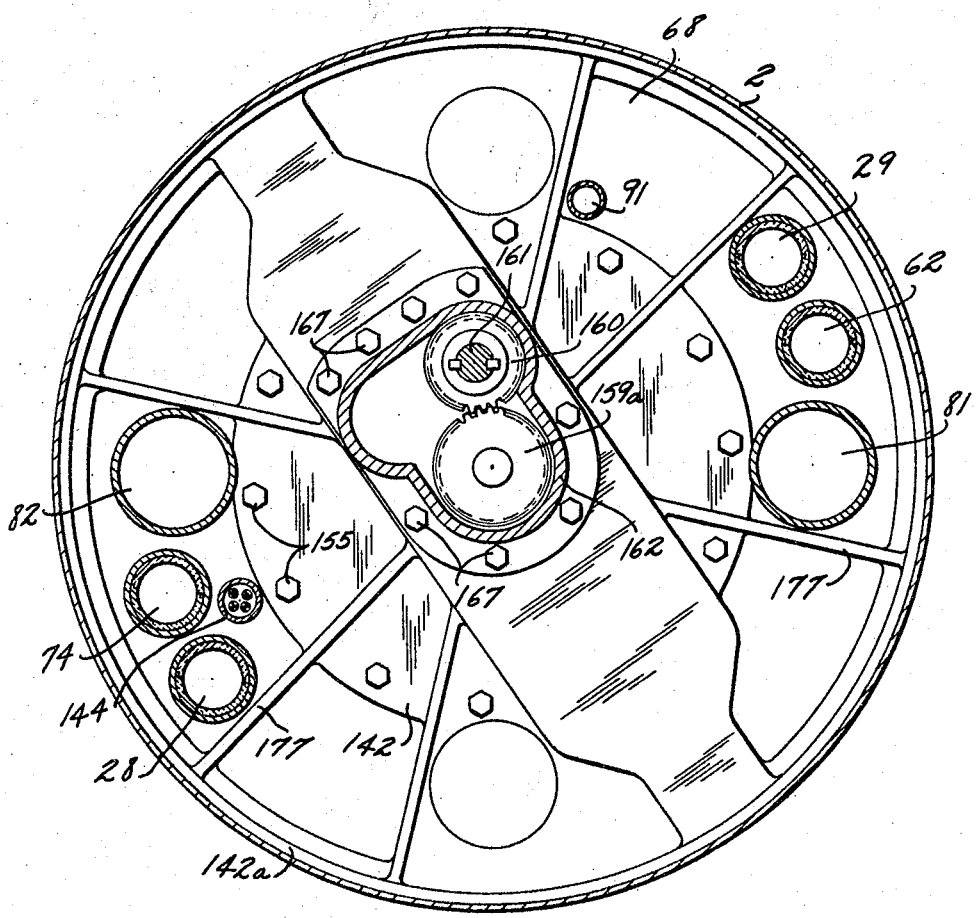

In FIG. 12 and FIG. 4C the spur gear 175 is formed integrally with the shaft 175a which is splined to fit into cooperating splines in the end 77 of the shaft 145, and the spur gear 175 rotates with the shaft and rotor of the forward or A air metering motor which is a clockwise direction. This spur gear then rotates the spur gear 176 which is seen in FIG. 12 but not in the partial longitudinal section view in FIG. 4C. The gear 176 is splined on the shaft 171a which passes through the housing 168 in similar fashion to the manner in which the shaft 161 passes through the housing part 162 and is secured to the gear 160.

By this arrangement the forward air metering motor rotor and shaft are positively secured by the spur gear system working through the fuel pump in such a manner, as has been described above, that the A and B air metering pumps must rotate in unison, at the same speed and in opposite directions. Further the rotation of two rotors in the air metering pumps furnish the power to drive the gear type fuel pump.

The capacity in volume per revolution of the gear type fuel pump is so designed that the amount of the fuel by weight is the proper ratio in relation to the weight of the air per revolution (or per second) to form the correct air fuel mixture for the most efficient combustion. This ratio is of the order of one part fuel (by weight) to 20 parts air (by weight). This ratio will vary some at various times during the flight of the missile but not enough to impair the burning of the fuel mixture in the combustion chamber. Further, as previously mentioned, the spark plugs 108 are continually sparking during the flight of the missile which provides a further safeguard against burnouts in the thermodynamic cycle.

In the structure of the A and B components is shown that the annular end plate castings 142 are formed with a circular central portion to cover the end of the cylindrical housing 147 (see FIGS. 4B, 10 and 12) and a rim 142a which bears against the inner surface of the outer skin 2 and is secured thereto by the pins 143. Then the rims 142a are connected to the inner circular part in certain places by the "spokes" 177. This leaves a considerable area of open space through which air may freely flow when forced into the compressed air chamber 68 by the rotation of the compressors. Thus the compressed air may flow freely from one end of the compressed air chamber 68 to the other and freely surround all sides of both air metering pumps and thus provide virtually equal pressure at all inlet orifices.

Proceeding further toward the front end of the missile FIG. 4C shows the bulkhead 69 which constitutes the forward end of the compressed air chamber 68. There is a rim 69a formed on the flange 69b of the bulkhead, which rim provides a shoulder on both the forward and aft sides. The thickness of this rim is equal to that of the shell 2 of the missile. It has been previously stated that this shell or outer cylindrical tube of the missile is not formed of one continuous piece. A series of pieces or parts of this tube may be assembled to form the missile, to provide greater ease in the manufacturing of the tubes of outer shell parts and of assembly of the missile during manufacture. However, the same number 2 is commonly given to any and all parts of the cylindrical shell 2 throughout these drawings. The cylindrical shell 2 on the left or aft side of the rim 69a encompasses the compressed air chamber 68 and all the component parts contained therein, such as the air metering motors A and B and the carbureter mechanism. When these parts are all assembled within the outer shell 2 and the pegs 143 are weldedly secured the bulkhead is slipped into position, closing the end of the compartment 68, and is weldedly secured in place with the seam weld 69c. Subsequently, when desired during the process of assembly, the outer cylindrical shell part 2, which is on the forward side of the rim 69a is weldedly secured in place and jointed to the previous cylindrical shell parts by the seam weld 69d. This cylindrical shell part on the forward side of rim 69a extends several feet and contains the air compressor units, the turbines which rotate the air compressors, and the mechanical governors and valves related thereto, which are subsequently described in more detail.

Figures 15, 16:
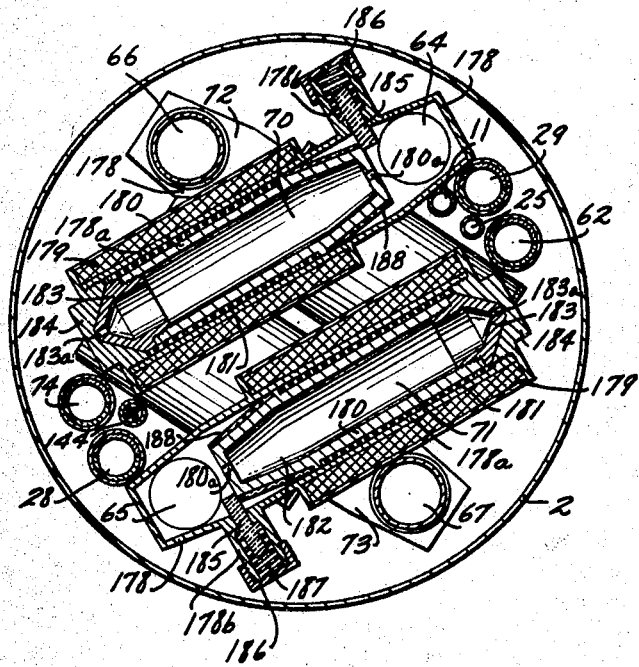

The bulkhead 69 is provided with openings, through which pass several pipe lines. FIG. 15 shows a transverse section through the missile taken on the line 15—15 at the point as shown on FIG. 4C. The four hot gas pipe lines 29, 62, 74 and 28 are seen. As previously mentioned the pipe lines 62, and 74 lead to the two turbines which drive the air compressors and the pipe lines 28 and 29 lead to the radial jets near the front of the missile. The conduit line 144 covers the electric wiring with an air tight seal 144a to prevent the air from escaping from the highly compressed air in the chamber 68 to the outside. The compressed air line 11, originates at the bulkhead 69 and has its aft end weldedly or otherwise secured in the bulkhead 69 through which its end passes, in order to provide an air tight seal. This high pressure air pipe line 11 extends through many feet to the front of the missile to provide compressed air for a number of purposes. It provides air to exert force against the slidable diaphragm 19 (FIG. 4J) which bears against the forward end of the fuel mass in the fuel tank 18 and subject the fuel to constant pressure during the flight of the missile. The compressed air from pipe line 11 also provides power for the pneumatic servo mechanism to operate the valves for the radial gas jets, subsequently fully described, and provides power for the small turbine which rotates the rotary power source which will be subsequently more fully described. The pipe line 25 is the high pressure liquid fuel line which leads from the fuel tank 18 near the front end of the missile to the inlet side of the gear type fuel pump 75. The four pipe lines 64, 65, 66 and 67 are the four common high pressure exhaust lines which lead from the air compressor units into the compressed air chamber 68 which compressors will subsequently be more fully described.

It is necessary that the compressed air chamber 68 be completely sealed during the storage of the missile. The chamber must be charged with highly compressed air which must remain in the missile for an extended period of time in order that the missile while in storage may be in constant readiness. To accomplish this it is necessary for the pipe lines described above which lead through the bulkhead 69 to be sealed against the escapage of compressed air. The hot gas lines each have a seal in the form of an electric solenoid valve, near their forward terminal points as will be subsequently described. The electric conduit line 144 is sealed with the plug 144a as described. The air line 11 is sealed at the forward end by electro-magnetic operated solenoid valves as subsequently described. The fuel line 25 leads to the fuel tank 18 and is completely closed to outside air. The four compressed air lines 64, 65, 66 and 67 leading from the exhaust sides of the compressor units must also be made air tight during storage and the state of readiness of the missile and opened at the proper time just before the flight of the missile. This air tightness is provided by the four solenoid operated valves 70, 71, 72 and 73 which seal off the pipe lines 64, 65, 66 and 67 respectively.

In FIG. 4C and FIG. 15 is shown the construction and operation of two of the electro solenoid valves. Valve castings or fittings 178 are provided which are weldedly secured to the short pipe lines, which are integrally formed with and extending out of the bulkhead 69. The pipe lines 64, 65, 66 and 67 which lead to the exhaust outlets of the compressors are weldedly or otherwise suitably secured to the forward end of the valve castings 178. The cylindrical portion 178a of the valve casting extends at right angles to the air passageways through the valve casting. The valve castings are formed of a suitable non-magnetic material such as aluminum or copper alloy. Solenoids 179 are provided which surround the cylindrical extension 178a. These solenoids provide the electromagnetic force which move the solenoid plungers 180 back against the pressure of the spring 181 to open the passageways 64, 65, 66 and 67 at the proper time in the cycle of operations, when a current is passed through the solenoids 179. As will be seen the top or end 180a of the solenoid plungers are formed in a truncated cone shape which are covered by a suitable resilient material 188 of uniform thickness, such as rubber or other suitable material. When no current is flowing through the solenoids 179 and the plungers are forced into their cooperating seats in the valve castings 178, which seats are also of truncated cone shape, the passageways 64, 65, 66 and 67 are completely sealed and are air and gas tight.

The plungers 180 are not solid but are formed with a hollow space within. The open end of the hollow space is closed by the end plug 183, which is threadedly secured to the main plunger parts 180 as may be seen. The holes 180a and 183a allow passage of air or gas through the plunger assembly and prevent trapping of air or gas between the forward end of the plunger and the bottom of the truncated cone shaped plunger seats which are formed in the valve castings 178. The plug 184 closes the end of the cylindrical appendage 178a and provides a stop for the stationary end of the springs 181.

When the missile is launched an electric current from a source outside the missile is allowed to flow through the solenoids 179 in the various solenoid operated valves, at the proper time in the thermodynamic cycle of operation of the missile, during the launching of the missile. Also, when the missile is launched the external source of electric power is no longer present. It is therefore necessary for the solenoid valves when they are opened to remain open even though the flow of the current through the solenoids 179 is terminated. This is accomplished by the plungers 185 which are disposed within the projecting bosses 178b which are integrally formed with the valve castings 178. The end of these bosses are closed by the plugs 186 which are threadedly secured thereon and which provide a stop for the stationary rods and the springs 187. The springs 187 tend to force the plungers 185 radially inward. When the valves are in a closed position and the truncated cone shaped ends of the plungers 180 are seated in their truncated cone shaped seats in the valve castings 178, the inner ends of the pins or plungers 185 ride on the side surface of the truncated end of the plungers 180, the plungers 185 are then wholly disposed within their containing bosses 187b and the springs 187 are compressed. But when the valve plungers are retracted by electromagnetic force, against the pressure of the springs 181, and are in their fully retracted position, the plunger 185 is forced radially inward to the position shown in FIG. 15 and the plungers 180 are locked in their retracted position. In this position the plungers 180 remain throughout the flight of the missile.

The above described construction and functioning is identical and typical of all the electric solenoid valves in the missile, although some of the electric solenoid valve mechanisms are smaller than those shown and described in FIG. 15, due to the fact that some of the pipe lines are smaller in diameter than the pipe lines 64, 65, 66 and 67. But since the construction and operation of the remaining solenoid valves is exactly similar to that shown in FIG. 15, no further description of solenoid valves will be given, although in the various other views corresponding numbers of corresponding parts will be placed thereon.

FIG. 4D and FIG. 16 show the application of a solenoid operated valve, of similar construction and functioning to those previously described and shown in FIG. 15, for the purpose of cutting off the flow of air in the hot gas pipe line 62, which leads to the aft turbine. As previously stated all four of the hot gas lines 29, 62, 74 and 28 are provided with hot gas seals near the forward end of the pipes. The valve shown in FIG. 16, cutting across pipe line 62, is the first one we encounter in a hot gas pipe line in our passage toward the front of the missile. Cross sections through the remaining pipe lines 28, 29, 74, 11, 25, 64, 65, 66 and 67 are also seen in FIG. 16, shown in their correct relative position.

Figure 17:
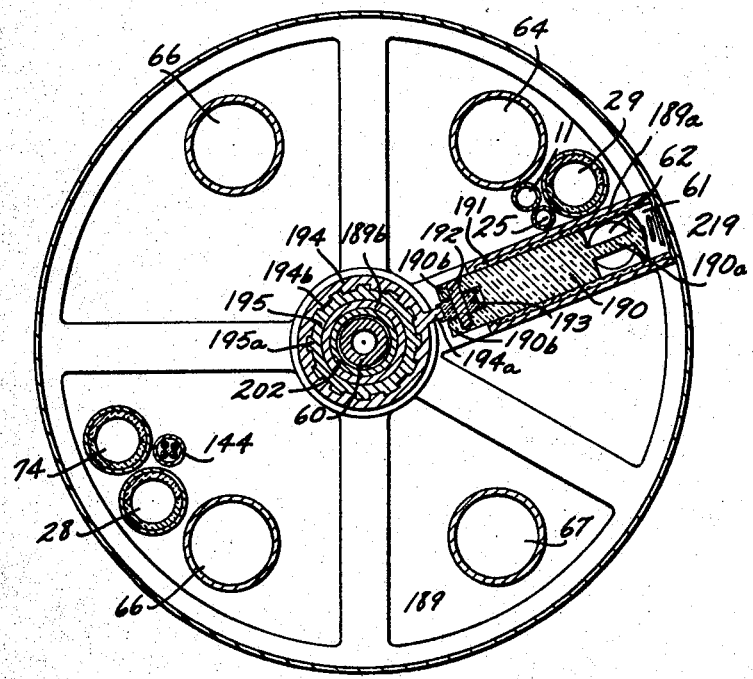
Figure 19:
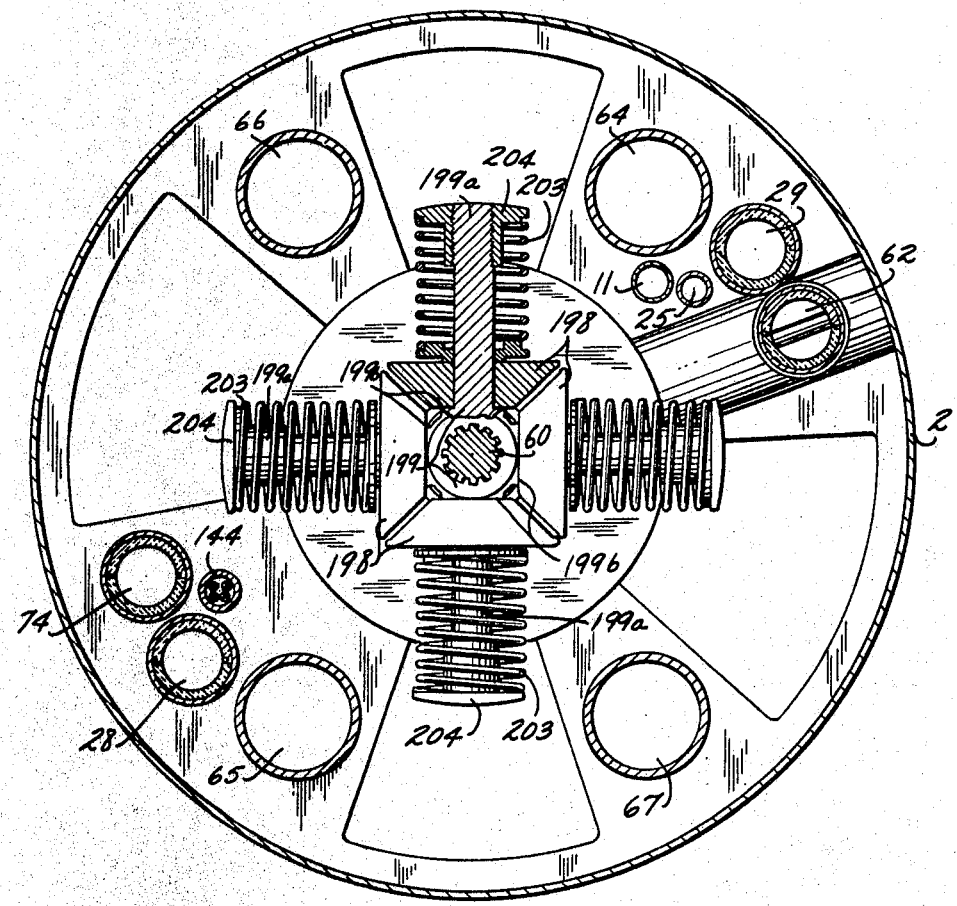

In FIGS. 4D, 17 and 19 is shown the mechanical governor which regulates and controls the speed of the aft turbine 58. This is necessary to prevent the turbine from rotating at excessive and harmful speed, just as a mechanical governor is required in a steam engine to prevent it from running away. FIG. 17 shows a section through the cut off valve which is transversely disposed across the hot gas pipe line 62. The housing 189a is integrally formed with the annular casting 189 (FIGS. 4D and 17) which is in turn secured to the outer shell of the missile by the pins 143. The plunger 190 is slidably disposed within the housing 189a. This plunger has a small cross section or neck 190a which in the position seen in FIG. 17 is transposed across the pipe line 62, leaving ample space for the hot gas to flow. The plunger 190 is formed of a suitable refractory material which will be resistant to very high heat. This plunger slides within a cylinder 191, also of a refractory material which is self-lubricated, so that the hot gases of combustion when flowing through the valve from the combustion chamber do not come in contact with the metal 189a.

At the inner end of the plunger 190b depending fingers 190 are provided through which suitable holes are formed for a bearing pin 192 which rotatably secures the forward roller 193, which in turn rolls upon the inclined projection 194a, which is integrally formed with the slidably mounted flange sleeve 194. The splines 194b are formed within the opening through the flange sleeve and mate with corresponding splines 195a which are formed on the bearing sleeve 195. The bearing sleeve is secured by machine screws 196 to the casting 189 and cannot rotate. A spring 197 bears with its aft end against the casting 189 and with its forward end against the rim 194b which is formed integrally with the flange sleeve 194. This spring keeps the flange 194c, which is on the forward end of the sleeve 194, bearing constantly against the centrifugal weights 198. These weights are rotatably mounted on spindles 199a which spindles and their metal connecting sleeve form a spider 199 which is splined to the shaft 60 of the mechanical governor. This splined shaft is supported on sleeve bearings 200 and 201 which are separated by the spacer 202. The sleeve bearings are disposed within the cylindrical portion 189b which is formed integrally with the casting 189.

Figure 20:
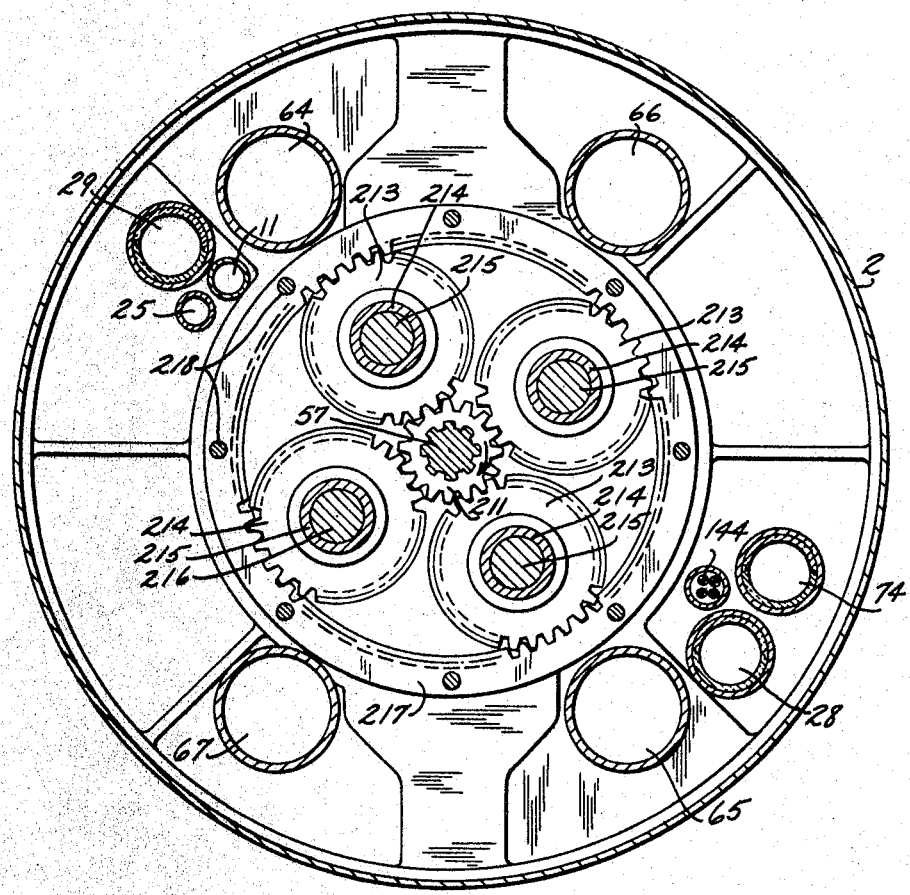

The centrifugal weights are held against the shoulders 199b of the spiders 199 by the compressed springs 203 which are in turn secured by the flanged nuts 204, which are threadedly secured to the outer ends of the spindles 199a of the spider. The forward end of the governor shaft 60 is splined to the hub 205a of the flange 205 of a planetary reduction gear, which may be seen in section in FIG. 4D, and which is similar to the flange 205, as shown in the cross section view of FIG. 20. FIG. 20 shows the cross section of another reduction gear also shown in section in FIG. 4D, which is forward in the missile with respect to the reduction gear which rotates the mechanical governor. The view in FIG. 20 is a cross section taken on line 20—20 on FIG. 4D. A pin 206 secures the flange 205 against sliding longitudinally and the hub 205a of the flange 205, the hub of the spider 199 and in turn the spacer 207, sleeve bearing 201 spacer 202 and sleeve bearing 200 are held firmly against the interior flange 189b of the main circular casting 189 by the nut 208.

The aft turbine, generally located at 58, which will be subsequently more fully explained, and which rotates the aft battery of air compressors, rotates at a very high speed, such as of the order of 15,000 to 20,000 revolutions per minute. It is not practicable to rotate either the mechanical governor or the rotary air compressor at this speed. Consequently the planetary reduction gear 209 is provided on the aft side of the turbine, one member of which (the central or driving spur gear 212) is splined on and rotated directly by the shaft 57 of the turbine. The ratio of the reduction gear is such that the rotation of the mechanical governor 59 is reduced to a suitable speed such as 3,000 revolutions per minute. The reduction gear 56 serves the similar purpose of a speed reduction between the shaft 57 of the turbine and the shaft of the aft air compressor. Another reduction gear of similar size and construction is likewise used in connection with the forward turbine. Only one is needed at the forward end because the air compressor and the mechanical governor are both on the same side of the turbine. This is not the case of the aft turbine 58 as may be seen in FIG. 4D.

The three reduction gears, as before stated, all have parts which are similar and of identical size. Consequently the same numbers to designate a particular part will be given to each reduction gear assembly. The FIG. 20 which shows a cross section view of reduction gear 56 looking forward will now be examined along with the longitudinal section shown in FIG. 4D. The small control spur gear 211 is splined to the shaft 57, the four intermediate spur gears 213 are rotatably supported on sleeve bearings 214, which in turn are supported and secured by the spindles 215, which project from the end housing of the turbines. These spindles are formed integrally with the end housing castings of the turbines. The bearings 214 and spur gears 213 are secured on the spindles 215 by suitable "tru-arcs" 216 as seen in FIG. 4D.

The rotating members 213 of the planetary reduction gears are supported by the protruding shafts or bosses, which are formed integrally with the end housing of the turbines, and these gears are supported thereby. The ring gear 217 which meshes with the four intermediate gears 213, as is seen in FIG. 20, is secured to the flange 205 by the machine screws as shown. By observing FIG. 20 it will be seen that as the shaft 57 of the turbine shaft and spur gear 211 rotate in one direction the ring gear 217 will rotate in the opposite direction and at slower speed. The ratio of speed reduction is of course equal to the ratio of the pitch diameter of the spur gear 211 and the pitch diameter of the ring gear 217.

In the reduction gear 209 the ring gear 217 is supported by the flange 205 which is in turn supported by the shaft 60. This shaft 60 is in turn supported by the sleeve bearings 200 and 201, which are in turn supported by the cylindrical portion 189b of the main casting 189.

The mechanical governor functions as follows. The spider 199 is splined to the shaft 60 and must rotate in unison with both the flange 205 and the ring gear 217, which is also rotationally splined to the shaft 60. The four centrifugal weights 198 are forced against the shoulders 199b of the spider by the four powerful springs 203. The initial compression of the springs is sufficiently great to overcome the radially outward centrifugal force which is being exerted by the weights 198 as a result of the rotation of the shaft 60, until the rotation gets up to a certain critical speed. Meanwhile the centrifugal weights 198 which are formed of a heavy self lubricating material such as "oillite," are not only being carried around in rotation by the spider 199 but are also simultaneously rotating on the spindles 199a. This is caused by the contact of the rims 198a of the centrifugal weights against the cone shaped flange portion 194c of the sliding flange sleeve 194, due to the constant pressure of the spring 197 and the slidable mounting of the flange sleeve on the splined bearing 195. The bearing 195 is secured against rotation by the machine screws 196 and hence the flange sleeve 194 cannot rotate but can only slide longitudinally forward and is forced longitudinally forward by the spring 197 whenever the centrifugal force of the weights 198 is great enough to overcome the initial compression of the springs 203 and compress the springs 203 further. When this speed is reached and the further compression of the springs 203 occurs the weights 198 which are rotating about the spindles 199a "walk up" or roll up the inclined cone shaped flange 194c and the flange sleeve 194 may therefore move forward a distance which will be in proportion to the compression of the springs 203.

In FIG. 17 as previously described the plunger 190 is always in the position shown in FIG. 17, when the centrifugal weights are resting against the spider shoulders 199b. When the sleeve flange 194 is allowed to slide forward, due to the speed of rotation of the weights, in the manner previously described, the roller 193 rolls on the ledge of the rim 194a, which is in the configuration of an inclined plane, such that as the sleeve flange 194 moves forward the plunger 190 is pushed radially outward and the hot gas pipe line opening 62 is partially closed. This lets a smaller quantity of hot gas through the valve opening and the Tesla turbine 58 slows down. If the plunger is pushed the maximum distance the pipe line 62 is virtually closed. The spring 219, which when closed is in spiral form and thereby takes up little space, keeps the roller 193 bearing on the inclined plane, which constitutes the outer edge of the rim 194a.

A certain critical speed of the shaft 60 such as for instance 3000 revolutions per minute is required before the initial compression of the springs 203 is overcome. But when this speed is reached the governor and valve arrangement partially closes the pipe line 62 thus slowing down the speed of the turbine and the turbine speed and the action of the governor causes the turbine to "hunt" back and forth about the approximate desired speed.

The construction and application of the modified Tesla turbine to furnishing power for the rotary air compressors of this missile is shown on FIG. 4D, FIG. 21, FIG. 23 and FIG. 24 and FIG 71.

This turbine is a modification of the turbine invention made by the inventor Nikola Tesla and described in Patent Number 1,061,206 and was issued by the U.S. Government Patent Office on May 6 in the year 1913.

Figure 21:
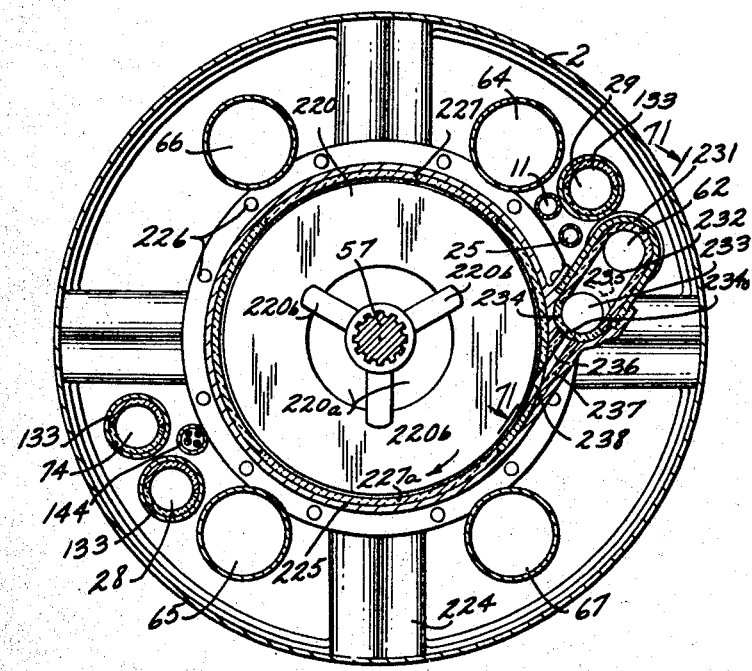
Figure 24:
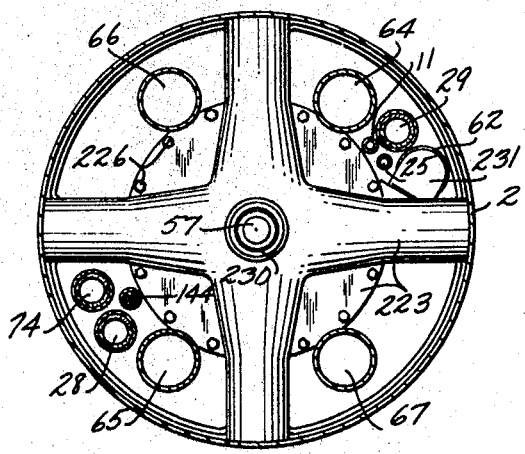
Figure 23:
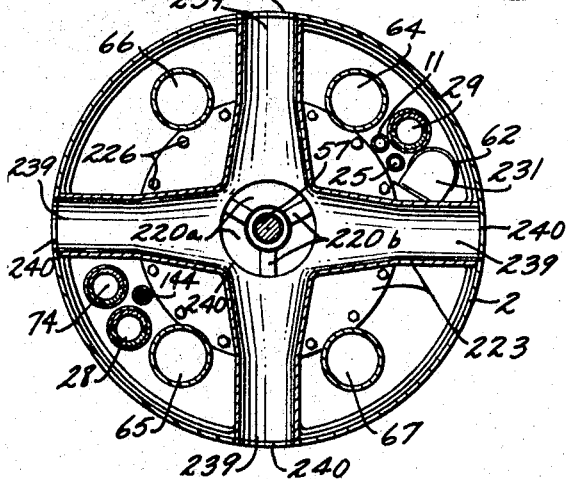

FIG. 4D shows a longitudinal section through the turbine 58. FIG. 21 shows a vertical cross section through the turbine taken on line 21—21 as seen in FIG. 4D, showing the discs and annular housing of the invention. FIG. 23 is a transverse section taken on line 23—23 as seen in FIG. 4D showing the exhaust passageways of the hot gases out of the turbine and FIG. 24 is a transverse cross section showing an elevation view of the side or end housing of the turbine with the view looking aft. FIG. 71 is a partial section taken on line 71—71 as seen in FIG. 21 which shows the various inlet orifices which feed the hot gases into the cylindrical housing in a direction approximately tangential to the periphery of the runners.

This apparatus comprises a rotor or runner composed of a plurality of flat rigid discs 220 of suitable diameter keyed to the shaft 57 as previously mentioned, and held in position thereon by threaded nuts 221 and 222. The discs have openings 220a adjacent to the shaft and spokes 220b which may be substantially straight.

The runner is mounted in a casing comprising a forward and end casting 223, an aft end casting 224 and an annular or cylindrical casting 225 which is secured to the two end castings by the machine screws 226. The cylindrical casting is lined by the refractory sleeve 227 to protect the metal of the cylindrical casting 225 from the heat of the hot gases. The interior diameter of the refractory lining 227 is only slightly larger in diameter than that of the discs 220, having only a small clearance.

Disc shaped coverings 228 are provided for the interior surfaces of the end housings 223 and 224 which are formed of a suitable refractory material. Circular grooves 228a are formed in the interior surfaces of the discs 228 to lessen the molecular drag between the moving discs next to the end housing and the stationary plates 228. The circular grooves as shown have only a narrow space between them and present a much smaller area which is in close contact, thus having less molecular drag than would be the case if the circular grooves 228a were not provided. A labyrinth is formed by projecting circular rings 220c which are formed integrally with the two discs which are adjacent to the end plates of the housing and the circular grooves 228b. This arrangement further seals off the high pressure hot gases which would otherwise escape down the space between the outer discs and out through the exhaust.

A seal 229 is provided of high heat resistant refractory material which is self lubricating with respect to the shaft and is close fitting. Ball bearings 230 are provided for the shaft which rotates at high speed. These bearings should preferably be lubricated with a suitable high heat resistant lubricant such as for instance a silicon product.

The pipe 62 feeds the turbine 58. The pipe 62 is threadedly secured to an elbow 231 (see FIGS. 23, 24 and 71). The elbow lining 232, formed of refractory material, meets the refractory lining 133 of the pipe 62 and conducts the hot gas through this elbow to the short cylindrical passageway 233, which is formed integrally with the cylindrical or annular housing 225 and which extends through the length of the housing part. This cylindrical hole or passageway 223 is lined with a refractory lining comprised of two parts which are semicircular in cross section. The lower part 234 has a multiplicity of holes formed throughout its length as better seen in FIG. 71. The upper part 235 of the lining is suitably cut out at the center to receive the end of the elbow 232, and is shown both in FIGS. 21 and 71. A multiplicity of smaller openings of orifices 236, of cylindrical shape are provided in close proximity along the length of the cylindrical opening 233 and disposed at right angles to the cylindrical opening. These small openings are lined by the refractory tube linings 237 which are held in position by the cylindrical lining 227 which lines the interior of the cylindrical housing 225. It will be noted that this lining for ease of assembly and to avoid rupturing when under the great pressure of the hot gases, is comprised of two semicircular parts 277 and 227a. The holes 238 in the lining 227 mate with the holes 236 through the refractory tubes 237.

By this construction the hot gases flow down the tube 62, through the elbow 232 and into the cylindrical opening 233, thence spreading throughout the length of this cylindrical opening which is equal in length to the length of the annular or cylindrical housing 225. The hot gas thereupon flows through the multiplicity of small tubes 236 and strikes the various discs at high velocity in a tangential direction near the periphery of the discs, thereupon ready to begin the inverse spiral passageway to the exhaust passage formed by the openings 220a. The spent gases then pass through the openings 220a in the multiplicity of discs 220 and thence into the passageways 239, which are formed in the two end castings as shown in FIGS. 4D and 23. It will be seen in FIG. 23 that there is a circular hole 223a and 224a in the central part of the end housing 223 and 224, respectively, which mates with the openings 220b in the various discs. It will be seen in FIG. 4D that the hot spent gases may flow through the openings 220a in either direction toward the aft or front of the missile and pass through the holes 223a and 224a respectively and into the passageways 239 in the end housings. By observing FIG. 23 it is seen that the exhaust gases once having passed through the hole in the center of the end housings may then flow and exhaust to the outside air through four radial passageways in the housings (FIG. 23) and through holes 240 in the outer cylindrical shell of the missile.

It will be understood that this invention is not confined to the type of turbine motor described herein. Any conventional turbine such as those provided with vanes could also be used in this invention, to rotate the air compressors.

There are two other turbines in the missile. One is identical in size to turbine 58 and drives the forward battery of air compressors and the third turbine, which is smaller and is driven by compressed air rather than hot gases, rotates the rotary electric power source. These two remaining turbines are constructed similarly to the construction of turbine 50 and function similarly. Consequently the complete description given of the turbine 58 will suffice for the other two turbines. Like numbers will be assigned to like parts in the three turbines but when in the progress toward the nose of the missile these other two turbines are encountered, attention will be called to their relative location in the missile but their detailed functioning will not be described.

FIG. 4D shows the flange 205 of the planetary reduction gear 56 is splined onto the shaft 145 of the rearmost compressor unit VIII.

As previously stated there are eight compressor units. The eight compressor units are arranged in tandem fashion. These compressor units and their functioning, as has been previously referred to, are similar in construction and combination of mechanical parts to the air metering motors which are located in the compressed air chamber. The difference in functioning is that the air compressor units are driven by an outside source of power namely the turbines whereas the air metering motors are rotated by the compressed air itself which is located within the compressed air chamber and which surrounds the two air metering motors.

Figure 55:
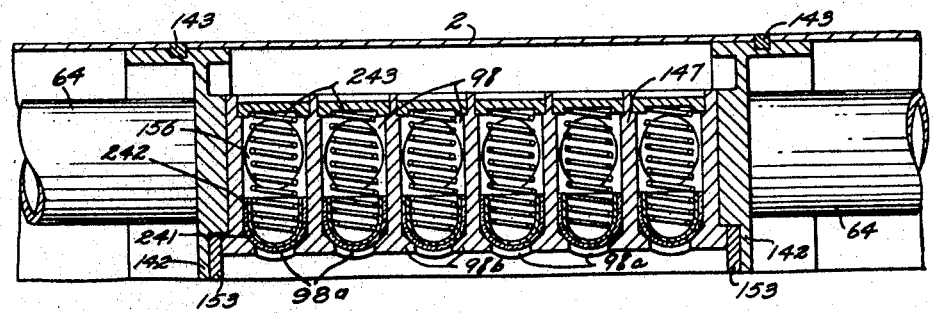
Figure 56:
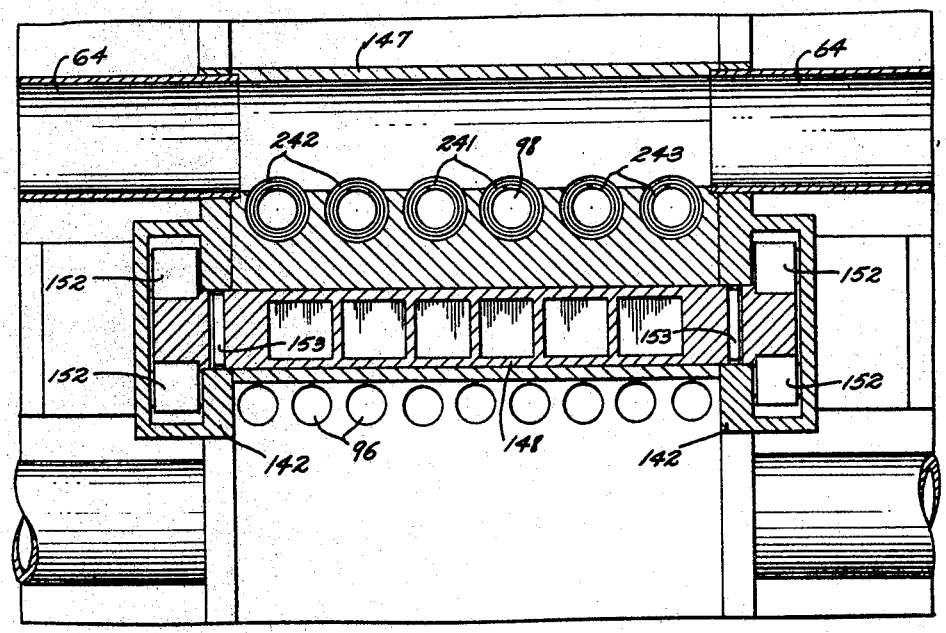

There is a slight difference between the air compressors and the compressed air metering motors, however, which will now be explained. A view will now be had of FIG. 4D, FIG. 4E, FIG. 22, FIGS. 25 and 26, and FIGS. 55 and 56. FIGS. 4D and 4E show longitudinal sections through some of the compressor units. FIGS. 22, 25 and 26 show transverse sections through two typical compressor units. FIG. 55 shows a fragmentary longitudinal section through the spring loaded outlet orifice valves of a typical compressor unit. And FIG. 56 shows a fragmentary horizontal section through the outlet or exhaust orifices of a typical compressor unit and also shows a section through one of the reciprocating gates.

FIG. 25 which is a transverse section of compressor unit number VIII taken on line 25—25 as seen in FIG. 4D, shows a rotor 97 rotating in a counterclockwise direction as seen by the arrow. The turbine 58 which drives the rearmost compressor units rotates in a clockwise direction of rotation so that the rearmost four air compressor units which are driven by the turbine 58 when the direction of rotation is reversed by the reduction gear are driven in a counterclockwise direction as shown in FIG. 25.

The rotor 97 is affixed by a splined arrangement on the shaft 145. In the immediate condition shown in FIG. 25 the lower radial reciprocating gate 148 is at the low point between the lobes 97c and 97d. The reciprocating gate casting is at its extreme uppermost position and the outer cylinder 149 of the needle roller is resting on the extreme upper tip of the lobe 97b. As the rotor 97 rotates, the air in the space E which is trapped between the lobe 97c and the lobe 97b, the outer cylindrical housing 147 and the plates 153 is further compressed as the volume of the space E becomes smaller. As the rotation of the rotor 97 progresses the roller cylinder 149 rolls down the sloping side 97g of the lobe 97b and the upper reciprocating gate 148, which is now partially descended from the initial position shown in FIG. 25, forms a part of the boundary of the space E which is holding a quantity of air in confinement.

A series of exhaust orifices 98 (FIGS. 25 and 55) are provided in the annular casting 147 in which are placed spring loaded valves. These valves consist of a metallic lining 241 which are covered with a layer 242 of a suitable type of self lubricating and high heat resistant rubber suitably bonded together. Springs 243 normally hold the valves against the seats 98b at the bottom of the exhaust orifices 98. In the center of the valve seats 98b there are annular openings 98a through which the compressed air may pass from the space E. When the rotor 97 has rotated far enough from the initial position seen in FIG. 25 to increase the pressure of air in space E to a point slightly greater than that of the compressed air in the compressed air exhaust line 64 the spring 243 is compressed until the lower end of the valve coverings 242 are sufficiently high to allow the air to enter the openings 98a and pass through the openings 156 into the compressed air pipe line 64. When the lobe 97c has rotated until the tip 97c is under the opening 98a all the air in the space E has then been forced into the air line 64 through the openings 98a. At this instant the pressure of the springs 243 and the back pressure of the compressed air in the pipe 64 forces the valves 242 back down again on the seats 98b. This prevents escape of the air which has been thus compressed. The valve 242 works with high speed but the resilient covering 242 made of suitable material is self-lubricating. Also the resilient covering 242 prevents undue impact when the valve returns to its seat 98b. The air metering motors shown in FIGS. 9 and 10 do not require this valve to prevent the back flow of air.

Simultaneously while the right half of this rotary compressor has been functioning in the manner described the left half is also functioning in the same manner. In FIG. 25 it is seen that the valves 242 in the lower left half of the figure are about to open due to the fact that the air is being compressed in the space F. The space F is bound by the lobe 97d, the annular outside housing 147, the two end plates 153 and the lower reciprocating gate 148. When the space F due to the rotation of the rotor 97 becomes sufficiently small for the air pressure in space F to become greater than the back pressure of the air in the exhaust line 65, the spring 243 is compressed and the air in the space F rushes through the holes 98a and into the pipe line 65.

The compressor units are double acting. That is, the right half of the compressor unit (as seen in FIG. 25) is compressing air simultaneously as the left half is compressing air. This means that the cubical volume of the three spaces between the three lobes of the rotor 97 and the annular outer housing 147 is emptied of air twice for each revolution of the rotor. This makes for great volumetric capacity of the compressor units and provides for high capacity of the compressor units, in terms of pounds of air compressed per second, in proportion to the space and weight of the compressor units.

The shafts 145 of the various compressor units are connected each to each by a short splined shaft 53 which is splined at each end to the adjoining shaft. For illustration of this construction see FIG. 4E. This construction in having a short individual shaft 145 for each compressor unit permits easy alignment and eliminates the necessity for unreasonably accurate alignment between the various shafts.

The arrangement of alternate direction of the reciprocation of the various reciprocating gate casting with respect to adjoining compressor units to eliminaate vibration has been previously touched upon and will now be more fully discussed. In FIG. 25 the reciprocating gate casting at the instant shown is at the extreme upper position. FIG. 25 is a transverse section through the rearmost compressor unit number VIII taken on line 25—25 in FIG. 4D. FIG. 26 is a cross section through compressor unit number VII taken on line 26—26 in FIG. 4E. The construction of the compressor unit VII is identical with respect to compressor unit VIII, except that the rotor is secured to the shaft 145 in a position 180 degree rotationally removed from the position of the rotor in FIG. 25 so that at the instant the reciprocating gate casting in FIG. 25 is at the extreme uppermost position the reciprocating gate casting in FIG. 26 is at its extreme lower position. Likewise FIG. 4E and FIG. 4F represent longitudinal sections through the compressor units VI and V. No transverse sections are drawn through these units but if such sections were drawn the transverse section through the compressor VI would be identical to that of FIG. 25 of the compressor unit VIII. Likewise if the transverse section were drawn through the compressor unit V it would be identical to that shown in FIG. 26 of the compressor unit VII. In other words the compressor units alternate with respect to the rotational position of the rotor 97 and the shaft 145. As a result, when the battery of four compressors (numbers VIII, VII, VI and V) are in rotation, two of the reciprocating gate castings are being accelerated upward while the other two are being accelerated downward. Furthermore each gate casting which is being accelerated upward is adjacent to a gate casting which is being accelerated downward. This arrangement cancels out most of the unbalanced forces and vibration which would otherwise result when the shafts 145 are driven at a high rotational speed of the order of 3000 or so revolutions per minute and the various gate castings are violently reciprocated.

All the four rearmost compressor units are connected in common to the two exhaust compressed air lines 64 and 65 (FIGS. 25 and 26). But the four forward compressor units are connected to the two common exhaust compressed air lines 66 and 67. In FIGS. 25 and 26 are seen the sections through the two pipe lines 66 and 67 which pass by in close proximity and are disposed parallel to the rearmost four compressor units as the pipes lead rearward to the compressed air chamber 68 at the rear of the missile. The pipe lines 66 and 67 however do not touch the battery of four rearmost compressor units and there is plently of free space around the pipes 66 and 67 so that air may flow into the inlet orifices of the aft compressor units. In FIGS. 27 and 28 and FIG. 18 and FIGS. 4E and 4F show the end housing castings 142 of the compressor units are comprised of a solid circular portion 142c (FIG. 18) which is securely bolted to the annular casting 147 by the bolts 155 (see FIGS. 13, 18 and 4C). These annular end castings also are provided with rims 142a which are connected to the solid central part of the casting by the "spokes" 177. The rims are secured to the outer cylindrical shell by the pins 143 as previously described. This spoke arrangement not only allows a free space through which the various pipe lines such as 28, 29, 74, 144, 11 and 26 may freely pass but also permits full easy and free flow of air from the intake at the front of the missile all the way back through the missile to the bulkhead 69 (FIG. 4C) which seals off the forward end of the compressed air chamber. Thus air completely surrounds all eight of the compressor units and may then freely flow into the inlet orifices 96 of all the compressed air units while they rotate.

This arrangement also is an efficient arrangement in that a certain amount of heat transfer takes place since the fresh incoming cool air surrounds the hot gas pipe lines 28, 29, 62 and 74. Also the air surrounds the compressed air exhaust lines 64, 65, 66 and 67 which contain compressed air and which, due to the heat of compression, may be at the temperature of perhaps 500 to 600 degrees Fahrenheit. As a result the cool air is to a certain degree preheated before it enters the compressors.

Since the construction of the air compressor units number VI and V are identical to compressor units number VIII and VII respectively there will be no description of them. Longitudinal section of compressor units VI and V are shown in FIGS. 4E and 4F.

We pass now to the junction point between the rearmost four compressor units and the forward four compressor units, shown of FIG. 4F, FIG. 18 and FIGS. 46 and 47.

We have shown that the rearmost battery of four compressed air units and the forward battery of four compressed air units rotate in opposite directions in order that torque may be balanced and cancelled out and the missile may not rotate in flight. It is also desirable that the front battery of compressor units and the rear battery of compressor units rotate at the same speed. To accomplish this a spur gear reversing arrangement is provided in order to cause uniform and reverse rotation between the two battery compressors.

Figure 18:
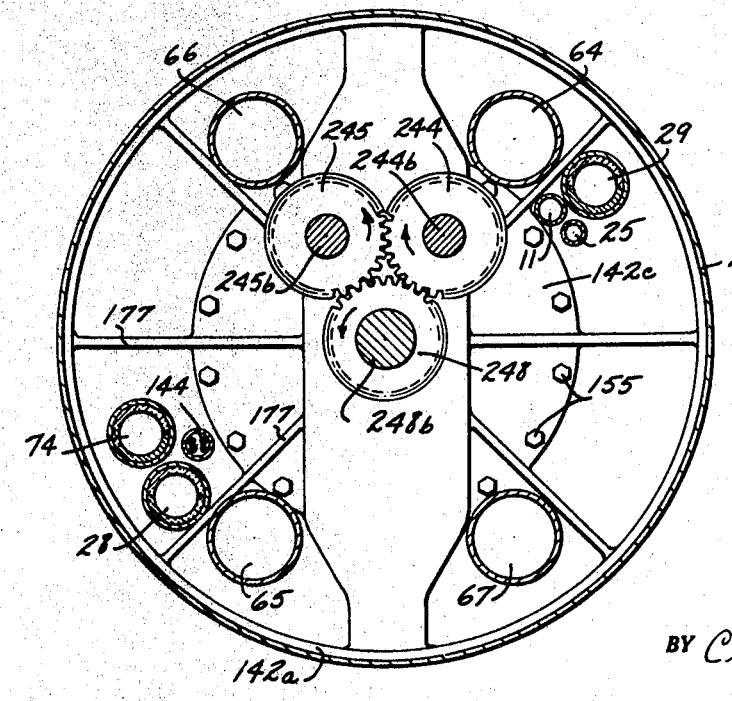

FIG. 4F shows a longitudinal view through the spur gear reversing system. FIG. 18 is a transverse section through the missile taken on line 18—18 in FIG. 4F. FIG. 46 is a fragmentary transverse section through the reversing gear taken on line 46—46 in FIG. 4F and FIG. 47 is a fragmentary horizontal section showing a plan view of the reversing gear, taken on line 47—47 in FIG. 4F.

The two wide faced spur gears 244 and 245 (seen fully in plan view in FIG. 47) are each provided with the two shaft ends 244a, 244b and 245a and 245b respectively which are formed integrally with the wide faced gears. The forward and aft ends of these shafts are inserted in hollow bosses 246 which are integrally formed on the two particular compressed air end castings which adjoin the spur gear reversing mechanism. Suitable sleeve bearings (not shown) are provided which are inserted within the hollow bosses 246 and serve as bearings for the shaft ends of the spur gears 244 and 245. The spur gear 247 has the short shaft 247a formed integrally with it, and this shaft is splined and is inserted into the interior splined mating surface of the shaft 145 of the air compressor unit number V. The spur gear 248 has the short shaft 248a formed integrally with it and the shaft 248a is inserted into the splined socket on the aft end of the shaft 145 of the compressor unit IV.

The shaft 145 and spur gear 247 rotate in a counter clockwise direction (see FIGS. 25 and 26). The spur gear 247 meshes with the wide faced spur gear 244 and the gear 244 is caused to rotate in a clockwise direction as will be seen in FIG. 18. The spur gear 247 does not mesh with the gear 245 as will be seen in FIG. 47. The gear 244 meshes with the wide faced spur gear 245 and rotates it in a counter clockwise direction (FIG. 18). The spur gear 245 meshes with the spur gear 248 and rotates it in a clockwise direction. This of course causes the shaft 145 of the compressor IV to rotate in a clockwise direction and this of course means that the entire group of the forward four air compressor units rotate in a clockwise direction. This is in the opposite direction from the rotation of the aft battery of compressors which rotate in a counter clockwise direction. A suitable means of lubrication may be devised for this spur gear system. For instance the wide faced spur gears 244 and 245 may be formed of "oillite" material and machined therefrom. Or any other suitable means may be employed.

Since the two gears 244 and 245 have the same pitch diameter and since the two gears 247 and 248 have the same pitch diameter the front and rear battery of air compressor units rotate at the same speed, though in opposite directions.

Referring to the front of the missile, FIGS. 4F, 4G and 4H show the longitudinal sections through the forward four compressor units which, as may be seen are numbered IV, III, II and I. These four units are identical in construction with the corresponding four aft compressor units which have been described, except that the forward units rotate in the opposite direction to the aft units. Hence the forward four compressor units will not be described although similar numbers will be applied to similar parts throughout the different compressor views.

Figure 27:
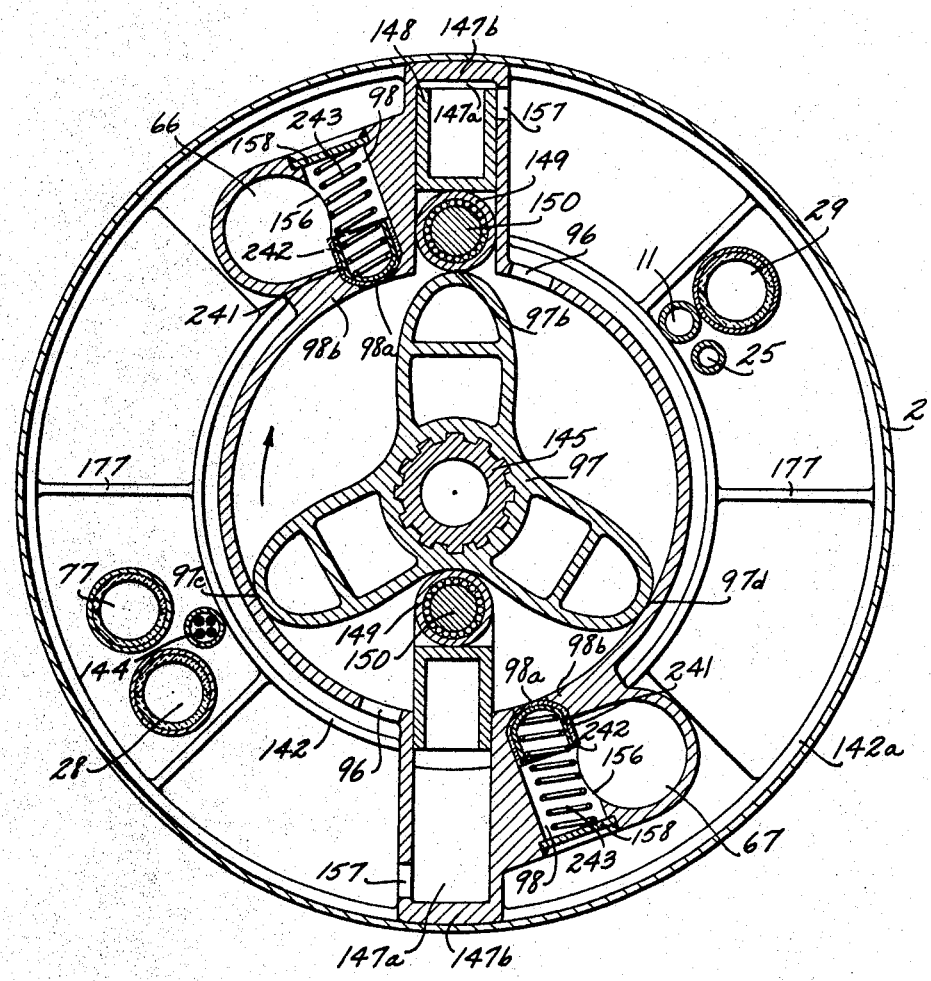
Figure 28:
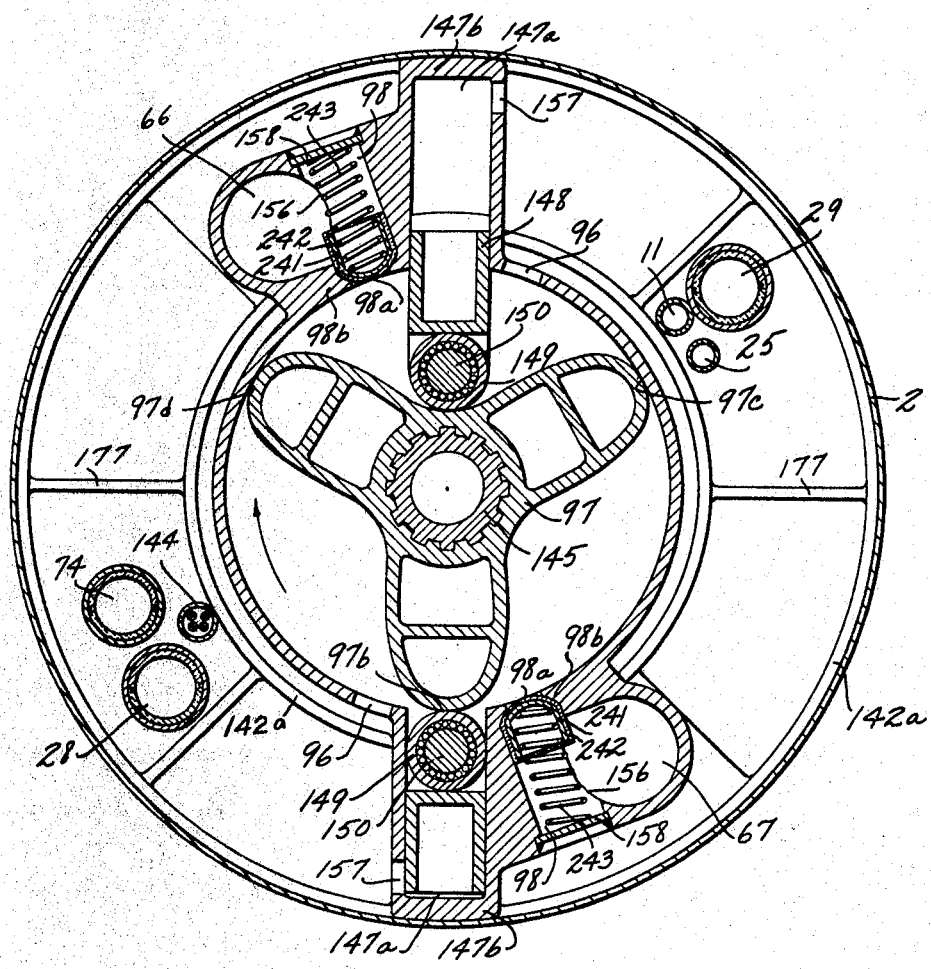

In order to illustrate the direction of rotation of the forward battery of compressors. FIG. 27 is a transverse section taken on the line 27—27 in FIG. 4F and shows a section through the compressor unit IV. FIG. 28 shows a transverse section through compressor unit III taken on the line 28—28 in FIG. 4G. In FIGS. 27 and 28 the rotors of the forward battery of four compressors rotate in a clockwise direction. Just as in the case of the aft battery of compressors the reciprocating gate castings of the adjacent compressor units are simultaneously accelerated in opposite directions. At the present instant the gate casting in compressor unit IV is at its uppermost position while the gate casting in compressor III is at its lowermost position. At this same instant the gate casting in compressor unit II, while not shown in sectional view, is at its uppermost position and the gate casting in the compressor unit I is at its lowermost position. This arrangement substantially cancels out unbalanced forces in the missile while in flight and vibration just as in the case, previously explained, of the rear battery of compressors.

Figure 29:
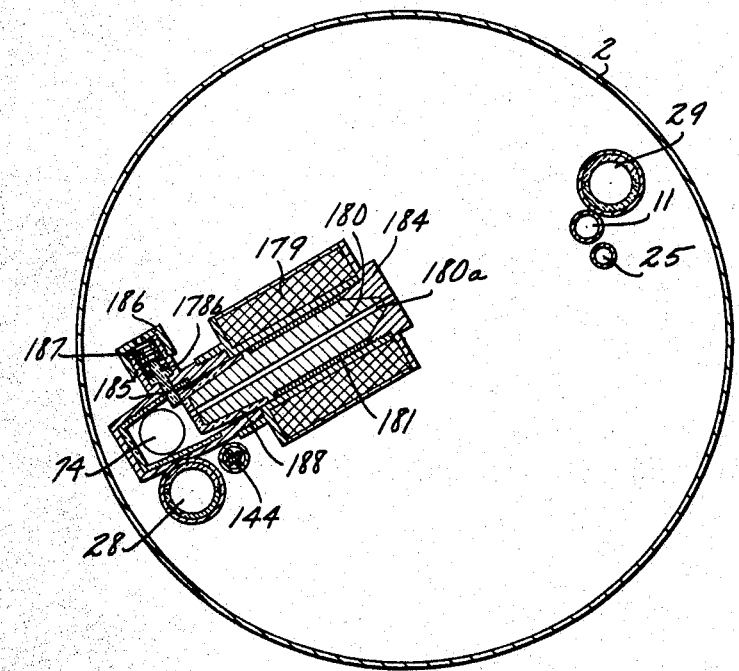
Figure 30:
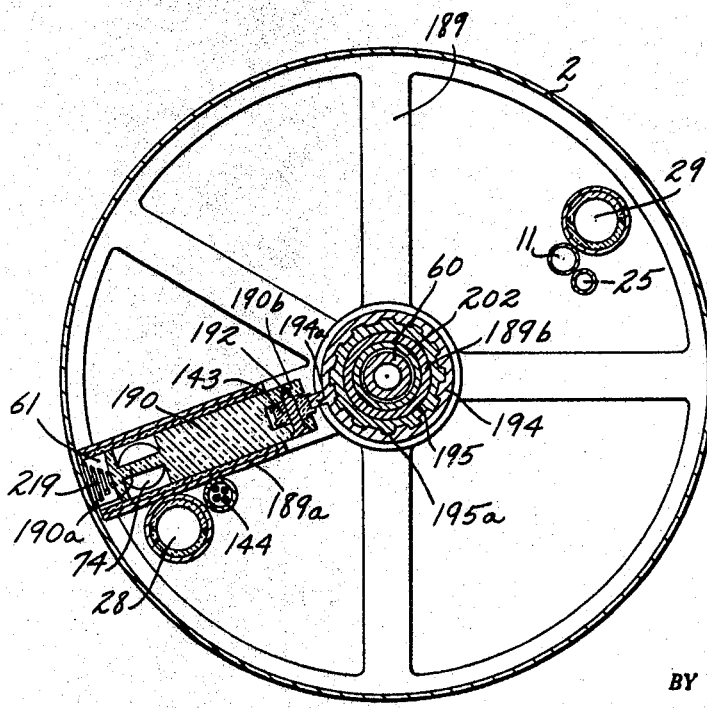
Figure 31:
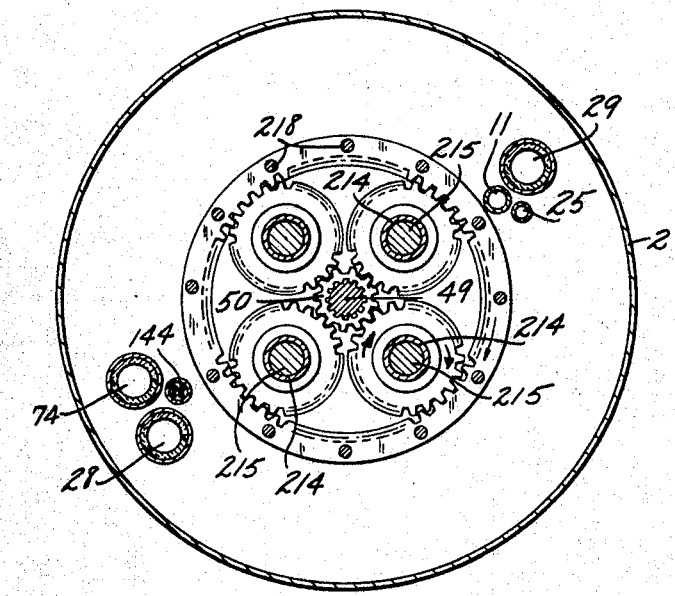
Figure 32:
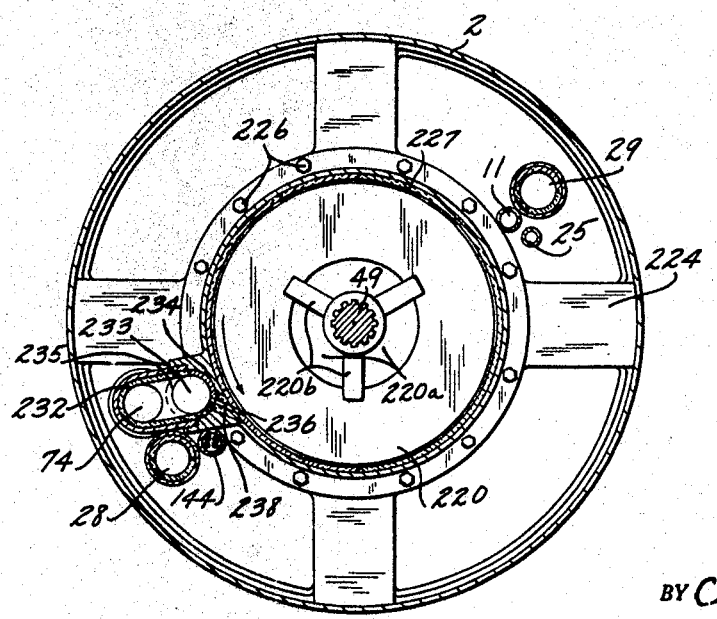

Proceeding further toward the front of the missile FIG. 4H, FIG. 29 and FIG. 30 and FIG. 31 and FIG. 32 show the forward hot gas cut off valve for the pipe line 74 which leads to the forward turbine 44, the mechanical speed governor for this turbine, the planetary reduction gear and the forward turbine. FIG. 4H is a longitudinal section view through the above mentioned parts. FIG. 29 is a transverse section through the missile taken on line 29—29 in FIG. 4H showing the solenoid cut off valve for the hot gas line 74. FIG. 30 is a transverse section through the missile taken on line 30—30 in FIG. 4H showing a section through the cut off valve in the hot gas line 74 which leads to the forward turbine 44 and a section through a portion of the mechanical governor mechanism. FIG. 31 shows a transverse section through the missile showing the forward planetary reduction gear 48 taken on the line 31—31 in FIG. 4H. FIG. 32 is a transverse section through the missile taken on line 32—32 in FIG. 4H showing a transverse section through the forward turbine 44. Since the mechanisms corresponding to and duplicating these have been fully described in connection with the rearmost or aft turbine, reduction gear and governor mechanisms, these mechanisms will not be described again in detail. Corresponding numbers have been assigned to corresponding parts in the case of front and rear turbines, front and rear reduction gears and front and rear compressor speed governors. Consequently the mechanisms referred to immediately above will be discussed only briefly.

The solenoid operated cut off valve in FIG. 29 which cuts off and makes air and gas tight the hot gas line 74 which leads to the forward turbine 44, is identical to the solenoid operated valve shown in FIG. 16 which cuts off and forms a similar seal to the hot gas pipe line 62 which leads to the aft or rear turbine. The two solenoids operate in identical manner. Corresponding numbers are given to corresponding parts and no further description is required. The valve in FIG. 29 cannot be seen in FIG. 4H since it is located in the half of the missile which is cut away by the sectional view as seen in FIG. 4H.

In FIG. 30 is seen a section through the cut off valve for the hot gas line 74 which is operated by the mechanical speed governor 47. This mechanism is further seen in FIG. 4H. The functioning of the speed governor which controls the aft turbine shown in FIG. 4D and the speed governor shown in FIG. 19 is similar. Identical reference numbers are generally given to corresponding parts since the functioning of the governor of FIG. 4H and FIG. 30 is identical to the functioning of the governor which controls the aft turbine, the description of the forward governor is not required. In FIG. 31 and in FIG. 4H is seen the planetary reduction gear 48 which reduces the speed of the forward Tesla turbine 44. This reduction gear functions in a similar manner to the reduction gear 209 shown in FIG. 4D and generally speaking like numbers are assigned to corresponding parts.

FIG. 4H and FIG. 32 show views of the forward turbine 44 which drives the forward compressors IV, III, II and I. FIG. 32 is a transverse section through the missile taken on line 32—32 in FIG. 4H. This shows a transverse section through the forward turbine 44. FIG. 4H shows a longitudinal section through the same turbine. This turbine functions in identical manner to the aft turbine 58 shown on FIG. 4D and corresponding numbers are generally assigned to corresponding parts. It will be pointed out however that due to the direction of flow of hot gases against the periphery of the turbine discs as shown in FIG. 32, the direction of rotation of the discs in turbine 44 is counter clockwise. This direction is reversed, as previously described, by the planetary reduction gear 48 and the forward battery of four compressors rotate in a clockwise direction as previously described.

Figure 33:
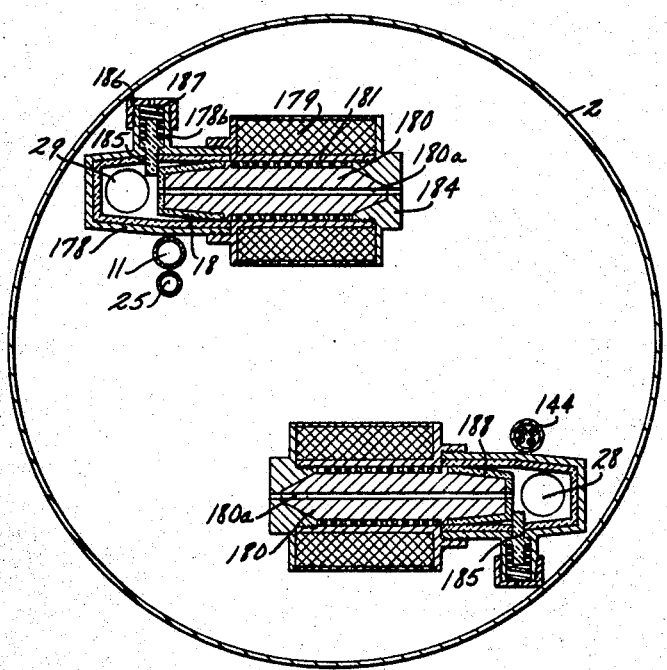

Toward the front of the missile FIG. 4I, FIG. 33 and FIG. 34, FIGS. 35 and 36, FIGS. 37 and 38, FIG. 48, FIG. 49, FIG. 50 and FIG. 51 show the various mechanisms related to the radial jet valving mechanisms and the mechanical and pneumatic servo mechanisms for controlling the same. FIG. 4I is a partial longitudinal section through the missile. FIG. 33 is a transverse section taken through the missile taken on the line 33—33 on FIG. 4I. FIG. 33 shows the two electric solenoid cut off valves which closes off the two hot gas lines 28 and 29 which supply hot gas to the radial jets, which are subsequently to be more fully described. These two solenoid valves are identical to the valves of FIG. 16 which cuts off the hot gas line 62 and the solenoid valve shown in FIG. 29 which cuts off the hot gas pipe line 74. Similar numbers are given to parts in FIG. 33 to correspond to the part numbering given to the valves in FIG. 16 and FIG. 29. Since the functioning of the valve is identical to the functioning of the previously described valves, no further description is provided now.

Figure 34:
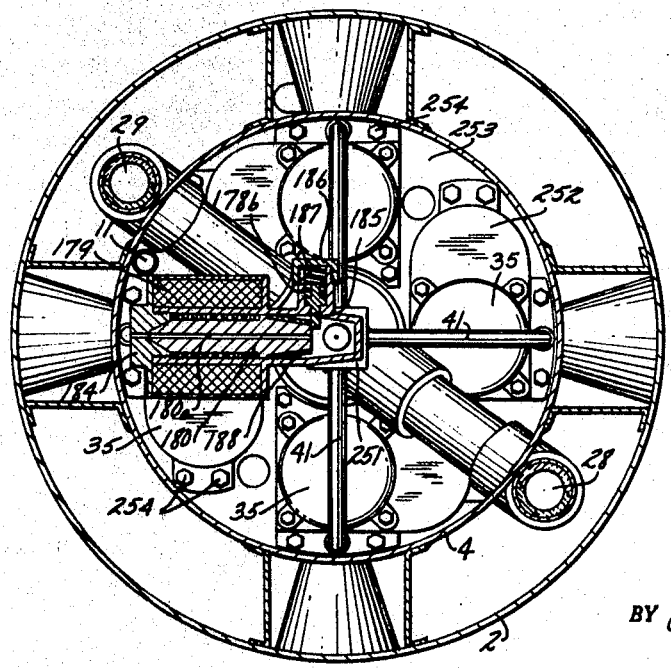
Figure 35:
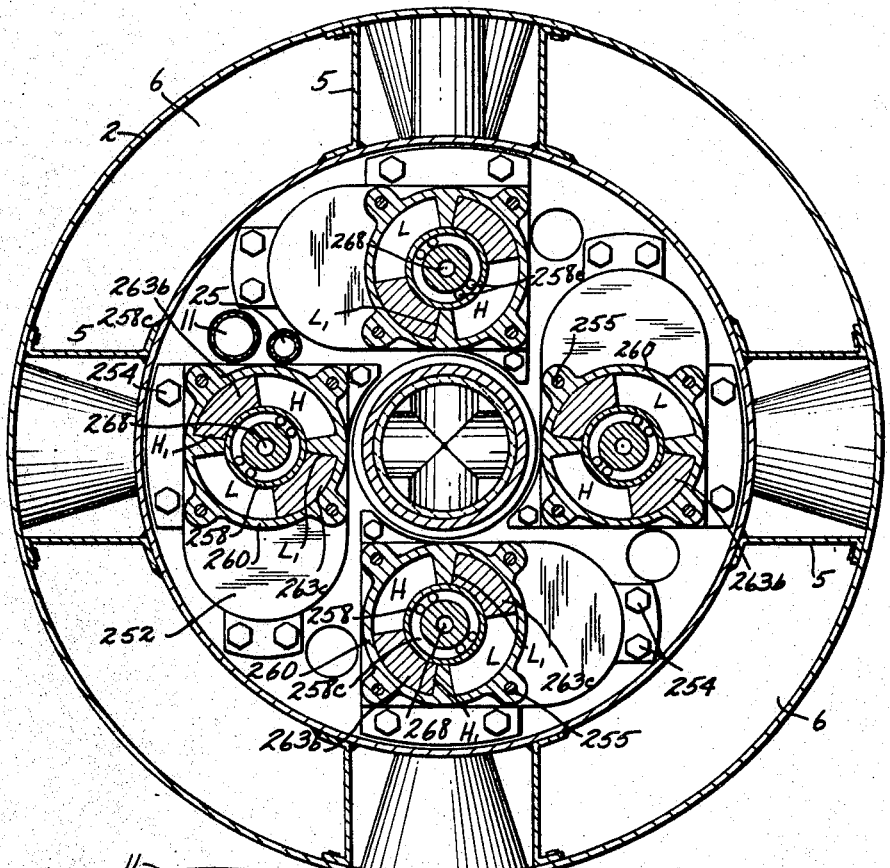

FIG. 34 is a transverse section through the missile looking forward taken on the line 34—34 on FIG. 4I. This view shows a solenoid operated valve 179 similar in construction but slightly smaller than the valves described for the hot gas lines. The valve is used for cutting off the branch line 250 from the main air line 11, which, as seen in FIG. 4I, bends and enters the valve 179 then emerges and enters the distributor block 251. The four lines 41 emerge from the distributor 251 to lead the compressed air to the four pneumatic servos which function in a manner subsequently more fully described. Numbers are applied to parts in valve 179 which are identical to those numbers given corresponding parts in the solenoid valves previously described. Since the functioning of these valves have been fully described, a further description of the functioning of the valve 179 is not required. In FIG. 34 is also seen the housing 252 of the four mechanical and pneumatic servo mechanisms which control the radial jets. These housings are secured to the bulkhead 253 by the machine bolts 254.

In FIG. 34, a transverse section looking forward, are seen the aft end views of four small electric servo motors 35 which are secured to the housings 252 by the bolts 255. These four small servo motors each separately receive an electrical error signal from the electronic and radar and/or infra red detection system when the direction of travel of the missile warrants it. If we look at FIG. 34, which is a transverse section looking toward the front of the missile, the right servo 35 receives an error signal from the guidance system when the center line of the missile is pointed too far to the right of the target. A position of rotation is then given the right electric servo motor 35 which is in proportion to the amount the nose of the missile has deviated from the straight line course toward the target. In a manner subsequently to be described, this rotation of the servo motor 35 gives a signal, which signal is followed by the pneumatic servo mechanism and the gear train, which opens the valve for the radial jet line, which lets hot jet gases escape in a radial direction to the right of the missile. This action provides a powerful thrust which forces the nose of the missile back to the left and on to the target again. As the nose of the missile moves back onto the target the right electric servo motor 35 rotates back toward its neutral or zero position as the error signal lessens and when the missile is on the target again the electric servo motor is completely back on zero position again, the pneumatic servo and spur gear train follows the electric servo motor rotation and the radial jet orifice is closed. In similar manner when the missile nose is too far to the left of the target the signal is given to the left electric servo motor 35, and an action similar to above takes place. When the nose of the missile is pointed momentarily below the missile the lower electric servo motor 35 functions and when the missile nose is pointed above the target the upper electric servo motor 35 provides a signal which causes the upper radial jet orifice to open, the hot gases escape through the radial jet and the nose of the missile is pushed downward and on to the target again.

Since all of the four pneumatic and mechanical servo systems function in an identical manner when a signal is given, one typical system will be described to suffice for all. The functioning of the upper servo system for the upper radial jet will be described. FIG. 35, FIG. 36 and FIG. 4I, FIGS. 48, 49, 40 and 51 are fragmentary transverse sections through the pneumatic servo for the upper radial jet.

The pressure of air in the air line 41, which is of the order of about 200 pounds per square inch, is continuously available. The air cannot enter the servo system however until the upper servo motor 35 rotates a slight amount, which it does when it has received an error signal. It will be noted that the shaft 256 is connected by a splined sleeve 257 to the end of the shaft 258a which shaft is formed integrally with the pneumatic valving and signal rotor 258. The end 258a is supported on the ball bearing 259 which is supported by the exterior pneumatic housing 260. The housing 260 is secured by the machine screws 255 which pass through the flange 35a of the housing of the electric servo motor 35 and continues through the servo housing 260. The screws 255 are threadedly secured into the housing 252. The forward end shaft 258b of the pneumatic valving signal rotor is supported by the ball bearing 261.

In FIG. 4I the compressed air continuously enters through the elbow 262, through the passageway 260a in the housing 260, and flows around the annular groove 258c which is formed in the aft end of the rotor 258. In order to equalize the pressure of the air an annular groove 258d is provided on the forward end of the rotor 258 and the holes 258e (not seen in FIG. 4I, but seen in FIG. 48) are provided which conveys the highly compressed air from the annular ring or groove 258c to the annular ring or groove 258d. The air under pressure in the groove 258c may then exert pressure against the side 260b of the housing 260 and against the bottom of the groove, and the compressed air in the annular groove 258d may exert pressure against the part 263, the use of which is later explained, and against the bottom of the groove 258d. This provides a pneumatic balancing of pressure in the longitudinal direction with respect to the rotor 258.

Part 263, in FIG. 4I, FIG. 48, FIG. 49 and FIG. 50, is rotatably disposed within the pneumatic servo housing 260 within an annular socket 260b which formed in the forward end of the housing 260. This socket 260b is so formed with respect to the proper clearance that it serves as a bearing within which the circular rim 263a of the part may be supported and rotate. The forward end of the part 263 butts against the annular part 264, a section through which is seen in FIG. 51. A shoulder 264a formed on the part 264 insures that the part 264 will be at all times concentric with the part 263. The two parts 263 and 264 are secured by the machined screws 265 as may be seen in FIGS. 4I and 51. The forward end of the part 264 is splined on the aft end of the shaft 266a which is formed integrally with the spur gear 266. This is the first spur gear of the step up spur gear system which will be subsequently described. This spur gear 266 is supported by the sleeve bearing 267 as shown in FIG. 4I. This sleeve bearing may be formed of a suitable self lubricating material such as oillite. It may be seen that the pneumatic valving and signal rotor 258 is supported by ball bearings at each end, the longitudinal pneumatic pressure is balanced in the manner previously described and the tolerances between the larger cylindrical perimeter of the rotor and the outer pneumatic housing 260 is such that there is a negligible escapage of compressed air, but that nonetheless the rotor 258 may rotate freely without sliding contact or sliding friction with the exterior housing. Thus the small electric motor 35 need exert only a very small torque to rotate the pneumatic valving and signal rotor 258.

The passage of compressed air through the servo system and its functioning when the electric servomotor rotates is as follows. Air is present and under pressure at all times in the annular rings 258c and 258d as has been explained. The position of the parts of the pneumatic servo system as seen in FIGS. 48, 49 and 50 are as they will be when the electric servo motor is at the neutral or zero position as it is when no signal is being received.

Suppose the upper electric servo motor 35 receives an error signal of a certain strength and immediately rotates clockwise as seen in FIGS. 48, 49, 50 and 51. FIG. 48 is a section through 48—48. The part 263 has two projecting lugs 263b and 263c, extending from the main annular portion, which lugs are seen in FIGS. 48, 49, 50 and 51. These lugs are not seen in FIG. 4I since the section in FIG. 4I is taken through the servo mechanism at the position shown by line Z—Z in FIG. 48, in which the two stationary gates 260c and 260d are split by the sectioning plane. The two lugs 263b and 263c since they are formed integrally with the annular part 263, rotate with the part 263. The lugs 263b and 263c extend the entire length of the large cylindrical portion of the rotor 258 and fit by close tolerance and form two moving gates cross the annular spaces H and L. Observing FIG. 48, as long as the holes 258f are in the position shown the compressed air in the annular ring 258c cannot escape. But when the rotor 258 rotates to a slight degree a portion of the hole 258f coincides with the passageways 263d which are formed in the lugs 263b and 263c, respectively. This compressed air enters the spaces H1 and L1 and forces the lugs 263b and 263c to rotate in a clockwise direction until the holes 258f are again in the relative position shown in FIG. 48 with respect to the two lugs, regardless of how far the rotors may have rotated. In other words the lugs 263b and 263c and the annular part 263, which is formed integrally with the lugs is forced by this pneumatic valving system to rotate exactly and precisely as the rotor 258 does.

Figure 36:
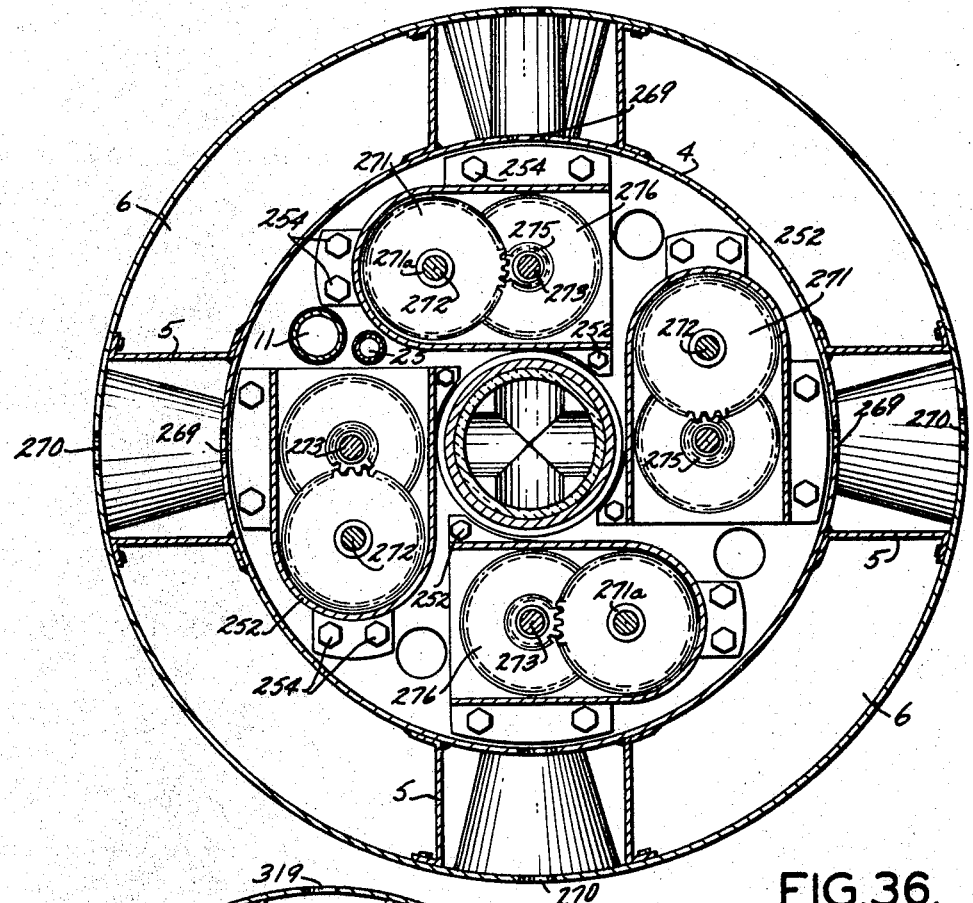

As the lugs 263b and 263c rotate in a clockwise direction some means must be provided for the air in the spaces H and L to escape. FIG. 49 which is a fragmentary transverse section on the line 49—49 as seen in FIG. 4I which is in the mid point of the rotor 258. At this point a different set of passageways are formed. The holes or passageways 267, which are formed in a radial direction through the rotor 258, lead into an axial hole or passageway 268, which as may be seen in FIG. 4I, extends throughout the rotor 258. Radial holes 268a permit air to escape to the aft end of the shaft 258a and the radial holes 264b permit air to escape at the forward end of the shaft 258b. Now when the rotor 258 rotates clockwise as seen in FIG. 49 the holes 267 partially coincide with the passageways. Thus the air in the spaces H and L in front of the rotating lugs 263b and 263c can escape through the passageways 267 and 268 and out the radial holes 268a and 264b to the general area within the inner tube 4 at the place in the missile which is sectioned in FIG. 4I. From thence the air may escape to the outside air when the interior pressure rises slightly within the inner tube, through the holes 269 and in the inner cylindrical tube 4 and through the holes 270 in the outer shell 2, as shown in FIGS. 4I and 36. Shown in FIG. 36 are holes 269 and 270 to the outside atmosphere which are formed between the structural parts 5 which are suitably secured to both the inner tube 4 and the outer tube or skin 2.

Thus the escaping air from the servo system to the outside is not affected or subjected to back pressure by the inrushing air through the passageways 6 to the compressor. It will thus be seen that when the rotor 258 is rotated clockwise a system of passageways for high pressure air inlets and air exhaust outlets are opened which causes and forces the lugs 263b and 263c and the annular part 263 to rotate exactly in unison with the rotation of the rotor 258.

When the electric servo motor 35 no longer receives an error signal it returns to its neutral position. When the rotor 258 in its response to a signal has rotated 30 degrees in a clockwise direction, the lugs 263b and 263c and the part 263 have rotated with the rotor. FIG. 50 is a partial transverse section on line 50—50. As soon as the rotor 258 has rotated a short distance in a counterclockwise direction the holes 258g partially coincide with the passageways 263f and compressed air from the annular ring 258d enters through the holes 258g, and the passageways 263f and into the spaces L and H. This forces the lugs 263b and 263c to rotate counter clockwise in unison with the rotation of the rotor 258. In FIG. 49, simultaneously with the opening of the passageways 263f as seen in FIG. 50 by the counter clockwise rotation of the rotor 258, the passageways 267, when the rotor 258 moves in rotation, partially coincide with the passageways 263g and the air may exhaust out of the spaces H1 and L1. These spaces H and L at this instant, due to the previous clockwise rotation of the lugs are quite large. Thus when the rotor 258 rotates counter clockwise, back to the neutral or zero position, the lugs 263b and 263c and the annular part 263 are forced by pneumatic servo action to follow it.

The step up gear train action which mechanically amplifies the angle of rotation of the lugs 263b and 263c and the annular part 263 is as follows. FIG. 4I shows the spur gear 266 with a short shaft 266a which is formed integrally with it and this shaft is splined to the annular part 264. Thus when the part 264 is forced to rotate the spur gear 266 must rotate with it. FIG. 36 shows a transverse section through the missile just forward of the spur gear 266. The large spur gear 266 meshes with a small spur gear not seen in FIG. 4I, but which is located in the FIGURE 4I directly behind the spur gear 266. This small spur gear (not seen) is joined on a common hollow shaft 271a with a large spur gear 271 which may be seen in both FIG. 36 and FIG. 4I. The small spur gear (not seen) and the large spur gear and also another pair of small and large spur gears are supported on the common shaft 272 and rotate thereon. This shaft is supported at its aft end by the aft end of housing 252 and at its forward end by the partition 252a of the housing 252. The housing 252 is secured to the bulkhead 253a by the machine screws 254. The shaft 273 is also a common shaft to a series of spur gears as can be seen in FIG. 4I. The aft end of the shaft 273 is supported by the hollow shaft 266a which is in turn supported by the bearing 274. The forward end of the shaft 273 is supported by the partition 252a. Continuing the analysis of the action the large spur gear 271 meshes with and rotates the small spur gear 275 which is integrally formed on the same hollow shaft with the large spur gear 276. The spur gear 276 in turn meshes with a small spur gear not seen but which in FIG. 36 is directly behind the spur gear 271. This spur gear is thence connected on a common shaft with the spur gear 277 which is in turn meshed with the smaller spur gear 278. The spur gear 278 is splined to the shaft 279 and secured thereon by the nut 280. The shaft 279 has on its forward end, as an integral part of it, the internally threaded socket 37, which has internal threads 38 cast thereon. Radial holes 279a are bored in the socket to prevent the entrapment and compression of air therein. The annular ball bearings 281 and 282 support the shaft 279. The bearings are separated by the spacer 283 and are held tight by thei nternal shoulder 284a on the socket nut 284. This nut 284 is threadedly secured in the internally threaded socket 253a, which is integrally formed with the bulkhead 253. The shaft 279 and the socket 37, which is formed integrally with it, are rotationally supported by the angular ball bearings 281 and 282 and are also supported against end thrust.

Figure 37:
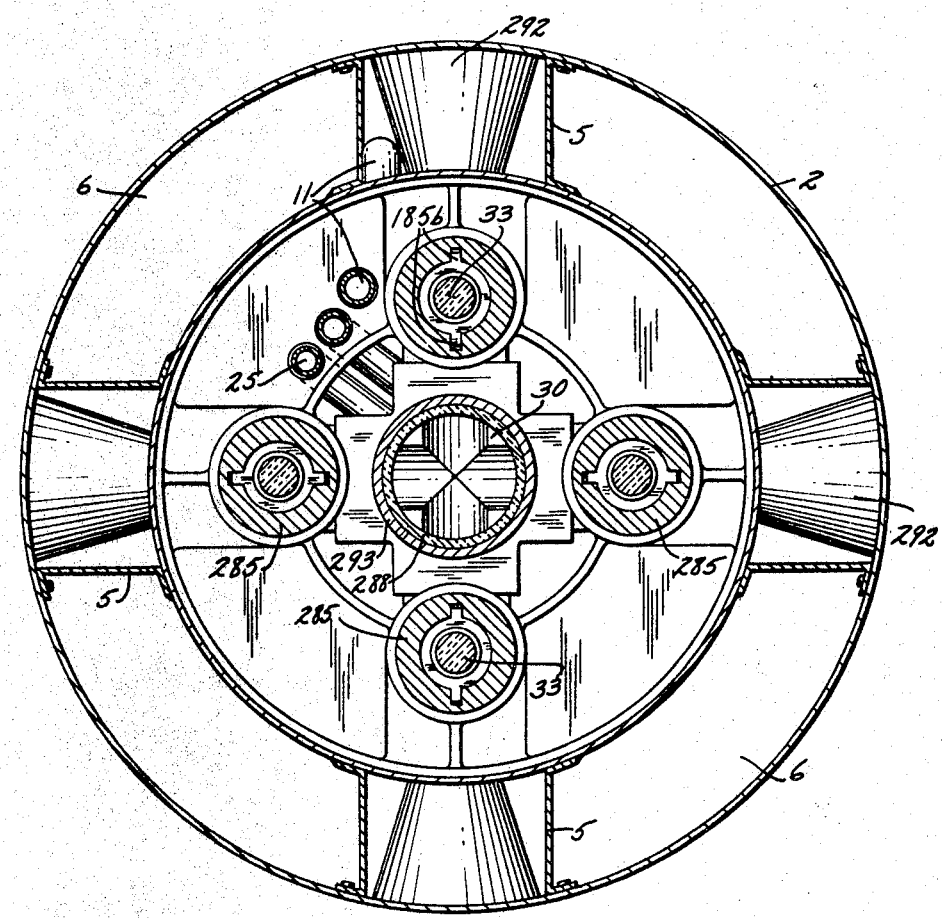
Figure 38:
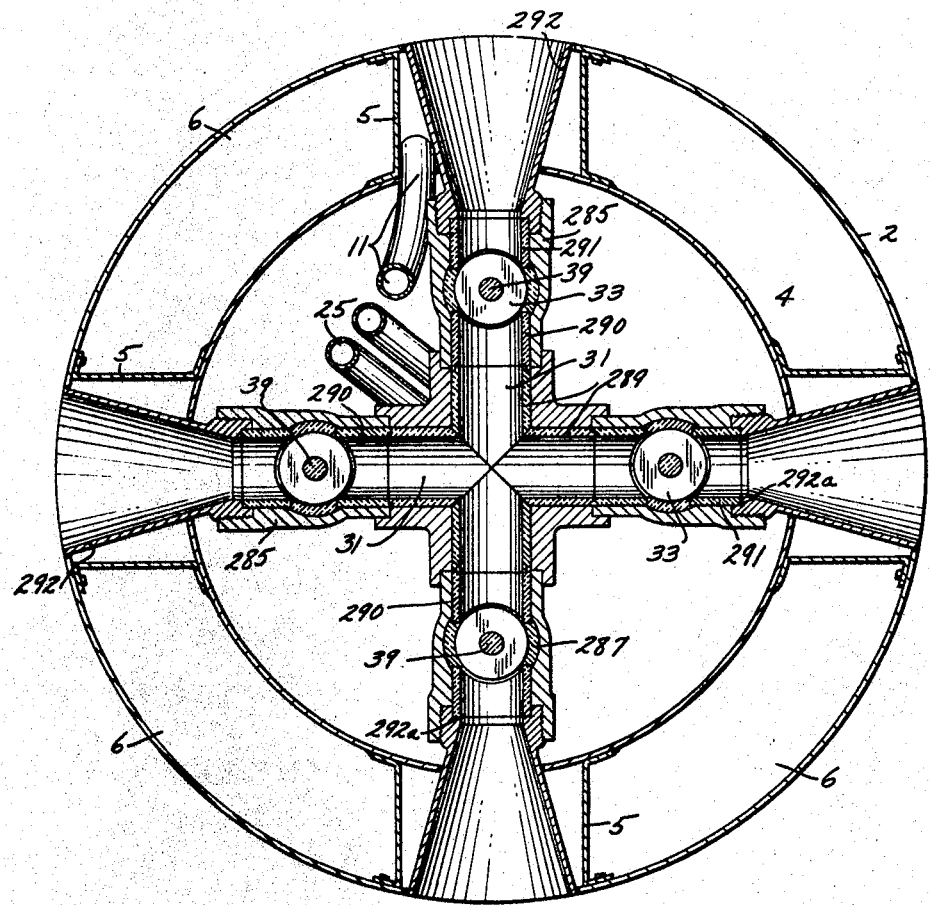

Now observe FIGS. 37 and 38. FIG. 37 is a transverse section looking forward taken along line 37—37 in FIG. 41. FIG. 38 is a transverse section through the missile looking forward taken on the line 38—38 in FIG. 41. FIG. 38 is a transverse section through the radial jets and radial jet valves.

The valve construction is as follows. The valve casting or fitting 285 is supported by inserting the aft cylindrical portion of the valve casting through an annular opening of close tolerance formed in the circular bulkhead 286. This arrangement makes for ease of assembly. A lining 287 of a suitable refractory material is provided the aft end of which butts up against the internal shoulder 285a. The keyways 285b are machined in the valve fitting 285 into which fit two projections or ears 33a, which are formed integrally with the valve plunger 33. This prevents the plunger from rotating while the socket 37 is being rapidly rotated.

Figure 41:
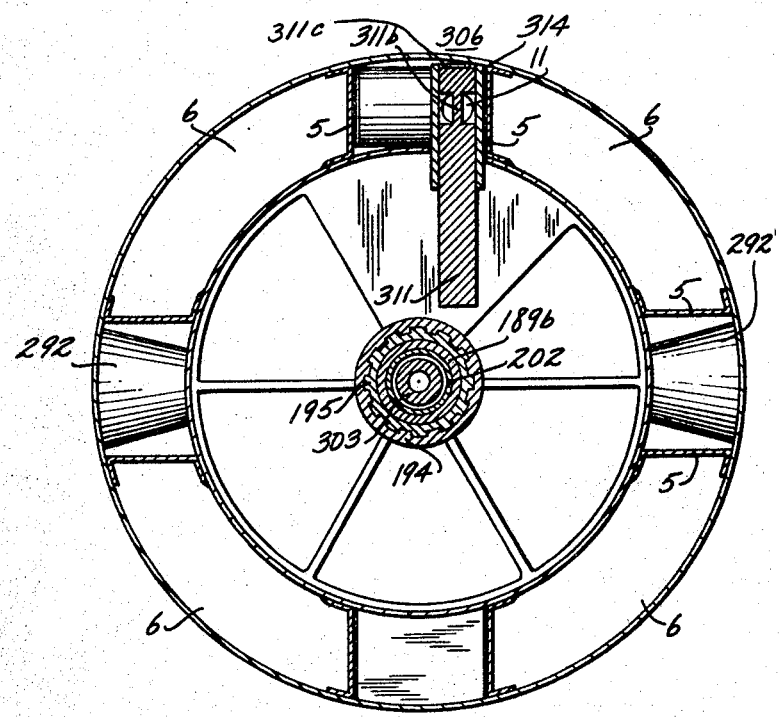

In the position shown in FIG. 41 the valve 32 is fully open, for the narrow neck 39 is athwart the radial pipe line 31 and hot jet gases may flow through during the flight of the missile. The valve may be open varying amounts from a 100 percent open position as shown to zero opening, depending on the strength of the error signal.

The two hot gas pipe lines 28 and 29 as shown in FIG. 41 join together in a Y connection as shown and enter a common pipe line 30. The pipe line 30 is lined, as is the two hot gas pipe lines 28 and 29, with a suitable refractory material or lining 288. The common pipeline 30 at its forward end branches off into four elbows which are lined with a refractive elbow lining 289. The short refractory lining parts 290 and 291 complete the lining of the passage for the hot gases through the radial jet valves. The funnel shaped radial exhaust tail 292 is threadedly secured to the outer socket 285c of the valve casting 285 as shown in FIGS. 41 and 38. The shoulder 292a of the exhaust tail holds the refractory lining part 291 firmly in place.

The valves 32 are normally closed. That is the aft or threaded end of the plulnger is screwed to the leftward into the socket 37 and the solid forward cylindrical end of the plunger 33 is fully athwart the valve opening 32, completely closing it. When an error signal is received by the upper electric servo motor 35 it rotates in a clockwise direction, the rotary pneumatic servo motor operates in the manner previously described and the rotation of the annular part 263 (which is forced to follow the rotor 258 in rotation) is stepped up many turns by the spur gear system. This causes the shaft 279 and socket 37 to rotate at high speed. The valve plunger 33 cannot rotate because of the ears 33a and the keyways 285b and the valve plunger is screwed forward until it reached the position shown in FIG. 41. The hot gases which are always present in the common pipe line 30 rush out the upper radial jet as soon as the valve is opened with terrific velocity, a powerful lateral thrust is produced and the nose of the missile is pushed back on a direction which points directly to the target. As soon as this occurs the signal to the upper electric servo motor 35 ceases, the motor then turns back to neutral position and the plunger 33 is screwed to the rearward, until the passage 32 is completely closed again.

The common pipe 293 is passed through the annular concentiric opening in the bulkhead 253, and is secured by the shoulder 293a on the forward side and the threaded ring 294 on the rearward side.

The fuel filling valve or orifice is shown in FIG. 41 and FIG. 52. The valve stopper 295 is pressed upward against the seat 296 by the spring 297 and also by the back pressure of the oil or fuel in the tank 24, which fuel is under resilient pneumatic pressure at all times. Shown in FIG. 4J, as previously described, the compressed air branch line 23 is taken from the main compressed air line 11, and the air flowing therethrough keeps the space 21 filled at all times, regardless of how large or how small the volume of the space 21 is. This causes the oil or other liquid fuel in the tank 24 to be under heavy pneumatic pressure at all times and to be forced into the pipe line 26 and up against the lower end of the stopper 295. When the liquid fuel in the tank 24 has been wholly or partially depleted or when an initial filling is desired, the end of the pipe through which the fuel is forced is threadedly secured by the internal threads 27 so that the liquid may be forced into the valve under the high pressure. The spring 297 is compressed at this time, the stopper 295 is forced downward and the liquid fuel may then flow down through the slots 295a in the sides of the stopper and into the line 26. From the pipe line 26 the liquid fuel flows into the tank 24. As the incompressible liquid fuel is forced into the tank 24 the slidable diaphragm 19 is forced further and further forward toward the front of the missile and the resilient air is forced out ahead of the moving diaphragm. When the tank 24 is full the diaphragm is in the position shown in FIG. 4J.

Thereafter when the fuel is rapidly used by the missile in flight, by flowing down the fuel line 25 to the metering gear pump and into the combustion chamber, the diaphragm continuously moves to the left or rearward, being forced by the continuous air pressure in the expanding space 21 behind it.

The rearward end of the fuel tank is provided in the form of the bulkhead 298 which is weldedly secured to the cylindrical side of the tank 18 as seen in FIG. 41. The bulkhead also has a flange 298a which is secured to the inner metal tube 4 by the pins 143 as shown. The air line 11 continues as seen in FIG. 41 to the small turbine near the front of the missile which provides the power for rotating the small rotary power source or generator as shown.

Further observing FIG. 4J the location of the war head is shown. The TNT or other explosive 15 is contained within the container 299, which is inserted within the tube 4 during the assembly of the missile. An antennae band 16 is insulated from the annular band 300 by the insulating material 301. An influence type or proximity type fuse 17 of a conventional design is provided which detonates the explosive when the missile is at the proper distance from the target.

Passing toward the front of the missile FIG. 4K, FIG. 39 and FIG. 40, FIGS. 41 and 42 and FIGS. 43 and 44 show the different mechanisms comprising and related to the rotary power source, the small compressed air driven turbine for driving the rotary power source, the unique type of mechanically amplifying governor for accurately controlling the speed of the rotary power source within very small limits, and the cut off valve which prevents any leakage of the compressed air until the missile is fired.

Figure 39:
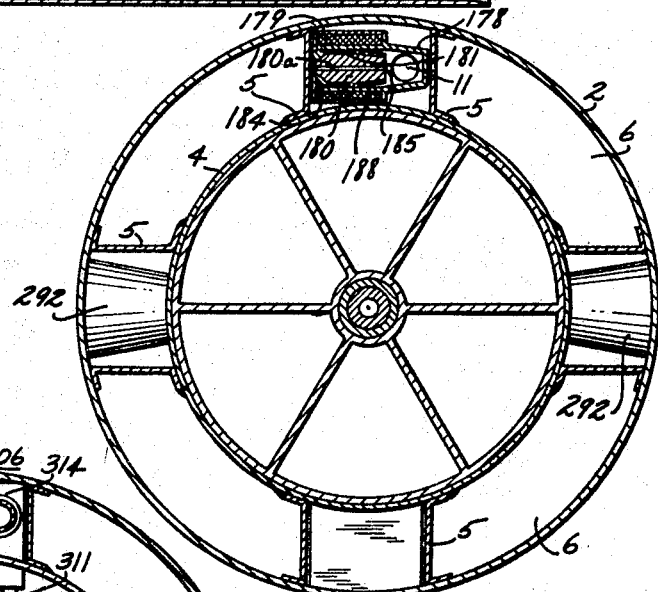

FIG. 4K and FIG. 39 show the solenoid operated air valve 14 which cuts off the air line 11 before it enters the small turbine which rotates the small electric power generator. As previously mentioned it is necessary to charge the compressed air chamber 68 with compressed air before the missile is placed in storage. The compressed air provides the source of energy which immediately initiates the thermodynamic cycle when the missile is ready to launch. To preserve this air in compression without leakage it is necessary to insure that there are no leaks. The air line behind or aft of the solenoid 302, shown in section in FIG. 39, is filled with compressed air at all times. The solenoid valve prevents leakage through the forward end of the air line 11 until the missile is ready to launch, at which time it is opened by electric power from an outside source. When opened, the valve plunger is locked in the open position by the small plunger 185, the valve assembly being similar in construction to the other solenoid valves previously described. This small plunger is spring loaded and functions in the same manner as the corresponding plunger in the solenoid valves heretofore explained. The valve 14 is constructed in a similar manner to the valve heretofore described and a further description is believed unnecessary.

Figure 40:
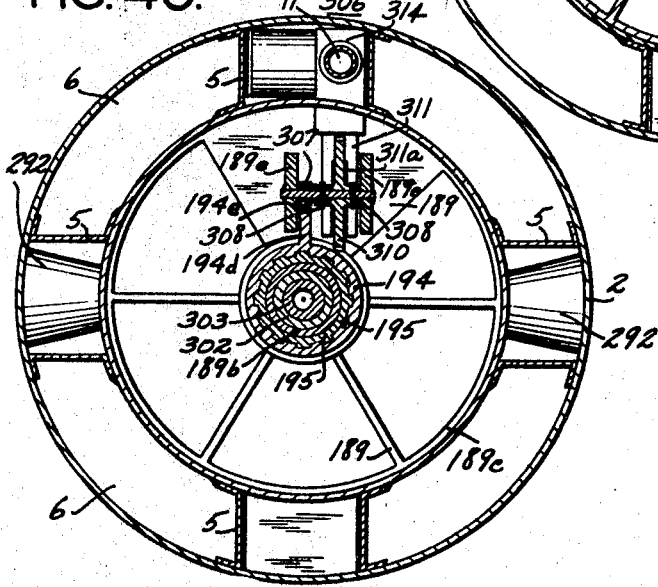

FIG. 4K, FIG. 41 and FIG. 40 show the sensitive mechanical air governor. This governor is constructed for the most part in exactly similar fashion to the two governors previously described, which control the speed of the compressors. Corresponding part numbers are given to corresponding parts in the governor. The shaft 303 is rotated by the flange 205 of the planetary reduction gear 304. This rotates the spider 199 and as described before, the centrifugal weights 198 rotate on the shafts 199a of the spider and also with the spider and shaft 303. When the speed of the rotation becomes great enough for the centrifugal force to overcome the initial compression of the springs 203, the weights 198 begin to roll or "walk up" the surface of the cone shaped end 194c of the part 194. This allows the part 194 to be pushed forward by the spring 197 in the manner heretofore described for the other previously described governors.

The cone shaped flange 194c in the case of the governor 305 is much smaller than the corresponding cone shaped ends of the previously described governors. This is because much less longitudinal movement of the sleeve 194 is required to close the valve 306, which is controlled by this governor, than in the case of the governors previously described. An extension or boss 194d (see FIGS. 4K and 40) which is formed integrally with the sleeve 194 has a short gear rack 194e machined on its upper end. These gears mesh with a small spur gear 307 which is secured by pin 308 on the shaft 309. The shaft 309 is supported at the two ends by the bosses 189e which are formed integrally with the circular casting or bulkhead 189. A substantially larger spur gear 310 is keyed on the same shaft 309. The larger spur gear meshes with the gears in a rack 311a which is formed integrally with the plunger 311 of the valve 306. A guide roller 312 is rotatably supported by the pin 313 and the two bosses 189f. This guide roller 312 is flanged and supports and guides the lower end of the plunger 311. We will examine the construction of the valve 306. It is formed of a valve casting or housing 314 which is secured to the bulkhead 189 by the machine screws 315. It will be seen in FIG. 4K that the air line 11 passes through this valve. In FIG. 41 it is seen that the plunger 311 has a narrow neck 311b which neck in the position shown in FIG. 41 is athwart the pipe line 11, allowing compressed air to pass through.

Describing the action of this governor and valve, whenever the sleeve 194 moves forward, due to centrifugal action, for even a minute distance, the rack 194e rotates the spur gear 307, which rotates the much larger spur gear 310, which is meshed with the rack 311a. The result is that the plunger is moved downward and the solid upper end 311c partially or completely closes the passageway 11 through the valve (FIG. 41). A large ratio, for instance of the order of ten to one, may be provided in which in the layout or drawings shown, a forward movement of one sixteenth of an inch by the sleeve 194 will then completely close the passageway 11 and a movement of one thirty second of an inch will half way close the passage way 11. Since the angle of slope 194 in the drawing shown is about 45 degrees, a radially outward movement of one thirty second inch by the centrifugal weights 198 will halfway close the passageway 11. This mechanism provides a positive yet highly sensitive governor arrangement which will hold the speed of rotation of the turbine or the small generator within very close limits. This arrangement causes the speed of rotation of the turbine to "hunt" or oscillate within very narrow maximum and minimum limits.

Figure 42:
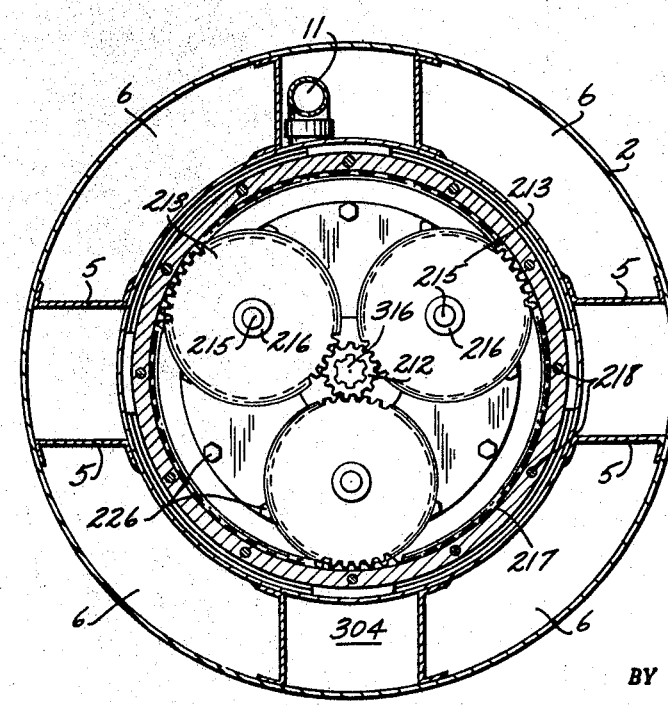

FIG. 4K and FIG. 42 show the planetary reduction gear 304 which reduces the speed of the turbine 10 with respect to the speed of the governor 305. The construction of the reduction gear is similar in principle and functioning to those previously described except that three intermediate gears 213 are used instead of four. This permits the design of a larger reduction ratio in the same diameter of space. Corresponding numbers are assigned to corresponding parts in the speed reduction gear in keeping with the gears just described.

Figure 43:
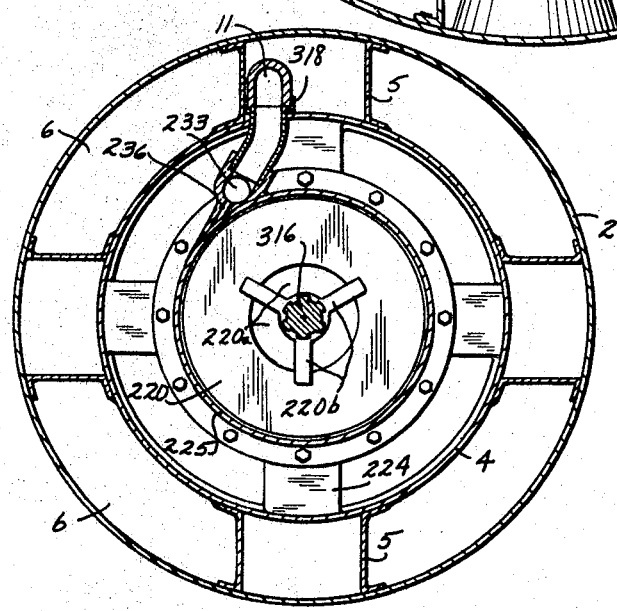
Figure 44:
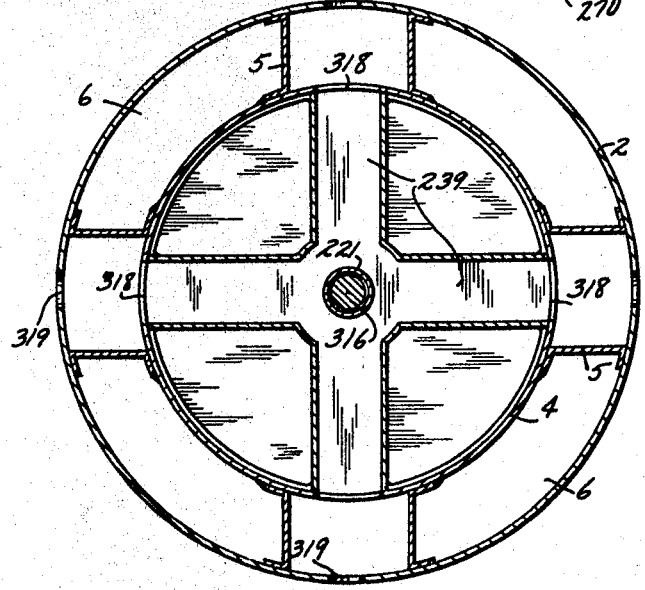

FIG. 4K and FIG. 43 and FIG. 44 show the construction of the air driven turbine which rotates the electric power source in the missile. The construction and principles of operation of the air turbine is similar to that of the hot gas turbine which drives the compressors and which have previously been described.

The air line 11 is joined to the short pipe line 307 by the threaded coupling 318. Air enters the turbine through the pipe connection 317 and passes into the transverse annular opening 233 which is formed in the annular housing 225. From thence the air enters the interior chamber of the turbine through the various openings 226 and impinges against the turbine discs 220 in a direction which is nearly tangent to their periphery. The compressed air functions in a manner similar to that of the compressed hot gases with respect to the two turbines previously described. The expanded air exhausts through the three openings 220a. In the case of the air driven turbine exhaust orifices 239 to the outside air are provided in the forward end or side casting only, as seen in FIG. 4K.

FIG. 44 shows a transverse section through the missile looking forward. This action is taken on the line 44—44 in FIG. 4K and shows a section through the four exhaust passageways 239 which are formed in turbine forward end casting 223. The expanded air passes through the four passageways 239, through the four holes 318 in the inner tube 4, and thence through the outer four holes 319 formed in the outer cylindrical skin 2 of the missile and thence to the outer atmosphere. The extension of the shaft of the rotary power source 9 is connected to the turbine by the splined coupling 320.

The rotary power source is supported at the forward and aft ends by the bulkheads 321 which are secured to the inner tube 4 by the pins 143. Electronic tubes and circuits represented by 8 are supported as seen in FIG. 4K by the bulkheads 321 and the bulkhead 322. The electronic circuits in the infra red and electronic detection system of this missile are not a part of this invention but such circuits and equipment of successful performance are now developed and in existence in the present state of the art, although improvements in the state of this art are continually being made.

FIG. 4L is the last longitudinal section in the progress toward the nose of the missile. The bulkhead 323 is secured by the pins 143 to the inner tube 4. This bulkhead has the annular flanged socket 323a, formed integrally therewith, which supports the rear of the infra red detection instrument 7. The aft side of the bulkhead 323 supports electronic tubes and instruments. The forward end of the infra red instrument 7 is supported by the bulkhead 324, which is secured to the inner tube 4 by the pins 143.

The foremost end of the tube 4 is weldedly secured to an annular ring 325 as shown. At the forward end, this annular ring is threadedly secured to the plastic radome 1. The radome 1 is properly shaped for supersonic travel through the atmosphere.

Figure 58:
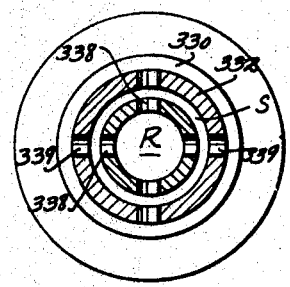
Figure 60:
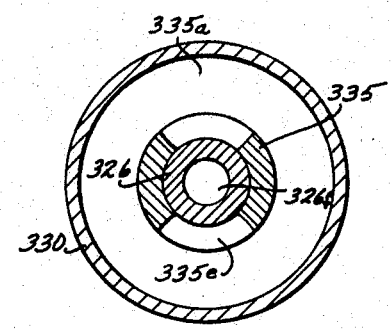
Figure 61:
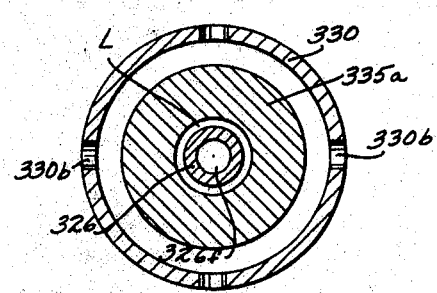
Figure 62:
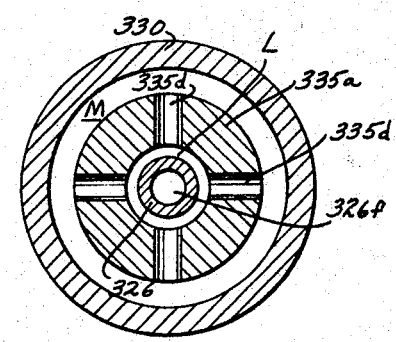
Figure 64:
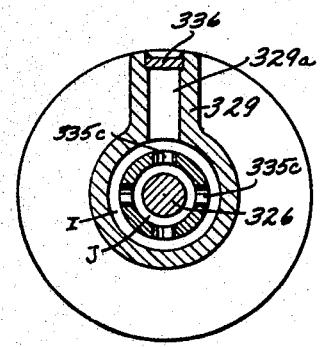

An alternate pneumatic servo system for opening and closing the valves which control the radial jets is shown in FIG. 57, FIG. 58, FIG. 59, FIG. 60, FIG. 61, FIG. 62, FIG. 63 and FIG. 64. FIG. 57 is a fragmentary longitudinal section taken through the missile at the location of the radial jet mechanism showing a longitudinal view completely through a typical pneumatic servo radial jet mechanism of the alternate type. FIG. 58 is a fragmentary transverse section through the alternate pneumatic servo mechanism taken on the line 58—58 in FIG. 57. FIG. 59 is a fragmentary transverse section through the alternate pneumatic servo mechanism taken on the line 59—59 of FIG. 57. FIG. 60 is a fragmentary transverse section through the alternate pneumatic servo mechanism taken on line 60—60 in FIG. 57. FIG. 61 is a fragmentary transverse section of the alternate pneumatic servo mechanism taken on line 61—61 in FIG. 57. FIG. 62 is a fragmentary transverse section through the alternate pneumatic servo system taken on the line 50—50 in FIG. 57. FIG. 63 is a fragmentary transverse section through the alternate pneumatic servo system taken on line 63—63 in FIG. 57. FIG. 64 is a fragmentary transverse section through the alternate pneumatic servo system taken on line 64—64 in FIG. 57.

This alternate pneumatic servo system for actuating the radial jet valves is disclosed because the speed of response of this mechanism is likely to be faster than the preferred form of radial jet valve mechanism which has been described. It will be recalled that the preferred form previously described, and shown in longitudinal section in FIG. 41 has a rotary pneumatic servo. The signal and pneumatic valving for the action of this servo is provided by the rotation of the pneumatic valving and signal rotor 258. The rotary servo action serves to rotate the spur gear 266 which thereupon rotates a step up series of spur gears with the result that the sleeve 37 is rotated at very high speed. This rotation, by means of the threads 38, screws the valve plunger 33 forward (when a signal is received) and thus opens the radial jet valve as shown in FIG. 41.

This action of moving the valve plunger longitudinally by means of screw threads 38 and rotation of sleeve 37 at high speed, through step up spur gears, is very positive in action. However, the angular acceleration required to achieve this in a very small fraction of a second becomes very great. Consequently there is a limit to the speed of complete response to a signal in so far as opening the jet valve is concerned. The complete pnuematic system shown in FIG. 57 has a faster response time in opening the radial jet valve in response to a signal. This mechanism will now be described.

This arrangement consists essentially of two pneumatic servo systems. One system is a rotary pneumatic servo system which is identical to the rotary system shown in FIGURE 4I and previously described. The rotating part 264 of the alternate servo mechanism, instead of being splined on its forward end to the shaft of a spur gear, extends to provide the short cylindrical shaft 264a on which splines 264b are formed. The splines fit cooperatively into splines formed on the interior of the sleeve 326a, which is formed integrally with the signal rod 326. The sleeve 326a has square threads formed on its cylindrical exterior surface which have such a pitch that the rotation of the full amount of the rotary servo mechanism (which is of the order of 90 degrees or slightly more) will cause the sleeve 326a and the rod 326 to move rearward a distance equal to the diameter of, or width of, the throat 32 of the radial jet valve. The holes 362c are formed to allow air to enter and escape from the space H (see FIG. 57) between the end of the shaft 264a and the interior of the sleeve 326a. This prevents air from being compressed in this space during the fast reciprocation of the sleeve 326a and rod 326 during the flight of the missile.

The signal rod 326 serves by reciprocation to provide a signal and a valving action to permit the highly compressed air in pipe line 41 to cause the radial jet valve plunger 33 to reciprocate or move longitudinally exactly as the pilot or signal rod 326 does. A type of pneumatic servo system which causes a linear or longitudinal movement is substituted in this alternate form, in place of the step up spur gears and screw threads which have been previously described. This action is as follows.

The square threads 326b on the sleeve 326a mate with internal square threads of the same pitch which have been formed in the cylindrical interior surface of the boss 327a, which boss is formed integrally with the bulkhead 327. This bulkhead also serves to hold the aft end of the pipe line 293 by the annular ring 293a, which is formed integrally with the pipe and the sleeve 294, which is threadedly secured to the pipe 293 on the rear side of the bulkhead. The bulkhead, being stationary, forces the pilot rod 326 and sleeve 326a to move longitudinally when rotated by the shaft 264a. When this occurs the splines formed on the interior of the sleeve 326a slide upon the splines 264b on the shaft 264a.

The highly compressed air in pipe line 41 passes through the T fitting 262a and flows through the pipe 328. The forward end of the pipe 328 is threadedly secured in the end casting 329 which casting is in turn threadedly secured in the annular housing 330. The housing 330 is secured by passing through an annular opening in the bulkhead 331 and by the raised ring 330a integrally formed with this annular casting 330 and the forward end of the end casting 329, as seen in FIG. 57.

The forward end of the annular housing 330 is threadedly secured to the jet valve casting 332. This casting is secured by inserting through an annular opening formed in the bulkhead 333 as seen in FIG. 57. The jet valve casting is inserted in the extending boss 293b on its radially inner side, radial exhaust tail piece 292 is threadedly secured in the outer side of the jet valve casting 332 as shown. The flange 334 with a concentric hole in the center is threadedly secured to the forward end of the jet valve casting 332 to form a stop to the forward movement of the valve plunger 333. This is necessary since the plunger 33 is floating or free moving in the alternate mechanism now being described. The plunger 33 is threadedly secured at its rear or aft end to the piston and rod casting 335. The casting 335 and the valve plunger 33 accordingly reciprocate or move horizontally as a single unit. The casting 335 is enlarged to form the piston 335a as shown.

When the pilot rod is rotated in such a direction that it moves forward as a result of the action of the screw threads on the exterior of the sleeve which is formed on the aft end of the pilot rod. The following action will then occur. Compressed air from pipe 328 flows down through air passageway 329a which is formed in the end casting 329. The outer end of this passageway is stopped by the plug 336 as shown which is weldedly secured in place. The air then flows into the annular space I, which is formed by the annular ring 335 which is machined around the aft end of the shaft 335. The compressed air thence passes through the four holes 335c (see FIGS. 57 and 64). From thence the air fills the annular space J which is formed by machining a wide groove 326a around the pilot rod as shown. From here the compressed air flows through the radial holes 326e (FIGS. 57 and 59) as shown and into the hole 326b which is formed concentrically in the pilot rod 326. The forward end of this hole is stopped by the plug 337 which is threadedly secured in the end of the pilot rod. The highly compressed air is now filling the hole 326f and from thence passes outwardly through the radial holes 326e in the forward end of the pilot rod 326 and into the annular space K which is formed by machining a groove in the forward end of the pilot rod as shown. A groove is also machined to provide the annular space L as seen in FIGS. 61 and 62.

FIGS. 57, 61 and 62 show a passageway to the outer air from the annular space L provided by the radial holes 335d which lead from the annular space L to the annular space M. The annular space M is provided by machining a wide groove in the perimeter or periphery of the piston 335a as shown in FIG. 57. The passage to the outer air is completed by the four holes 330b.

FIG. 60 and FIG. 63 show two transverse cuts 335e, 180 degrees rotationaly removed each from each on the outer cylindrical surface of the forward and aft shafts of the casting 335. These transverse cuts have straight, forward and aft sides, which are perpendicular to the axis of the shaft. Air cannot pass through these cuts in the condition or relative position of the parts shown in FIG. 57, due to the two rings 326g which are provided by the unmachined portions of the pilot rod 326. These rings 326g are the exact width of the cuts 335e and when in the position shown stop all passage of air through the cuts 335e. But as the pilot rod is pushed forward, even slightly, highly compressed air from the annular space J will pass through the aft milled cuts or passageways 335e and fill the annular space N. This space is bound by the piston 335a, the annular housing 330, the end casting 329 and the shaft 335. This air then pushes the piston 335a forward as long as the pilot rod is moving and when the piston 335a and shaft 335 comes to rest it is in exactly the same relative position with respect to the pilot rod 326 as that shown in FIG. 57, in which the two rings 326g are completely centered with the cuts 326e and stopping the passage of air therethrough.

Meanwhile, or simultaneously, when the pilot rod 326 moves forward the forward rings 326g are momentarily not centered with the cuts 335e and trapped air from the annular space P can exhaust through the forward cuts 335e, into the annular space L, thence through the radial holes 335d to the annular space M and thence through the holes 330b and to the outside air. Thus the piston 335a and shaft 335 and radial jet valve plunger 33 is always pneumatically forced to follow the pilot rod forward and just as far forward as the pilot rod moves.

In FIG. 58, when the pilot rod 326 moves forward, air, unless an outlet were provided, would tend to become trapped and compressed in the space R. An outlet is provided as follows. Trapped air from space R may pass through the radial holes 338 and into the annular space S which is provided by machining an annular groove on the forward end of the shaft 335. From the space S the trapped air escapes through the holes 339 to the low pressure air outside the servo. When the pilot rod is moving rearward and the space R is enlarging, air may pass from the low pressure outer air through the above mentioned passageways into the space R.

For the reverse pneumatic servo action, when the pilot rod moves aft or rearward, the highly compressed air from annular space K (FIG. 57) passes through the two forward machined cuts 335e and into the annular space P. The compressed air in space P will then push the piston 335a and shaft 335 to the rearward to follow the pilot rod. Meanwhile trapped air in annular space N may pass through the aft machined cuts 335e, into the annular space L and thence through radial holes 335d, to the annular space M and thence through the holes 330b to the low pressure air outside the servo mechanism. This action takes place until the shaft 335 and the machined cuts 335e formed thereon, are again in the relative position shown, whence the rings 326g stop all air passage through the passageways 335e. The flange 329b, formed integrally with the end casting 329b, provides a limit stop for the rearward movement of the shaft 335 and the radial jet valve plunger 33.

By the above powerful pneumatic servo action the shaft 335 and the jet valve plunger 33 instantly follow the pilot rod 326 and then open or close, either completely or to any desired degree of completeness, the radial jet valve in response to the electronic signal given. This provides very fast response to the signal.

It is further seen that the various annular machined grooves which form the annular spaces I, J, K, L, M, N, P, R and S are all wider than the distance of travel required for the radial jet valve plunger to completely open or close the radial jet valve. As a result, it will be seen by a study of FIG. 57 that at any possible position to which the shaft 335 may move relative to the pilot rod 326 (such as the movement that may occur during the manufacture and assembly of the missile, when no compressed air is in the line 328) nevertheless when air is at any time supplied the shaft 335 and piston 335a will immediately be pneumatically forced to move to the relative position shown in FIG. 57 in which the rings 326g are exactly centered with the passageways 335e. While the missile is in storage the air is cut off by the solenoid operated air valve in the main air line and cannot enter the line 328. The instant the solenoid air valve is opened prior to the flight of the missile the compressed air rushes into pipe line 328 and almost instantly the shaft 335 comes to the relative position shown in FIG. 57.

Figure 65:
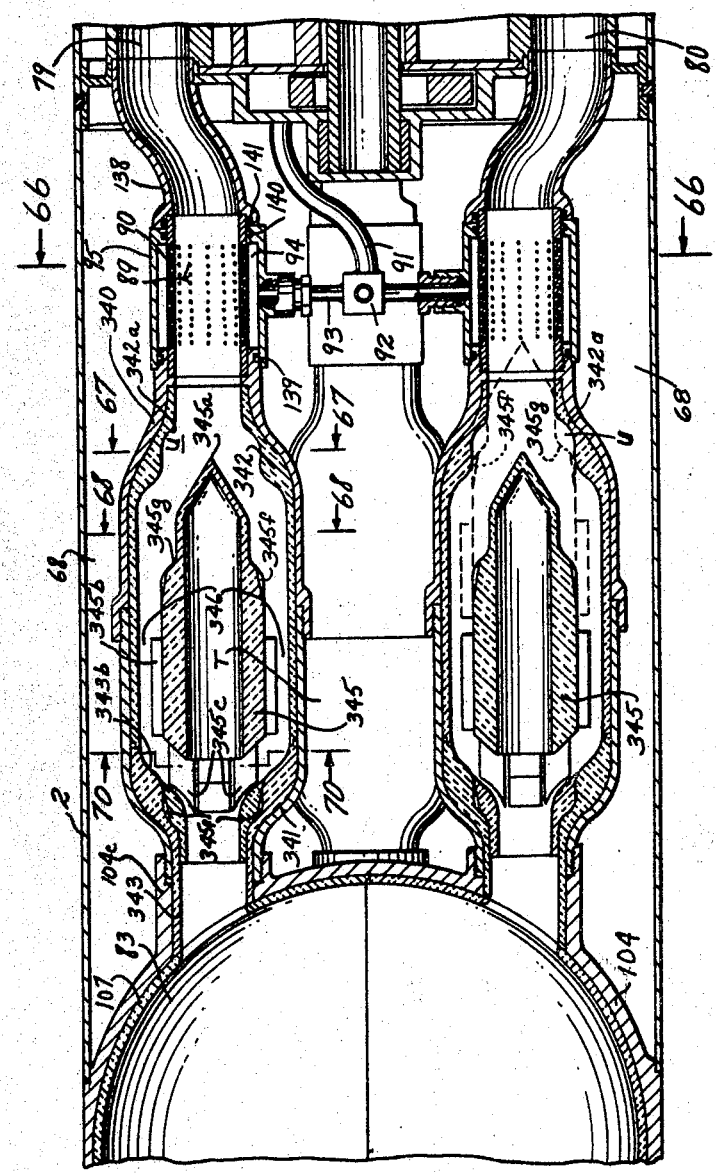
FIG. 65 is a partial longitudinal section through the alternate missile carbureter and air feed system.
Figures 66, 69:
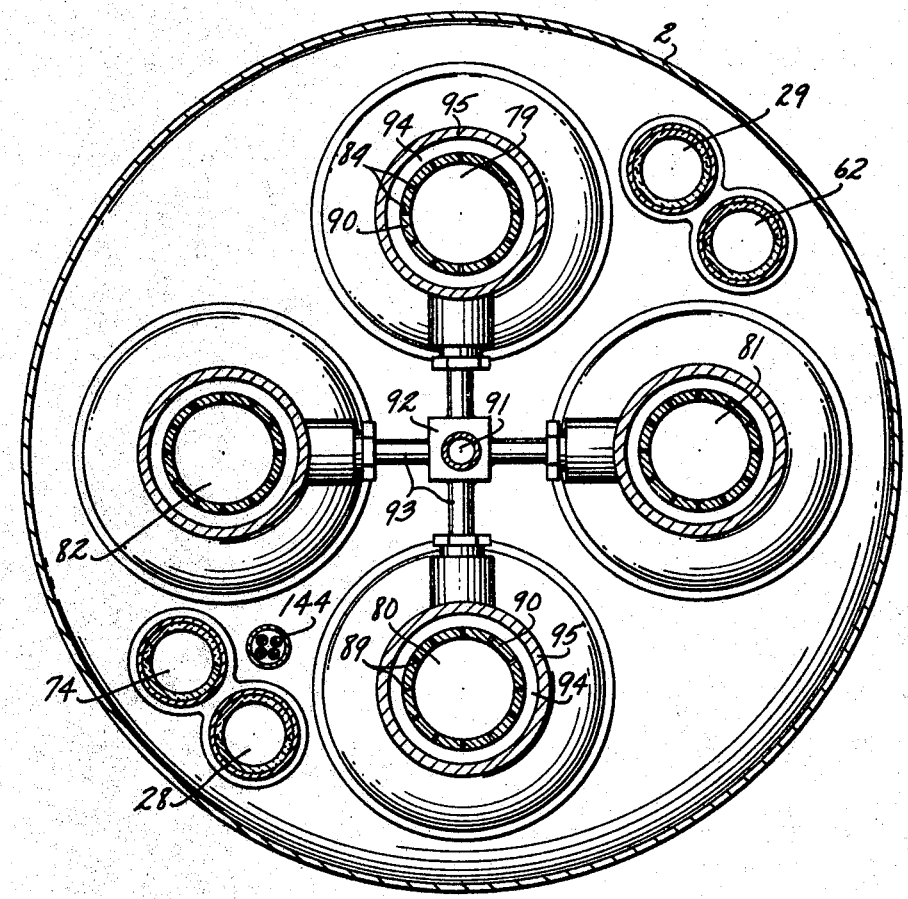
FIG. 66 is a transverse section through the missile showing the alternate carbureter and air feed system taken on line 66—66 in FIG. 65.
FIG. 69 is a fragmentary section showing alternate air feed and carbureter system taken on line 69—69 in FIG. 68.
Figure 67:
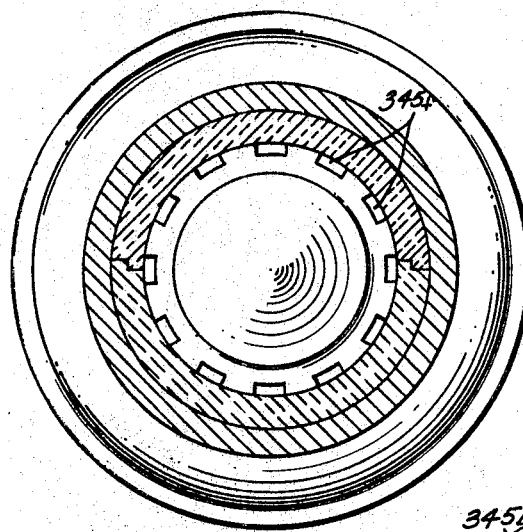
FIG. 67 is a fragmentary transverse section showing alternate air feed and carbureter system taken on line 67—67 in FIG. 65.
Figure 68:
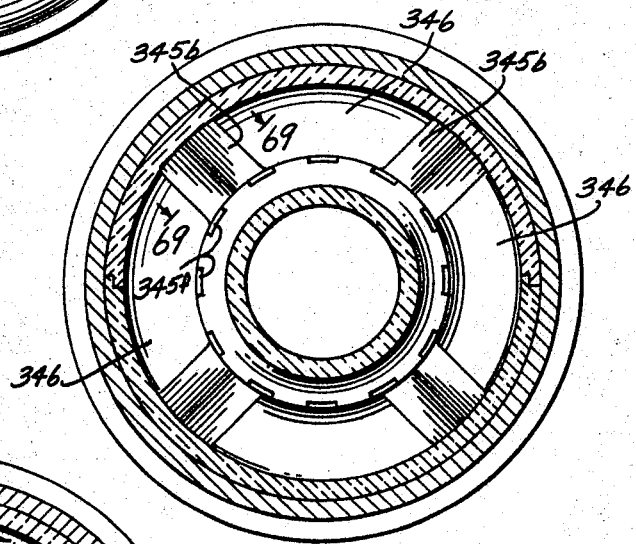
FIG. 68 is a fragmentary transverse section showing alternate air feed and carbureter system taken on line 68—68 in FIG. 65.
Figure 70:
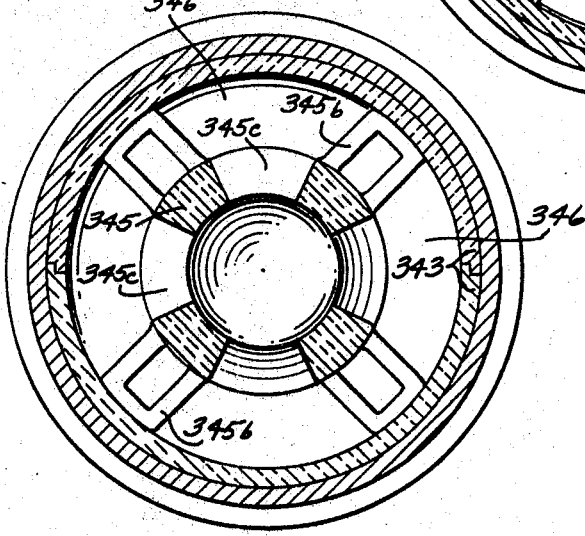
FIG. 70 is a fragmentary transverse section showing alternate air feed and carbureter system taken on line 70—70 in FIG. 65.

An alternate method of construction of the automatic air feed and carbureter system is shown in FIGS. 65, 66, 67, 68, 69 and 70. FIG. 65 is a fragmentary longitudinal section through the missile at the point where the carbureter and air feed mechanism is located, showing the alternate automatic air feed and carburetor construction. FIG. 66 is a transverse section through the missile taken on line 66—66 in FIG. 65. FIG. 67 is a fragmentary transverse section taken on line 67—67 in FIG. 65. FIG. 68 is a fragmentary transverse section taken on line 68—68 in FIG. 65. FIG. 69 is a fragmentary section taken on line 69—69 in FIG. 68. FIG. 70 is a fragmentary transverse section taken on line 70—70 in FIG. 65.

It is desirable that the automatic pressure balancing air and fuel feeding mechanism be very sensitive and that it open or close with a very quick response to any change in pressure. The system shown in FIG. 4B is positive in action. However, the alternate form has certain advantages of faster response. This is because, as will be fully explained, the weight to be moved is lighter in proportion to the force available than that in the construction shown in FIG. 4B.

In the alternate form the annular sleeves 90, with the fine holes 89, the O rings 140 and 141, the short connecting pipes 138 leading to the air metering motor, the distributor block 92, the short radial pipe lines 93 leading therefrom, and the main feed pipe line 91 leading to the distributor block, are identical to those same parts in the form shown in FIG. 4B. In the alternate form now being described the aft ends of the four sleeves 90 are threadedly secured into the forward ends of the four forward valve housings 340. The outer sleeve 95 is made oil tight by the O rings 139 and thus preventing the fuel oil or liquid from escaping from the annular space 94. The aft or rear ends of the four air valve housings 340 are threadedly secured to the aft valve housings 341. The housings 341 are threadedly secured at the rear ends into the bosses 104c of the combustion chamber casting 104. The forward valve refractory lining 342 and the aft valve refractory lining 343 protect the outer metal housings 340 and 341, respectively, from the heat.

A reciprocating valve plunger-stopper 345 is formed of a suitable refractory material. This plunger-stopper is encompassed within the housing and lining with a reasonable tolerance and is free to move to the right or left, as seen in FIG. 65 (or forward and aft), as the relative pressure changes between the compressed air in the compressed air chamber 68 and the hot gases in the combustion chamber 83. When the compressed air in the chamber 68 is momentarily the higher in pressure, the reciprocating valve plungers are forced to their extreme aft position which is that shown in FIG. 65. At this instant the compressed air metering motors are rotating and the gear type liquid fuel pump is being rotated. Air is rushing through the air feed lines 79, 80, 81 and 82 (FIG. 66) and liquid fuel is streaming radially through the fine holes 89 in the sleeve 90 and is being picked up by the air and is mixed therewith. This rushing saturated vapor of air and fuel is split by the sharp forward nose 345a of the valve plunger 345 and thence the gaseous mix separates and passes through the four passageways which are between the four bearing runners 345c. From thence the gaseous fuel mix is deflected downward by the curved surfaces 343b of the aft lining 343 as seen in FIG. 65. Thence the gaseous mix passes through the four ports 345c (FIGS. 65 and 70) and through the remainder of the passageways 79, 80, 81 and 82 to the combustion chamber 83.

As long as the pressure of the compressed air in compartment 68 is greater than the pressure in the combustion chamber the gaseous flow is toward the combustion chamber. The air metering pumps are rotating, the gear type fuel pump is pumping fuel and the plunger 345 remains in the position shown in FIG. 65. When a surge of combustion takes place due to this fresh influx of saturated vapor the pressure in the combustion chamber becomes greater and the reciprocating plungers are forced to their extreme forward position. In this position the forward portions of the passageways 79, 80, 81 and 82 are sealed by the four plungers 345. As will be seen from an examination of FIG. 65, when the plungers are in their extreme forward position no hot gases can flow forward in pipe lines 79, 80, 81, 82 due to the peculiar configuration and arrangement of the plungers 345.

FIG. 69 shows a horizontal section through one of the bearing runners 345b as taken on the line 56—56 in FIG. 68 as wedge shaped with the sharp end pointed forward. Also the forward end of the main body of the plunger as seen is sharp pointed. This permits easy supersonic flow of gases to the aft or rear toward the combustion chamber 83. When the hot gases from the combustion chamber 83 momentarily increase in pressure above that of the air in compartment 68 and try to flow around the stopper-plunger 345 it will be noted that a square end and hollow area 345e, formed within the plunger, is on the aft end of the stopper-plunger. Also the wide square end of the bearing runners 345b are pointed aftward, with the hollow spaces 345e formed therein. The result is that a sudden surge of hot gases does not have conditions of smooth supersonic flow presented. Instead, the blunt ends and hollow spaces cause terrific turbulence which greatly impedes the sudden flow of the hot gases forward. Meantime the plungers are being rapidly moved to the rightward, or forward, as a result of the excess of greater momentary pressure of the hot gases. When the plungers have been moved to their extreme rightward position the flow of hot gas is completely cut off. This reciprocation of the four plunger stoppers 345 may take place very rapidly and a very small pressure differential is all that is required to reciprocate the plungers since, due to their symmetrical construction, the pressure in a radial direction is completely equalized, and thus there is no radial pressure tending to cause friction.

Provision is made to minimize sharp impact as the plunger is forced rapidly to its furthermost position, either forward or aft. This is accomplished by a unique arrangement of trapping a quantity of air or hot gas and allowing this air or gas to escape through gradually decreasing orifices, thus providing a pneumatic buffer action which prevents impact. FIGS. 65, 67 and 68 show a multiplicity of grooves 345f formed about the periphery of the forward shoulder 345g of the stopper-plunger 345. The sectional views of FIG. 65 show that these grooves are tapered as to depth. When the plunger 345 is moving forward (or to the right as seen in FIG. 65) and has arrived at the position shown in the dotted line in FIG. 65, a quantity of air or gas is momentarily trapped in the annular space U between the shoulder 345g of the plunger and the interior shoulder 342a of the refractory lining 342. This gas can slowly escape through the grooves 345f. The plunger 345 at this instant is traveling at high speed. It begins to slow down, due to the resistance or pressure of the compressed gas in the annular space U. The plunger however, continues to move forward. As it does and as it slows down the cross sectional area of the grooves 345f becomes less and less due to the tapered slope of the bottom of the groove, and less and less of total orifice area is available for the escape of the trapped air. This causes a pneumatic deceleration of the rapidly moving plunger that is nearly uniform deceleration, so that, if the design and proportioning of the grooves 345f and their sloping bottoms is proper, the plunger completely stops its forward movement just before impact with the shoulder 342a occurs.

When the plunger 345 is being forced rapidly to the aft or rearward an exactly similar arrangement and configuration is provided to prevent impact.

With the plunger formed of a suitable refractory material that is partially self lubricating, the friction of the bearing runners 345b against the lining 342 will be negligible during the short time of flight of the missile.

An alternate form of compressor, based on the adaptation of the compressor designed and invented by Tesla United States Patent No. 1,061,142 is utilized in this missile, in lieu of the compressor heretofore described. The Telsa type rotary compressor has the advantage of higher possible speed of rotation than the positive displacement type compressor described in the preceding pages. The higher speed of rotation permits a greater displacement per minute for a turbine of given size and thus allows the missile to be somewhat shorter in length, due to the fact that the longitudinal distance required for the compressors is less for the Tesla type compressors than for the type heretofore described.

Figure 72:
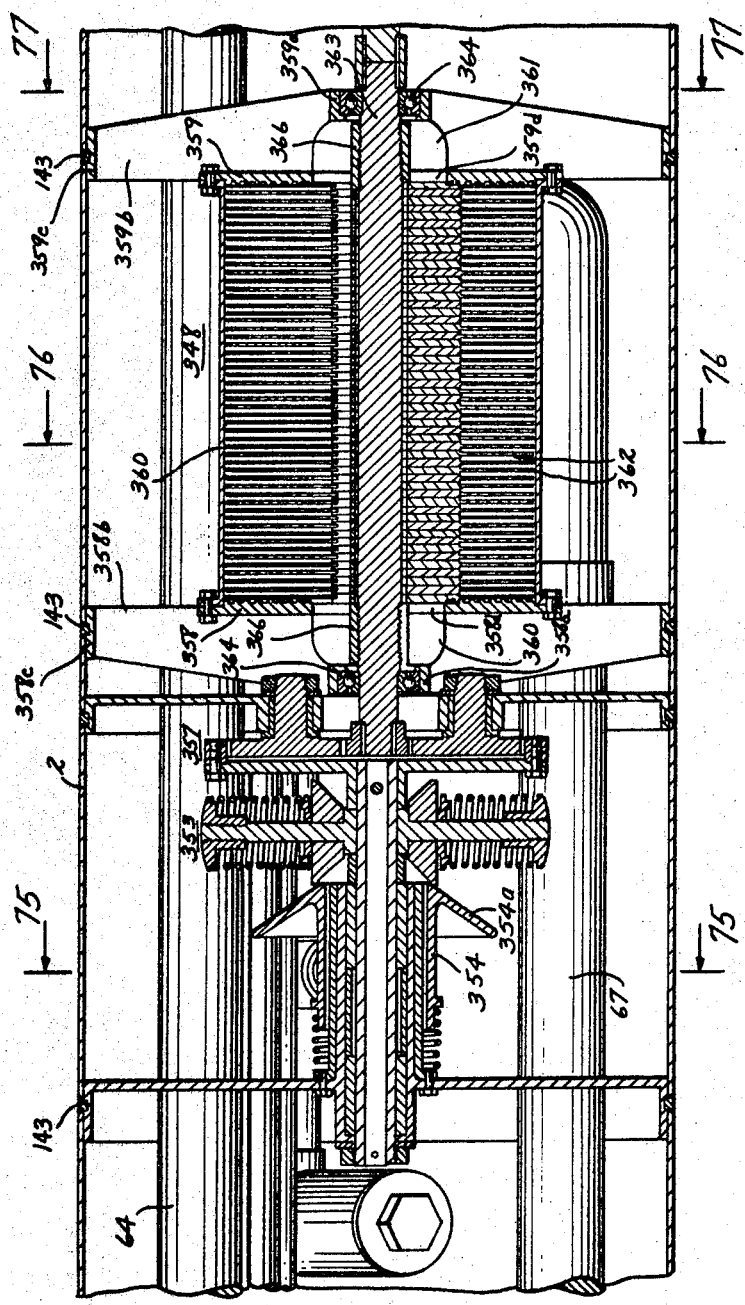
FIG. 72 is a fragmentary longitudinal section through the missile showing an alternate type compressor.
Figure 73:
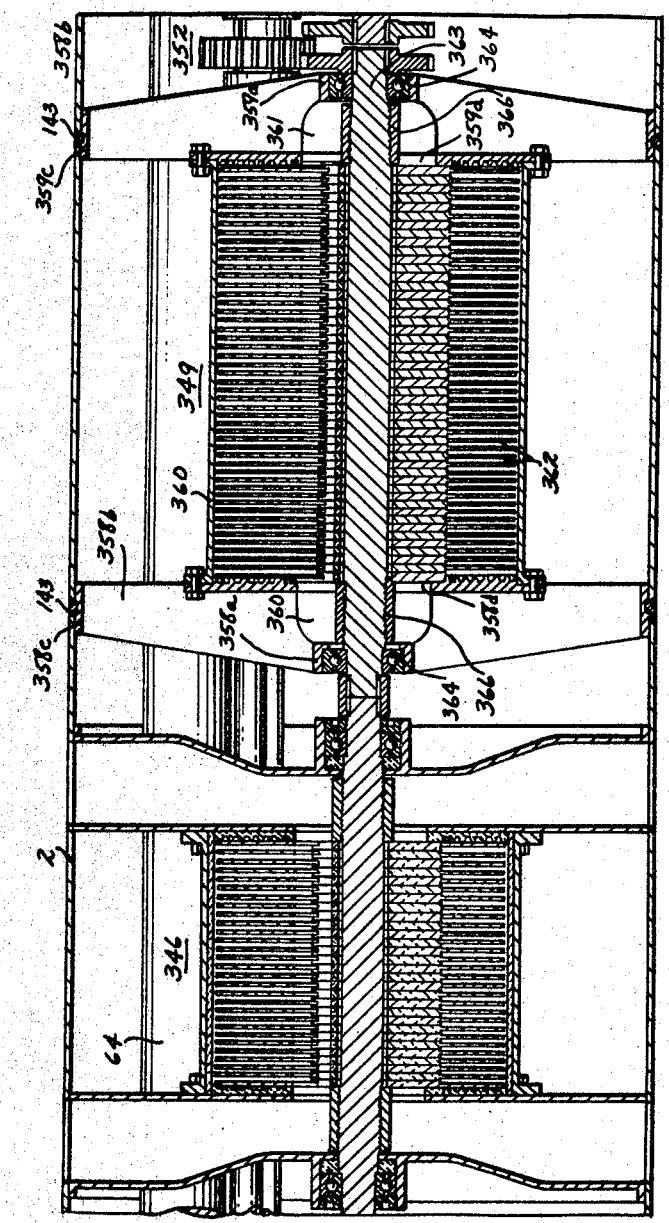
FIG. 73 is a fragmentary longitudinal section through the missile showing a system of an alternate type compressor and a turbine.
Figure 74:
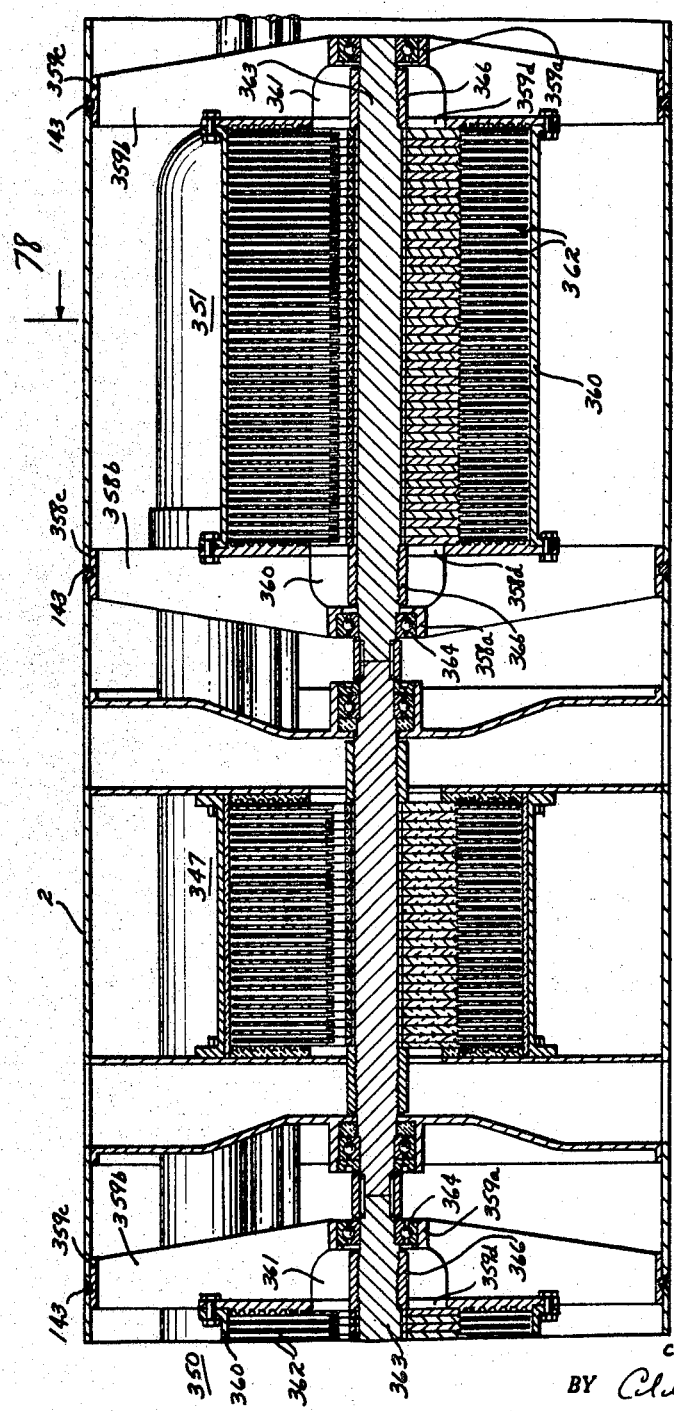
FIG. 74 is a fragmentary longitudinal section through the missile further showing the system of compressors and turbine.

FIGS. 72, 73 and 74 are each fragmentary longitudinal sections showing the construction and relative arrangement of the Tesla type turbines and the Tesla compressors. FIGS. 75, 76, 77 and 78 are transverse sections through the missile taken on one or other of the longitudinal sections 72, 73 and 74 as shown.

FIGS. 72, 73 and 74 show two turbines, one located at 346 in FIG. 73 and the other located at 347 in FIG. 74. These turbines 346 and 347 are identical in construction and functioning to the turbines previously described and will not be further described.

Each turbine has a Tesla type compressor, subsequently more fully described, on each side of it. For instance the turbine 346, shown in FIG. 73 is attached to the compressor 348 in its aft end and is attached to the compressor 349 on its forward end. The turbine 347 is secured to the Tesla compressor 350 on its aft end and to the compressor 351 on its forward end.

It will be noted in FIG. 73 that a spur gear reversing mechanism 352 is provided between the rearmost or aft turbine 346 and its connected compressors 348 and 349, and the forward turbine 347 and the two compressors 350 and 351 which are connected to it. This reversing gear mechanism is identical in functioning to that mechanism shown on FIG. 4F and previously described and will not be further described.

The rearmost system of one turbine and two compressors rotate in a clockwise direction and the forward system of one turbine and two compressors rotate in a counter clockwise direction. The spur gear reversing mechanism causes the forward system to rotate in the opposite direction and at identically the same rotational speed as the rear or aft system.

Figure 75:
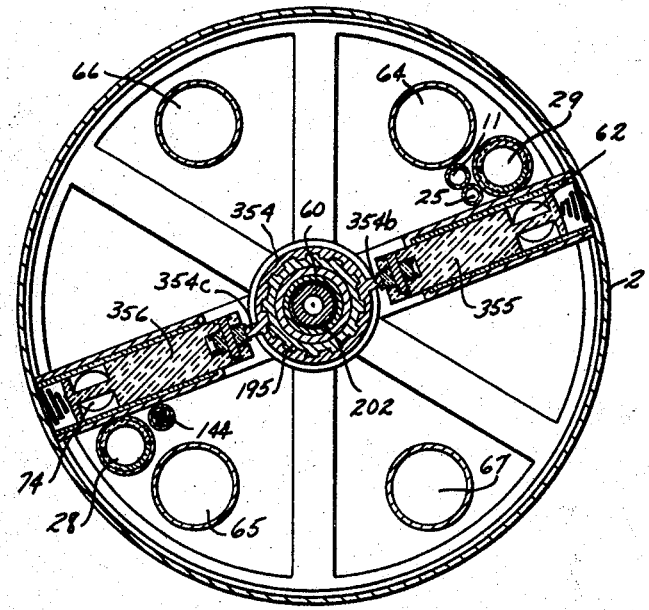
FIG. 75 is a transverse section through the missile taken on line 75—75 in FIG. 72.

In the alternate turbine compressor system here shown only one governor 353 is needed, which is shown in FIG. 72. This mechanical governor is similar to and functions in the same manner as the mechanical governor mechanisms previously described in the previous paragraphs, as for instance the governor described and shown in FIGS. 4D and 17. The only difference between the governor 353 and the one previously described and just referred to is shown in FIG. 75. FIG. 75 is a transverse section through FIG. 72 taken at the line 75—75. As shown in FIG. 75 the sleeve 354 with the cone shaped cam 354a has two cam lugs 354b and 354c which in turn operate the two plungers 355 and 356 respectively which plungers may close wholly or in part the hot gas pipe lines 62 and 74 respectively. The hot gas line 62 feeds the rearmost turbine 346 and the hot gas line 74 feeds the forward turbine 457.

The functioning of the two plungers 355 and 356 and the operation of the two cut off valves, of which they are a part, have been previously fully described and will not be further described here.

It will be seen that a planetary reduction gear 357 is provided to slow down the rotational speed of the mechanical governor with respect to the compressor and turbine speed. This reduction gear is constructed similar to and functions in a similar manner to the reduction gear shown in FIG. 4D and previously fully described and it will not be further described here.

Figure 76:
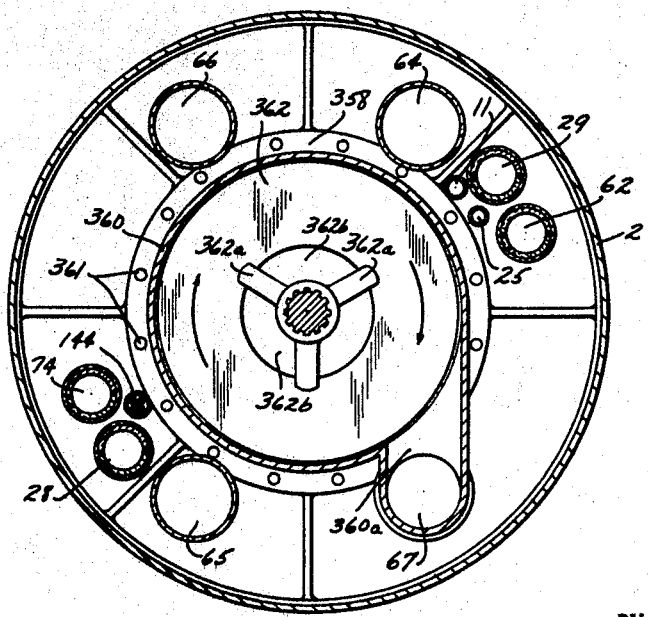
FIG. 76 is a transverse section through the missile taken on line 76—76 in FIG. 72.
Figure 7:
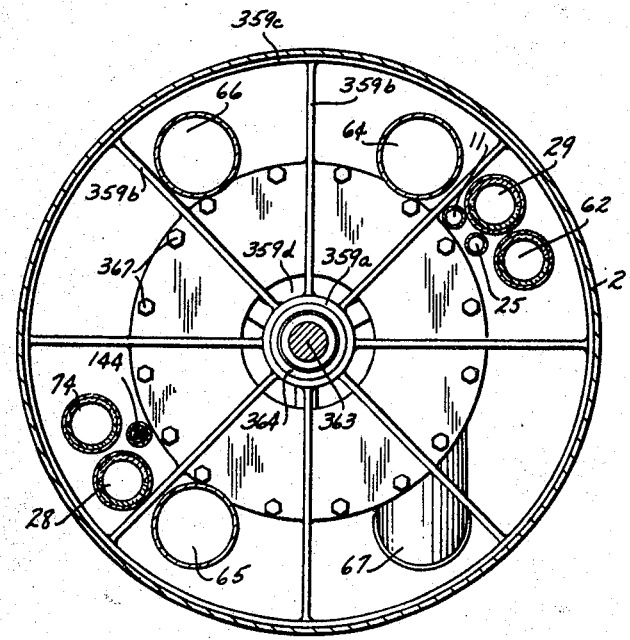
Figure 78:
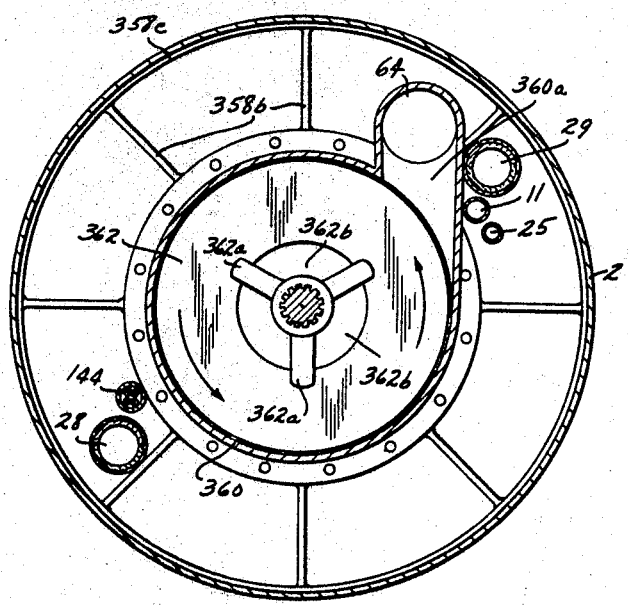
FIG. 78 is a transverse section through the missile taken on line 78—78 in FIG. 74.

FIGS. 72 and 76 show the construction of the aft or rearmost Tesla type compressor. Since the construction and functioning of the remaining three Tesla type compressors is similar to that of compressor 348, the description of the compressor 348 will suffice to show the construction and functioning of the other three. Like numbers will be given to similar parts in the case of each of the four Tesla compressors.

FIG. 72 shows a longitudinal section through the compressor 348 and FIGS. 76 and 77 show transverse sections. The aft plates 358 and forward end plates 359 are secured to an annular outer housing 360 by bolts and nuts 361. These parts form a housing for the rotating discs 362 of the compressors. These discs are similar in shape and construction to those forming the rotating discs of the Tesla turbine. The main difference between these discs and that of the turbine is the fact that the discs in the compressors do not have to withstand the very high temperature of hot gases which the turbine discs have to withstand and hence can be made of less critical material. It will be observed that there is no refractory lining in the compressors. Since the housing in the case of the compressor merely has to withstand the temperature of compressed air no refractory lining is necessary, whereas a refractory lining is provided for the turbine.

The discs 362 are splined on the shaft 363 as seen in FIG. 76. The outer portion of the disc is supported by the spokes 362a as in the case of the turbine discs and the three openings 362b are formed, as in the turbine. The shaft 363 is supported at its ends by the bearings 364. The bearings 364 are supported by the annular rings 385a and 359a, respectively, which are in turn supported by the spokes 358b and 359b as seen in FIGS. 72 and 77. These spokes are connected at their outer extremities to the rims 358c and 359c respectively, which are secured to the outer cylindrical housing 2 by the pins 143. The radially innermost corners of these spokes are cut away at 360 and 361 respectively to permit air to enter the center of the compressor, as subsequently fully described. Also annular holes 358d and 359d respectively are formed in the annular disc portion of the end housings 358 and 359, likewise for the passage of air. The rotating discs are securely held from moving in a longitudinal direction by the sleeves 366 which are threadedly secured to the shaft 363 as shown.

The functioning of the compressor is as follows.

As stated, all the space within the outer shell or tube 2 of the missile and which is outside of the compressors, is filled with air which is under somewhat higher compression than air at sea level, due to the ram effect as the missile moves through the air at great speed.

In FIGS. 72, 76, and 77 the air may freely enter into the interior of the compressors through the annular openings 358d and 359d. The discs 362 are rotated at great speed, for instance of the order of 30,000 revolutions per minute. The air, as explained previously, which is trapped between the discs 362 is carried around with the discs due to molecular attraction and friction. The molecules of the air due to the centrifugal forces describe a spiral path and the molecules eventually escape and are forced out the tangential passageway 360a and into the particular compressed air pipe line served by the compressor in question. In the case of compressor 348 the exhaust line is the pipe 67 as seen in FIG. 76.

As air flows out the exhaust or compressed air lines 64, 65, 66 and 67, respectively, under compression the replacement air flows in continuously through the passageways 358d and 359d. Thus a continual flow of compressed air is forced into the four compressed air lines, taken from the spaces outside the compressor and within the cylindrical housing 2.

A brief and final summary of the various actions that occur with respect to the functioning of the various solenoid valves within the missile, the instant before flight occurs, due to the switching on of electric power from an outside source, will now be given.

Only one electric switch need be closed. All the solenoids within the missile may in fact be opened simultaneously and the missile will function successfully. The solenoid operated valves, in the manner previously explained, when once opened by solenoid action are automatically locked in open position by a spring loaded plunger and remain open throughout the flight of the missile.

When the external switch is closed the following occurs.

(a) The two solenoids valves shown in FIG. 4B and in FIG. 6 on section line 6—6, which allow air to pass into and out of the annular space 116 open.

(b) The four solenoid valves making air tight the compressed air lines 64, 65, 66 and 67, leading from the air compressors to the compressed air chamber 68, and shown in FIG. 15 in a transverse section, or shown in a longitudinal section in FIG. 4C, are opened and locked open.

(c) The valve closing the hot gas pipe line 62, which feeds the aft compressor turbine, shown in FIG. 16 and FIG. 4D, is opened and locked open.

(d) The valve closing the hot gas line 74, which feeds the forward compressor turbine, which drives the forward battery of air compressors, shown in FIG. 29, which FIGURE 29 is a transverse section taken on line 29—29 in FIG. 4H, is opened and locked open.

(e) The solenoid valves which close hot gas lines 28 and 29 shown in FIGS. 23 and 4I are opened and locked open.

(f) The solenoid valve closing the branch pipe line leading from the main compressed air line 11, which branch line feeds compressed air to the pneumatic servos operating the radial jet valves, shown in FIG. 34 and in FIG. 4I, is opened and locked open.

(g) The solenoid valve which cuts off the compressed air line just before the line enters the air operated Tesla turbine, which turbine runs the small generator shown in FIG. 4K and FIG. 39, is opened and locked open.

(h) In addition to opening all the above named valves the four spark plugs shown in FIG. 4B and FIG. 6 are energized and continuous sparking results.

When the above acts are performed in a few milliseconds, merely by closing one external electric switch, the two turbines which rotate the air compressors begin to turn; the initially stored compressed air enters the common pipe line which feeds the radial jets and is ready for instant use; the compressed air enters the pneumatic servos to control the radial jet valves, the Tesla turbine which drives the small electric generator begins to rotate; the four solenoid valves closing the four compressed air pipe lines, which lead from the compressed air chambers to the compressors, are opened. The opening of these four solenoid valves and pipe lines allow the compressors, when they have built up sufficient pressure to overcome the force of the pneumatic and spring pressure tending to close the valves which are built into the compressors to pump compressed air into the compressed air chamber 68. Of course, when the four valves controlling the four compressed air lines are opened, compressed air from chamber 68 initially rushes forward toward the front of the missile and fills the four common compressed air exhaust lines 64, 65, 66 and 67. But the spring loaded air valves 241 shown in a transverse cross section of FIGS. 25, 26, 27 and 28 prevent any further passage of the compressed air from the compressed air chamber 68.

In the manner previously described, the fuel mixture is, in a very brief period, ignited in the combustion chamber, pressure increases, the stopper 100 (FIG. 4B) is blown out the rear of the combustion chamber, the escaping hot gases create thrust and the missile from thence on is completely self-contained, self-operated and self-guided, automatically homes on the target, pursues the target and destroys it.

The term "cylindrical" as used in the specification and appended claims is intended to include any tubular structure of any geometric cross-sectional contour.

The invention hereinbefore described provides a new and improved missile which will improve and greatly facilitate the military logistics of guided missile warfare. This is achieved as the result of the comparatively small size of the missile as compared to most of the presently developed anti-aircraft missiles, in addition requiring smaller storage space and less transportation weight. The same missile, and the same spare parts, may be used for anti-aircraft defense, air to air attack and defense, and aid to surface attack, thus, by reduction of the number of types of missiles and of the number of types of spare parts, simplifying, from a logistic standpoint, the problems of transport, supply, checkout, maintenance, and training of personnel for operational use of the missile.

The elimination of fins and all projecting surfaces from my missile greatly simplifies stowage problems, requiring less stowage space in general and especially on shipboard, since my missiles can be stored in the spaces now used for conventional ammunition for the main battery of the ship.

My missile has further advantages, related to logistics and stowage, in that it is capable of an indefinitely long shelf life, maintaining its instant readiness with no care or maintenance whatever. Its self contained rotary power source obviates the use of battery power, eliminating any requirements for battery changing, checkout or maintenance.

My missile provides a weapon which is at all times in constant readiness for use in combat. There are no rings or fins to attach before use, as in the case of some of the currently developed anti-aircraft missiles. No booster has to be hauled into place and secured to the missile. No maintenance or checkout of the power source or of the fuel is required. The fuel used in my invention, being simple kerosene, commercial fuel oil or alcohol, when placed into the fuel tank of the missile, is preserved and stored indefinitely with no possibility of corrosion or deterioration. The initial actuating force, which is compressed air, is stored in the air bottle of the missile. The compressed air remains in the bottle indefinitely and is available at any instant to actuate the functioning of the combustion and propellant mechanism and initiate the flight of the missile which is accomplished by merely closing an electric switch from an external power source. My missile is not susceptible to extremes of heat, cold and humidity. No ambient condition abrogates the instant readiness of my missile. Its cylindrical shape and configuration, its lack of projecting fins, and its comparatively light weight and small size makes possible rapid handling for launching in land based missile launching mechanisms or the launching of many rounds per minute or of a high rate of fire.

In the description of the invention disclosed in the preceding pages all reference as to its application centers around its use in guided missiles. It will be understood however that the use of the principles and novel features of this invention is not confined exclusively to guided missiles. There are many other applications to which the principles disclosed in the previous descriptive pages may be applied.

The principles of internal combustion, drawing in air from the atmosphere, compressing it to a very high compression through an efficient positive type compressor, metering the correct ratio of fuel and air to a mixing carbureter, utilizing the relative pressure of gases in the combustion chamber and an adjacent compressed air chamber, whereby a fresh supply of fuel mix is fed into the combustion chamber only when the pressure in the combustion chamber drops below the pressure in the compressed air chamber, all comprise a new and useful means of producing efficient combustion and efficient power.

In the missile the majority of power is expended in the form of a jet of hot gases emitting to the rear of the missile to provide jet propulsion.

It is obvious that the hot gases which pass out the rear of the missile to propel it may instead be used to turn gas turbines to provide rotary power. In this case the principles employed in the missile propulsion system may with slight modification be used to comprise a motor producing rotary power which may be used as a prime mover in many applications. Under this category may be included motors or engines for automobiles, propeller driven airplanes, buses, trucks, army tanks, bull dozers, railroad locomotives, ship and marine applications and stationary motors.

The term "missile" as used in the specification and appended claims is understood to include not only objects of any kind intended to be thrown or discharged but also any object, vehicle, airplane, engine, or propulsion system propelled or driven by the combustion system herein described.

Although air is constantly referred to in the description of this invention as the gas which supports the combustion, it shall be understood that this invention is not necessarily confined to the use of air as the gas or oxidant which supports combustion but may utilize any substance capable of supporting combustion.

Various other changes, which will now suggest themselves to those skilled in the art, may be made in the form, details of construction and arrangement of parts without departing from the spirit of the invention. Reference is therefore to be had to the appended claims for a definition of the limits of the invention.

What is claimed is:

1. A propulsion system comprising, in combination, a combustion chamber having an ignition means and an outlet discharging gaseous products of combustion, a turbine driven by said gaseous products led thereinto by conduit means from said combustion chamber, air compression means driven by said turbine whereby air is drawn from the atmosphere and compressed, a reservoir receiving and containing said compressed air at a preset pressure, rotary air metering means receiving and metering air from said reservoir, a fuel metering means driven by said air metering means, said fuel metering means receiving fuel through conduit means connected to a fuel supply, carburetion means communicating with said air and fuel metering means and said combustion chamber; means responsive to a pressure differential between said compressed air reservoir and said combustion chamber to cause said fuel metering means, air metering means and carburetion means to coact to deliver into said combustion chamber a mixture of a uniform ratio of air and fuel.

2. A complete and wholly self-contained missile, having, in combination, inter alia, a cylindrical structure, passageways for scooping air from the front of the missile as the missile travels in flight, a concentric container for containing and confining this air, a turbine, an air compression means driven by said turbine, said means and turbine surrounded by said air, a compressed air chamber disposed in the rear of and connected by conduit means to said air compression means and adapted to receive and contain said compressed air at a preset pressure, an air and fuel metering means disposed in said compressed air chamber to meter air from said compressed air chamber and fuel from a fuel supply, a carbureter connected to said metering means wherein the metered air and fuel is mixed at a uniform ratio, a combustion chamber disposed in the rear of said cylindrical structure and having ignition means therein to ignite the air and fuel mixture and having an orifice at the rear thereof for discharging gaseous products of combustion into the atmosphere, said combustion chamber connected to said carbureter by conduit means, valving means disposed in said conduit means to regulate the flow of said uniform ratio mixture into said combustion chamber in response to a pressure differential between the compressed air chamber and the combustion chamber, pipe means leading from said combustion chamber to said turbine whereby said turbine is driven by gases flowing through said pipe means for operation of the air compression means.

3. The missile described in claim 2, further comprising, valve means disposed in said pipe means to cut off the flow of gases from said combustion chamber to said turbine.

4. The missile described in claim 3, further comprising, valve means disposed in the conduit means between the air compression means and the compressed air chamber to cut off the flow of air to and from the compressed air chamber.

5. The missile described in claim 4 further comprising, means for sealing the rear orifice of said combustion chamber.

6. The missile described in claim 5 further comprising, means for opening said valve means and said sealing means to launch the missile.

7. In a proulsion system for a missile, in combination, a combustion chamber having an orifice for discharging gaseous products of combustion into the atmosphere; an inlet in said combustion chamber for admission of a combustible fuel and air mixture to said combustion chamber; a compressed air storage chamber; an air metering means interposed between and communicating with said compressed air storage chamber and said inlet of said combustion chamber; a fuel supply; a fuel metering means interposed between and communicating with said fuel supply and said inlet of said combustion chamber and drivably connected to said air metering means; means, responsive to a pressure differential between said combustion chamber and said compressed air storage chamber, to cause said air metering means and said fuel metering means to rotate simultaneously and to deliver to said combustion chamber a mixture having a uniform ratio of fuel and air.

8. In a propulsion system described in claim 7, in which the said fuel metering means and the said air metering means are enclosed within the said compressed air storage chamber.

9. In a propulsion system described in claim 8, said air metering means including an even number of rotary positive displacement motors; inlet orifices to said motors whereby compressed air, surrounding said motors, can enter and rotate said motors; exhaust pipe lines leading from said motors, through which the compressed air passes when it has completed its passage through the metering motors; a carburetion system connected between said exhaust pipe lines and said combustion chamber to mix the air and fuel before they are delivered into said combustion chamber, when the pressure in the combustion chamber is less than the pressure in the compressed air storage chamber.

10. In a propulson system described in claim 9, wherein one half of the said motors are arranged to rotate in a clockwise direction and the remaining half of the said motors are arranged to rotate in a counter-clockwise direction; said fuel metering means comprising a pump drivably connected to one of the said metering motors, the elements of said pump coacting to maintain the oppositely rotating metering motors at the same speed.

11. In a propulsion system described in claim 9, said carburetion system including a plurality of carburetors each of which is connected in series with an exhaust pipeline leading from the said air metering motors, said carburetors each comprised of an inner tube to pass air therethrough from a said exhaust pipeline, the wall of said tube being perforated with a multiplicity of fine radially disposed holes to permit liquid to pass therethrough, an outer concentric sleeve surrounding said inner tube, said outer sleeve having end flanges with annular holes therethrough surrounding and forming with the outer sleeve and inner tube an annular closed space, a fuel pipeline leading from the fuel metering means and entering the outer annular space surrounding the inner perforated tube, whereby fuel fills the said outer concentric annular space and flows through the radially disposed holes in the inner tube, forming minute radial streams of fuel flowing inwardly and mixing with air flowing from a said air metering motor exhaust pipeline, through the inner tube and forming a saturated fuel and air mixture.

12. A propulsion system described in claim 7, including means for replenishing and keeping the air pressure in the compressed air storage chamber and the pressure of the combustion gases in the combustion chamber substantially at predetermined limits, said means constructed to be responsive to the occurrence of a differential between the pressure in the compressed air storage chamber and the pressure in the combustion chamber.

13. In a propulsion system for a missile described in claim 7, said means including a chamber, a reciprocating piston disposed in said chamber, a conical shaped forward end to said piston, radially disposed valves and valve plungers, said plungers transversely intercepting the flow of air and fuel mixture before entering the combustion chamber inlet, means for forcing the said reciprocating piston forward to the limit of its travel when the gas pressure in the combustion chamber is greater than the air pressure in the compressed air chamber, means whereby this forward movement of said piston cams the valve plungers outwardly in a radial direction, thereby stopping the fuel and air mixture flow to the combustion chamber, means whereby, when the gas pressure in the combustion chamber drops below the air pressure in the compressed air storage chamber, the said reciprocating piston is forced rearward, thereby camming the radially disposed valve plungers radially inwardly, opening the fuel and air mixture flow to the combustion chamber.

14. In a propulsion system described in claim 7, and further including a carburetor communicating with said combustion chamber inlet to receive the air and fuel from their respective metering means and mix them into a combustible mixture; said differential pressure operating means comprising a pipeline disposed in series with said combustion chamber inlet and said carburetor, a reciprocating valve stopper in said pipeline, means for forcing said valve stopper to its extreme forward position when the pressure in the combustion chamber is higher than the pressure in the compressed air storage chamber, for cutting off the flow of air and fuel mixture into the combustion chamber, and means for forcing said stopper to its extreme aft position when the pressure in the combustion chamber is less than the pressure in the compressed air chamber.

15. In a propulsion system described in claim 14, and further including means in said pipeline to provide a pneumatic buffer to prevent impact between the said valve stoppers and the forward and aft ends of said pipeline during the rapid reciprocation of said valve stoppers.

16. A propulsion system for a missile, having, in combination, a cylindrical shell, a fuel supply disposed within said shell, a combustion chamber having an orifice for discharging gaseous products of combustion into the atmosphere disposed in the rear of said shell; a compressed air storage chamber disposed forward of and communicating with said combustion chamber; an air compressor for feeding air into and disposed forward of said compressed air storage chamber; a turbine connected to said compressor for driving it; mixing means for mixing air and fuel in a uniform ratio from said compressed air chamber and fuel supply respectively and for feeding same into said combustion chamber; air metering means for feeding air from said compressed air storage chamber into said mixing means; a fuel pump drivably connected with said metering means for feeding fuel from said fuel supply into said mixing means; a pipeline communicating from said combustion chamber to said turbine for conducting a portion of the combustion gas toward the forward end of said shell to drive said turbine; and means responsive to a pressure differential between the air pressure in said compressed air storage chamber and the pressure of the combustion gases in said combustion chamber to control the flow of combustible air and fuel mixture into the combustion chamber and the flow of combustion gas into said pipeline to drive said turbine.

17. A propulsion system described in claim 16, further comprising, a gas tight electric solenoid operated cut off valve disposed in the forward end of said pipeline aft of the said turbine; a gas tight stopper in the rear orifice of the combustion chamber, said stopper capable of being forced open by a small increase of gas pressure in the combustion chamber; compressed air stored in said compressed air storage chamber, pipeline and combustion chamber between said cut off valve and said stopper which serve to prevent escape of said compressed air during stowage and prior to launching of said missile.

18. In a propulsion system for a missile, in combination, a combustion chamber; a compressed air storage chamber communicating with said combustion chamber; rotary energy converting means for feeding metered fuel and air mixture into said combustion chamber; pipeline means communicating between said combustion chamber and said rotary energy converting means; means for storing compressed air in said combustion chamber, pipeline and compressed air storage chamber; means for inducing a differential pressure between said combustion chamber and compressed air storage chamber; means for releasing a portion of the air from said combustion chamber through said pipeline through said rotary energy converting means; and means for igniting the fuel and air mixture in the combustion chamber.

19. A propulsion system having, in combination, a cylindrical shell; a fuel supply and an air compressing means dispsoed forward in said shell; a combustion chamber at the rear of said shell communicating with said fuel supply; an orifice for discharging gaseous products of combustion disposed in the rear of said combustion chamber; a pipeline inside said shell communicating from said combustion chamber to said air compressing means; a compressed air storage chamber disposed in said shell forward of said combustion chamber and communicating with said air compressing means and said combustion chamber; means for closing the rear orifice in the combustion chamber and the forward ends of said pipeline for storing compressed air in said combustion chamber, pipeline and compressed air storage chamber, thereby forming a closed system initially charged with compressed air; means for opening said closing means and inducing a pressure differential between the compressed air in said combustion chamber and in said compressed air storage chamber to initiate the provision to said combustion chamber of a uniform ratio mixture consisting of fuel from said fuel supply and air from said compressed air storage chamber and the combustion of this air and fuel mixture.

20. A missile of the class described, having an outer cylindrical shell; a fuel supply and a forward propelling means disposed in said shell; said means comprising, a combustion chamber disposed at the rear of said shell, having an orifice for discharging gaseous products of combustion into the atmosphere; a compressed air storage chamber disposed in said shell forward of and communicating with said combustion chamber; air metering means and fuel metering means disposed in said compressed air chamber for metering air from said compressed air chamber and fuel from said fuel supply; a carburetion means communicating with both metering means and with said combustion chamber to receive air and fuel and mix them into a combustible mixture and deliver the mixture into said combustion chamber; a concentric shell of smaller diameter than that of the outer shell disposed in said outer shell at the forward end of the missile and extending rearward a portion of the length of the missile, forming a passageway constructed to scoop air into the missile from the front during flight, into an air reservoir formed within the outer shell between the compressed air chamber and the rear end of the inner concentric shell; a plurality of air compressors in said outer shell constructed to compress and deliver the scooped air into said compressed air chamber; a pair of turbines each connected to drive one half of said compressors disposed within said outer shell; pipelines communicating between said combustion chamber and said turbines to deliver combustion gas to drive said turbines; said turbines and compressors being surrounded by scooped air within the said air reservoir.

21. A missile described in claim 20, one half the number of said compressors being connected by common couplings and are constructed to be driven by one of said turbines in a clockwise direction; the other half the number of said compressors being connected by common shaft couplings and constructed to be driven by one of said turbines in a counterclockwise direction; a spur gear reversing means disposed between the two groups of compressors to rotate the groups in opposite directions and at the same speed of rotation.

22. A missile of the type described in claim 20 including a planetary reduction gear connected to the shaft of each of said turbines; a mechanical governor of the centrifugal type attached to said planetary gear; cut off valves operated by each governor and disposed in said pipelines to block the flow of combustion gas to the turbines when the speed of rotation of the turbines reaches a predetermined limit.

23. A propulsion system for a missile of the type described in claim 16, said air compressor comprising an outer cylindrical housing; an inlet and exhaust orifice in said housing; closure end plates on the top and bottom of said housing; a multilobed rotor in said housing; a shaft supported between said closure plates and passing through the center of said lobed rotor; a gate constructed to reciprocate radially and joined at the ends by bifurcated bars straddling said shaft, roller bearings mounted on the inner edge of said reciprocating gate, said bearings rolling between said reciprocating gate and the surface of the lobes of said rotor; said rotor constructed to reciprocate said gate by the rotation of said rotor, the reciprocation serving to draw air into the inlet and force it through the exhaust orifice.

24. A missile of the type described in claim 21, said rotary compressors being of the type described in claim 23 and having their lobed rotors disposed in adjacent or alternate compressors in 180 degrees out of phase relationship, so constructed that while one reciprocating gate in one compressor will move linearly in one direction, the gate in the adjacent or alternate compressor will move in the opposite direction thereby reducing vibrational effects.

25. A propulsion system for a missile of the type described in claim 16, and means between said pipeline and said turbine to convert said combustion gas in said pipeline from high pressure and high temperature state to low pressure, low temperature, high velocity before injection of the gas into said turbine.

26. A propulsion system of the type described in claim 25, said turbine being of the Tesla type, constructed to utilize the combustion gas at the high velocity state.

27. A propulsion system of the type described in claim 16, said turbine and compressor being of the Tesla type, said turbine being coupled directly to said compressor thereby causing said compressor and turbine to run at the same speed.

28. A missile of the type described in claim 20, having, in addition, a pipeline communicating from the exhaust of said air compressors with said compressed air storage chamber; valves across each of said pipelines for shutting them off during the stowage of the missile; means for permitting air at high pressure to be forced into and stored in said compressed air storage chamber, said combustion chamber, said combustion gas pipelines and said compressed air pipelines; and means for causing the energy of said stored air to give said missile its initial acceleration, said means comprising means for the opening of said shut off valves through an external electrical energy source and inducing a pressure differential between the pressure in the said compressed air chamber and the pressure in the said combustion chamber.

29. Means for providing a substantially continuous source of gaseous products of combustion at high constant pressure and high temperature, comprising, inter alia, a combustion chamber, a compressed air reservoir, a fuel reservoir, and metering means communicating with the outlets of said reservoirs, to control the fuel and air discharge therefrom, and with said combustion chamber for delivering metered quantities of a uniform ratio of fuel and air from their respective reservoirs into said combustion chamber, said metering means operable only whenever the gas pressure in the combustion chamber drops slightly below that of the air in the compressed air chamber.

References Cited in the file of this patent

UNITED STATES PATENTS

| | | |
|---|---|---|
| 1,052,588 | Janicki | Feb. 11, 1913 |
| 1,061,206 | Tesla | May 6, 1913 |
| 2,085,761 | Lysholm | July 6, 1937 |
| 2,351,750 | Fawkes | June 20, 1944 |
| 2,413,621 | Hammond | Dec. 31, 1946 |
| 2,414,898 | Rous | Jan. 28, 1947 |
| 2,476,185 | Goddard | July 12, 1949 |
| 2,505,798 | Skinner | May 2, 1950 |
| 2,520,433 | Robinson | Aug. 29, 1950 |
| 2,530,716 | Meynier | Nov. 21, 1950 |
| 2,585,626 | Chilton | Feb. 12, 1952 |
| 2,620,626 | Lysholm | Dec. 9, 1952 |
| 2,659,197 | Halford et al. | Nov. 17, 1953 |
| 2,671,312 | Roy | Mar. 9, 1954 |
| 2,699,036 | Nicholson | Jan. 11, 1955 |
| 2,822,755 | Edwards et al. | Feb. 11, 1958 |

FOREIGN PATENTS

| | | |
|---|---|---|
| 507,775 | France | July 3, 1920 |
| 879,835 | France | Dec. 10, 1942 |
| 339,479 | Italy | Apr. 22, 1936 |